United States Patent
Long et al.

(10) Patent No.: US 9,782,678 B2
(45) Date of Patent: Oct. 10, 2017

(54) METHODS AND SYSTEMS FOR COMPUTER VIDEO GAME STREAMING, HIGHLIGHT, AND REPLAY

(71) Applicant: Sliver VR Technologies, Inc., Cupertino, CA (US)

(72) Inventors: Jieyi Long, Santa Clara, CA (US); Mitchell C. Liu, Los Altos, CA (US)

(73) Assignee: Sliver VR Technologies, Inc., Cupertino, CA (US)

( * ) Notice: Subject to any disclaimer, the term of this patent is extended or adjusted under 35 U.S.C. 154(b) by 0 days.

(21) Appl. No.: 15/436,812

(22) Filed: Feb. 19, 2017

(65) Prior Publication Data

US 2017/0157512 A1   Jun. 8, 2017

Related U.S. Application Data

(63) Continuation-in-part of application No. 15/292,350, filed on Oct. 13, 2016, now Pat. No. 9,573,062, which
(Continued)

(51) Int. Cl.
*A63F 13/12* (2006.01)
*A63F 13/497* (2014.01)
(Continued)

(52) U.S. Cl.
CPC .......... *A63F 13/497* (2014.09); *A63F 13/213* (2014.09); *A63F 13/32* (2014.09);
(Continued)

(58) Field of Classification Search
CPC ................................ A63F 13/12; A63F 13/10
See application file for complete search history.

(56) References Cited

U.S. PATENT DOCUMENTS 6,124,862 A   9/2000 Boyken et al.
6,699,127 B1   3/2004 Lobb et al.
(Continued)

FOREIGN PATENT DOCUMENTS

WO   WO2016166764 A1   10/2016

OTHER PUBLICATIONS

Kamcord, "Watch Mobile Games, Watch live streams from your favorite mobile games and chat with top gamers," Kamcord website, available at https://www.kamcord.com, accessed on Dec. 2, 2015.
(Continued)

*Primary Examiner* — Omkar Deodhar
(74) *Attorney, Agent, or Firm* — American Patent Agency PC; Daniar Hussain; Xiaomeng Shi

(57) ABSTRACT

Methods and systems for generating a highlight video of a critical gaming moment from a source computer game running on a game server are disclosed. The method, when executed by a processor accessible by a processing server, comprises receiving video recordings recorded using at least two game virtual cameras positioned at predetermined locations during a source game play, wherein at least one of the game virtual cameras was inserted into the source computer game using a SDK or a game connector module. Next, analyzing the received recordings to extract visual, audio, and/or metadata cues; generating highlight metadata; and detecting the critical gaming moment based on the highlight metadata. Finally, generating a highlight video of the critical gaming moment from the received video recordings based on the highlight metadata. In some embodiments, the highlight videos can be used to drive additional traffic to the game tournament and/or streaming platform operator.

28 Claims, 41 Drawing Sheets

Related U.S. Application Data is a continuation-in-part of application No. 14/960,421, filed on Dec. 6, 2015, now Pat. No. 9,473,758.

(60) Provisional application No. 62/402,886, filed on Sep. 30, 2016, provisional application No. 62/430,841, filed on Dec. 6, 2016.

(51) Int. Cl.
*A63F 13/44* (2014.01)
*A63F 13/213* (2014.01)
*A63F 13/32* (2014.01)

(52) U.S. Cl.
CPC ...... *A63F 13/44* (2014.09); *A63F 2300/1093* (2013.01); *A63F 2300/516* (2013.01); *A63F 2300/634* (2013.01)

(56) References Cited

U.S. PATENT DOCUMENTS

| | | | |
|---|---|---|---|
| 7,015,954 | B1 | 3/2006 | Foote et al. |
| 7,446,772 | B2 | 11/2008 | Wong et al. |
| 8,355,083 | B2 | 1/2013 | Keiser et al. |
| 8,515,253 | B2 | 8/2013 | Cottrell |
| 2002/0154214 | A1 | 10/2002 | Scallie et al. |
| 2008/0268961 | A1 | 10/2008 | Brook et al. |
| 2012/0100910 | A1 | 4/2012 | Eichorn et al. |
| 2012/0134651 | A1 | 5/2012 | Cottrell |

OTHER PUBLICATIONS

Everyplay, "Explore Greatest Games," Everyplay website, available at https://everyplay.com/explore, accessed on Dec. 2, 2015.
Valve Developer Community, "SourceTV," SourceTV wikipedia page on the Valve Developer Community website, available at http://developer.valvesoftware.com/wiki/Source_TV, accessed on Dec. 2, 2015.
Twitchtv, "Twitch," Twitch.tv platform, available at http://www.twitch.tv, accessed on Dec. 2, 2015.
YouTube, "Virtual Reality Videos," YouTube Help page, Upload instructions and settings, available at https://support.google.com/youtube/answer/6316263?hl=en&ref_topic=2888648, accessed on Dec. 2, 2015.
Olivr, "VR Panorama 360 PRO Renderer," VR Panorama Renderer for Unity 5, available at https://www.assetstore.unity3d.com/en/#!/content/35102, accessed on Dec. 2, 2015.
Plays.tv, "Plays.tv now automatically creates video highlights of your key League of Legends moments," Plays.tv—the blog, available at http://blog.plays.tv/plays-tv-now-automatically-creates-video-highlights-of-your-key-league-of-legends-moments/, accessed on Dec. 14, 2016.
Plays.tv, "Plays.tv adds CS:GO Automated Highilights, timeline improvements, and more," Plays.tv—the blog, available at http://blog.plays.tv/plays-tv-adds-csgo-automated-highlights-timeline-improvements-and-more/, accessed on Dec. 14, 2016.
2B-Angels, "NBA teams up with WSC Sports Technologies," available at http://www.2b-angels.com/news/nba-teams-wsc-sports-technologies/, accessed on Dec. 14, 2016.
Gedalyah Reback, "Vikings, Cavaliers and Dodgers invest $12 million in WSC Sports that spins automatic highlight reels," available at http://www.geektime.com/2016/09/08/vikings-cavaliers-and-dodgers-invest-12-million-in-wsc-sports-that-spins-automatic-highlight-reels/, accessed on Dec. 14, 2016.
Kotaku Australia, "AMD's Gaming Software Makes Automatic Counter-Strike and League of Legends Highlights," available at https://www.kotaku.com.au/2016/03/amds-gaming-software-makes-automatic-counter-strike-and-league-of-legends-highlights, accessed on Dec. 14, 2016.
Ian Paul, "The best PC game video capture software: 5 free recording tools compared," PCWorld, available at http://www.pcworld.com/article/3040695/software/the-best-pc-game-video-capture-software-5-top-recording-tools-compared.html, accessed on Dec. 15, 2016.
Ben Barrett, "Automatic highlighting service Videogami picks out the best bits of game streams via magic algorithms, science," available at https://www.pcgamesn.com/automatic-twitch-clips-highlights, accessed on Dec. 14, 2016.

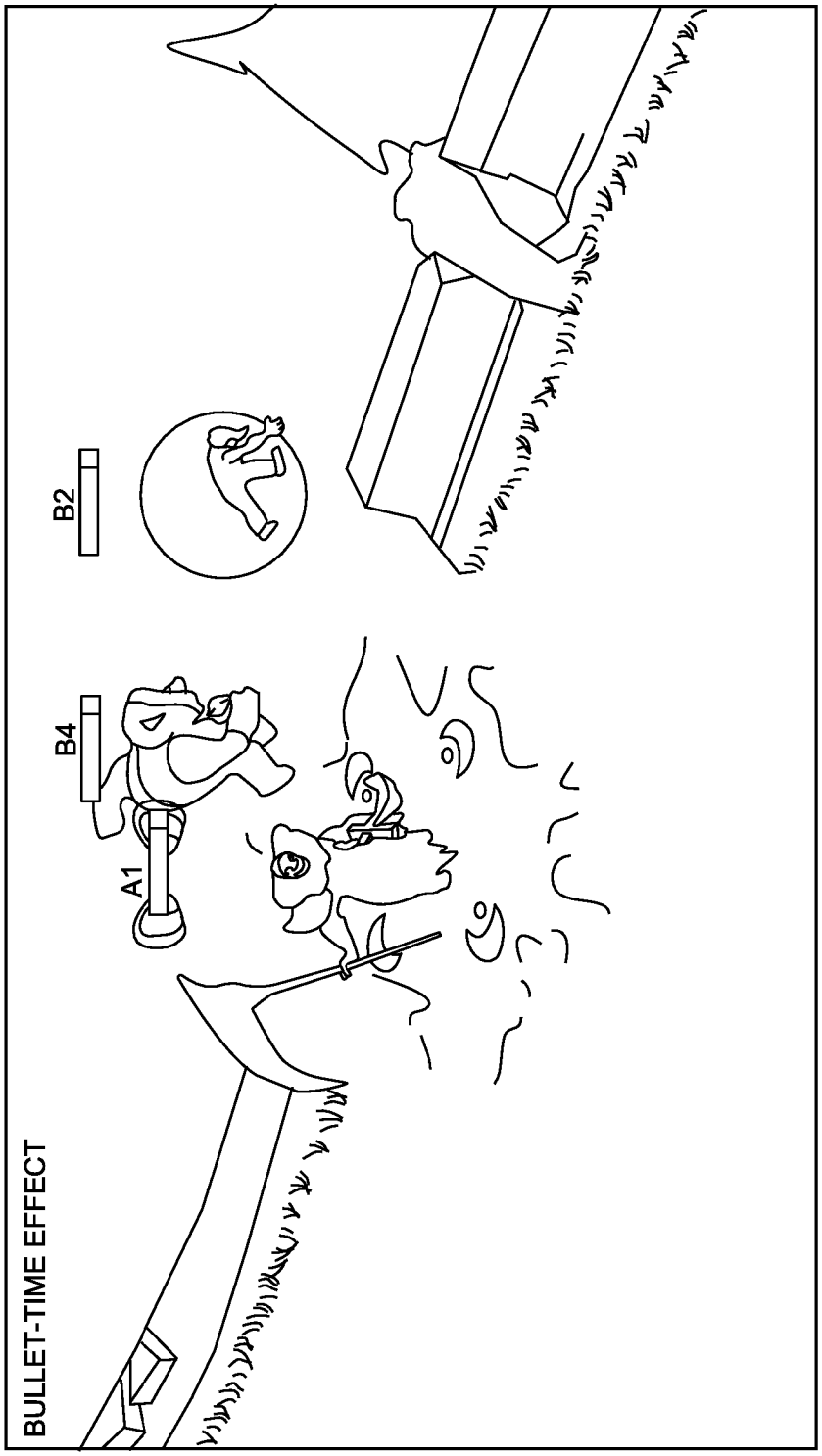

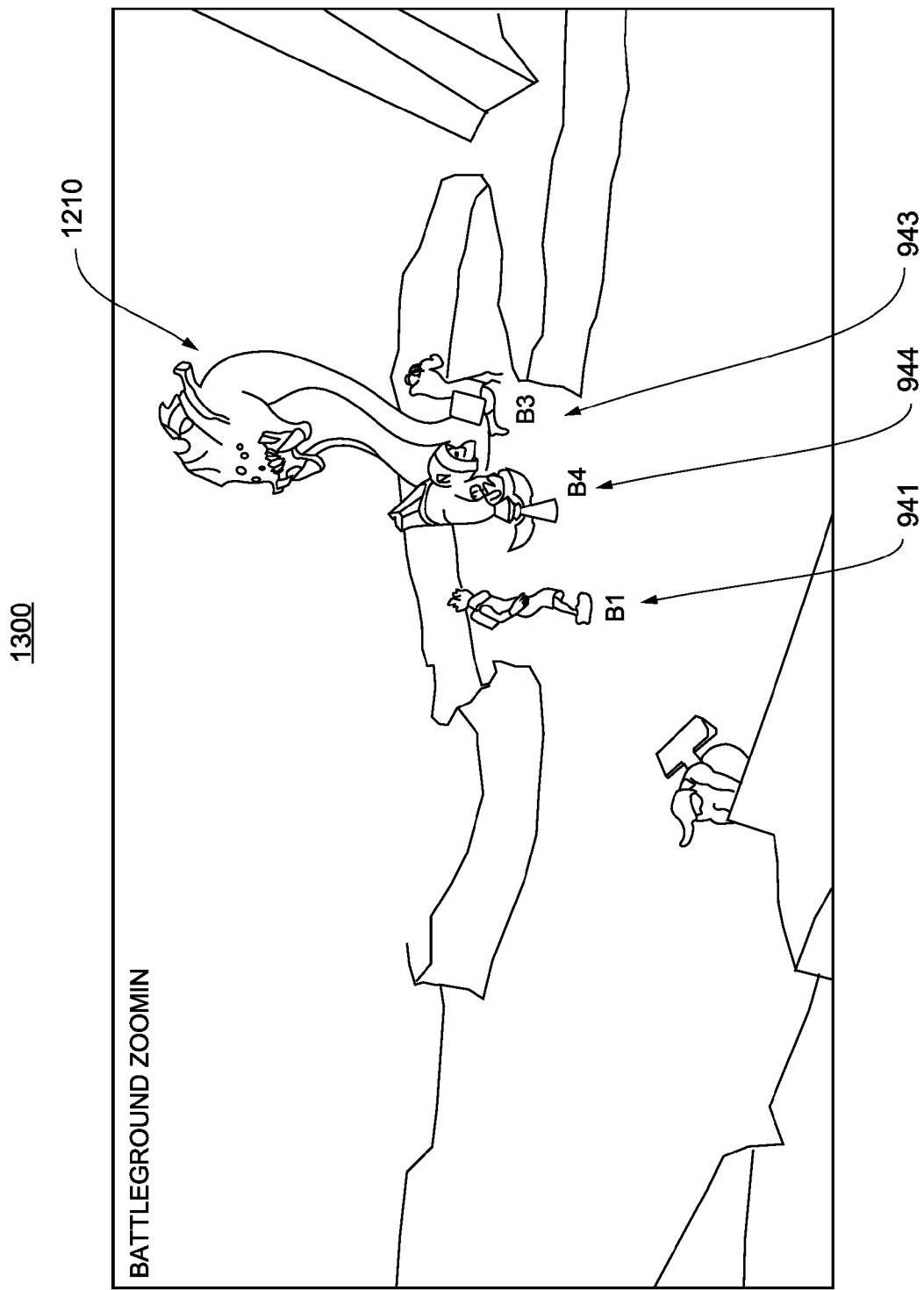

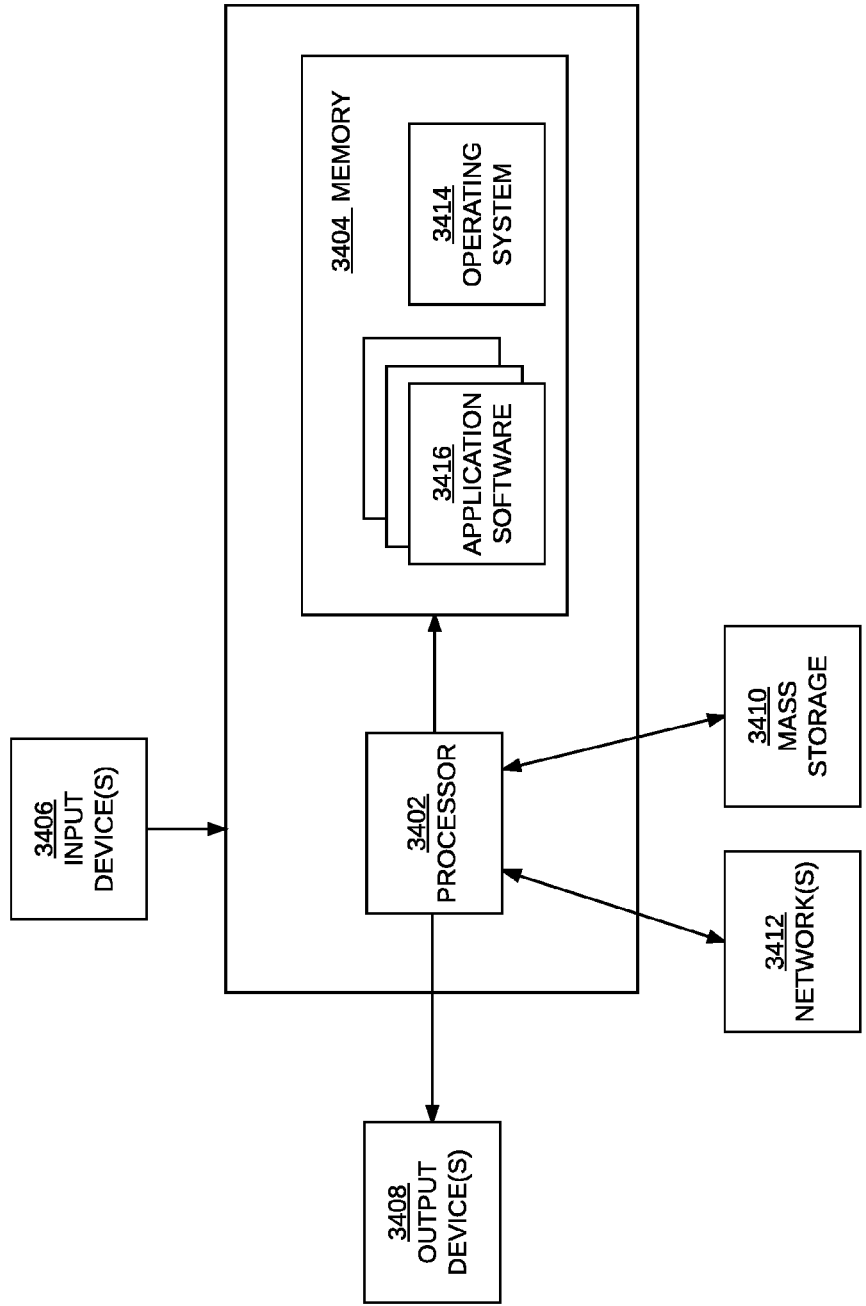

METHODS AND SYSTEMS FOR COMPUTER VIDEO GAME STREAMING, HIGHLIGHT, AND REPLAY

REFERENCE TO RELATED APPLICATIONS

This application is a Continuation-In-Part (CIP) of and claims the benefit of priority to U.S. Ser. No. 15/292,350, filed on 13 Oct. 2016, entitled "Methods and Systems for Virtual Reality and Replay of Computer Video Game," issued as U.S. Pat. No. 9,573,062, on 21 Feb. 2017, which itself is a non-provisional of and claims the benefit of priority to U.S. Ser. No. 62/402,886, filed on 30 Sep. 2016, entitled "Methods and Systems for Virtual Reality Streaming and Replay of Computer Video Games," and is also a Continuation-In-Part (CIP) of and claims the benefit of priority to U.S. Ser. No. 14/960,421, filed on 6 Dec. 2015, entitled "Methods and Systems for Game Video Recording and Virtual Reality Replay," issued as U.S. Pat. No. 9,473,758, on 18 Oct. 2016, the entire disclosures of all of which are incorporated by reference in their entireties herein.

This application is also a non-provisional of and claims the benefit of priority to provisional application U.S. Ser. No. 62/430,841, filed on 6 Dec. 2016, entitled "Methods and Systems for Virtual Reality Streaming, Highlight, and Replay of Computer Video Games" the entire disclosure of which is incorporated by reference in its entirety herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of video gaming, and pertain particularly to methods and systems for game video generation for live cast, highlight, and replay.

BACKGROUND OF THE INVENTION

The statements in this section may serve as a background to help understand the invention and its application and uses, but may not constitute prior art.

Computer video games have come a long way since its first invention. From Pac-Man to Pokemon Go, from arcade machines to multiplayer gaming platforms, game developers are aiming for ever more intriguing story lines, more thrilling game maps, more intensive visual effects, and more social networking capabilities to attract old and new players of all ages. The advent of eSports or competitive gaming has further made computer video gaming into a global spectator sport, where fans attend live-gaming tournaments held in major sporting venues, or watch livestreamed game videos through platforms such as Twitch. In both cases, game action is generally shown on screen through a birds-eye view or a first-person view, while other screens or picture-in-picture windows show images of the players' faces as they play. As broadcasting and watching gameplays become more akin to watching a live football or soccer game, it is no surprise that demand for spectator-level customization and game moment highlight and replay are on the rise significantly.

Nonetheless, current technologies for live-processing or post-processing of game plays to generate game videos for instant replay are often lacking in intelligent game moment recognition or intelligent video editing. In addition, viewing perspectives for game event replays are often limited, and special graphical or highlight effects are either restricted, or entirely absent.

Furthermore, modern computing technologies have brought in a new era of immersive experiences with virtual reality, where immersion enhances the gaming or spectating experience by making it more realistic, engaging, and interactive, with images, sounds, and haptic feedbacks that simulate the user's presence in a virtual three-dimensional (3D) environment. Still, VR content creation, either during initial game development, or during game video live-processing or post-processing, is a non-trivial task. Rendering, compressing, streaming, and replaying of VR videos necessitate high processing power and careful resource management. Conversion of existing video games and eSport platforms into their VR counterparts is equally challenging, as traditional controls and user interfaces often do not work well in VR, while simulation sickness and latency need to be taken into account. Compounded with such inherent difficulties in VR content generation, game event or moment replays involving game action analysis, event capture, highlight, and replay in a VR environment becomes very hard to achieve.

Therefore, in view of the aforementioned difficulties, there is an unsolved need to make it easy to analyze, capture and record real-time live game plays of existing computer video games, and stream and/or replay ensuing game videos, possibly in a virtual reality environment. In addition, it would be an advancement in the state of the art of game replays to automatically edit, curate, and generate intelligent video highlights of the most important actions taking place during a game play.

It is against this background that various embodiments of the present invention were developed.

BRIEF SUMMARY OF THE INVENTION

A system is provided for rendering and recording game videos during game play, for live-processing and post-processing of such game videos, and for streaming, highlighting, and replaying of game videos showing critical moments of a game play.

More specifically, in one aspect, one embodiment of the present invention is a system for generating a highlight video of a critical gaming moment from a source computer game running on a game server. The system comprises a processing server having access to at least one processor, and a non-transitory physical medium for storing program code. The non-transitory physical medium is accessible by the processing server. The program code, when executed by the processor, causes the processor to perform the step of first receiving video recordings recorded using at least two game virtual cameras during a source game play of the source computer game, where each game virtual camera is positioned at a predetermined location, and where at least one of the game virtual cameras was inserted into the source computer game using a Software Development Kit (SDK) or a game connector module. The program code further causes the processor to analyze the received video recordings from each of the game virtual cameras to extract visual cues, audio cues, and/or metadata cues; generate highlight metadata from the received video recordings based on the visual cues, audio cues, and/or metadata cues; detect the critical gaming moment to be highlighted, based on the generated highlight metadata, where the critical gaming moment is associated with a timestamp and/or a location within a game map of the source computer game; determine one or more highlight virtual camera trajectories for capturing the critical gaming moment; capture one or more videos of the critical gaming moment using one or more highlight virtual cameras, where each highlight virtual camera moves along one of the one or more highlight virtual camera trajectories; and generate a highlight video of the critical gaming moment from the video recordings from the game virtual cameras and the one or more videos of the critical gaming moment from the one or more highlight virtual cameras.

In another aspect, one embodiment of the present invention is a non-transitory storage medium for generating a highlight video of a critical gaming moment from a source computer game running on a game server. The non-transitory storage medium stores program code and is accessible by a processing server having access to at least one processor. The program code, when executed by the processor, causes the processor to perform the step of first receiving video recordings recorded using at least two game virtual cameras during a source game play of the source computer game, where each game virtual camera is positioned at a predetermined location, and wherein at least one of the game virtual cameras was inserted into the source computer game using a Software Development Kit (SDK) or a game connector module. The program code, when executed by the processor, further causes the processor to analyze the received video recordings from each of the game virtual cameras to extract visual cues, audio cues, and/or metadata cues; generate highlight metadata from the received video recordings based on the visual cues, audio cues, and/or metadata cues; detect the critical gaming moment to highlight based on the generated highlight metadata, where the critical gaming moment is associated with a timestamp and/or a location within a game map of the source computer game; and generate a highlight video of the critical gaming moment from the received video recordings from the game virtual cameras.

In some embodiments, the critical gaming moment occurs at an off-screen location within the game map, away from a concurrent game broadcast location within the game map. In some embodiments, the at least two game virtual cameras are positioned around at least two different locations within the game map.

In some embodiments, the source game play is a live game play. In some embodiments, the source computer game is running on the game server during a game tournament. In some embodiments, the source computer game is selected from the group consisting of 2D games and 3D games, and wherein the computer game lacks spherical video output.

In some embodiments, each predetermined location is selected from the group consisting of a static location within a game map, a tracking location associated with a game player, a tracking location associated with a game object, a dynamic location controlled by a game broadcaster, and a dynamic location controlled by a spectator.

In some embodiments, the extraction of the visual cues is based on a computer vision analysis of the received videos.

In some embodiments, the determination of the one or more highlight virtual camera trajectories is based on a type of a desired highlight effect, where the desired highlight effect is selected from the group consisting of a spatial scaling, a temporal scaling, a visual special effect, and an augmentation with game metadata. In some embodiments, each of the one or more highlight virtual camera trajectories is associated with at least one movement speed function of the trajectory and one capturing angle function of the trajectory, where a highlight virtual camera that moves along the trajectory moves according to the movement speed function and the capturing angle function. In some embodiments, at least one of the highlight virtual cameras is inserted into the source computer game using a Software Development Kit (SDK) or a game connector module.

In some embodiments, the program code when executed by the processor further causes the processor to post-process the one or more videos of the critical gaming moment according to a desired highlight effect, and wherein the generation of the highlight video comprises combining post-processed videos of the critical gaming moment.

In some embodiments, the highlight video is a spherical video.

In some embodiments, the processing server has access to a dedicated local area network (LAN) connection, where the video recordings are received through the dedicated LAN connection from the game server.

In some embodiments, the program code when executed by the processor further causes the processor to distribute the highlight video to one or more potential users, comprising tournament operators, media partners, influencers, social network users and other end-users, wherein the highlight video comprises a link to view additional game recordings and streams.

In yet another aspect, one embodiment of the present invention is a method for generating a highlight video of a critical gaming moment from a source computer game running on a game server, comprising the steps of receiving video recordings recorded using at least two game virtual cameras during a source game play of the source computer game, where each game virtual camera is positioned at a predetermined location, and where at least one of the game virtual cameras was inserted into the source computer game using a Software Development Kit (SDK) or a game connector module; analyzing the received video recordings from each of the game virtual cameras to extract visual cues, audio cues, and/or metadata cues; generating highlight metadata from the received video recordings based on the visual cues, audio cues, and/or metadata cues; detecting the critical gaming moment to highlight based on the generated highlight metadata, where the critical gaming moment is associated with a timestamp and/or a location within a game map of the source computer game; and generating a highlight video of the critical gaming moment from the received video recordings from the game virtual cameras.

In yet another aspect, one embodiment of the present invention is a non-transitory computer-readable storage medium for generating a highlight video of a critical gaming moment from a source computer game running on a game server. The non-transitory computer-readable storage medium comprising program code stored thereon, that when executed by a processor, causes the processor to perform the steps described herein.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIGS. 9B, 9C, and 9D are exemplary screenshots of a bullet-time replay of the game play referenced in FIG. 9A, respectively, according to one embodiment of the present invention.

FIGS. 13A, 13B, and 13C are exemplary screenshots of a zoomed-in replay of the game play referenced in FIG. 11, respectively, according to one embodiment of the present invention.

FIG. 34 is a schematic diagram of a computing device in which the present invention may be practiced, according to some embodiments of the present invention.

DETAILED DESCRIPTION OF THE INVENTION

Definitions

Figure 1:
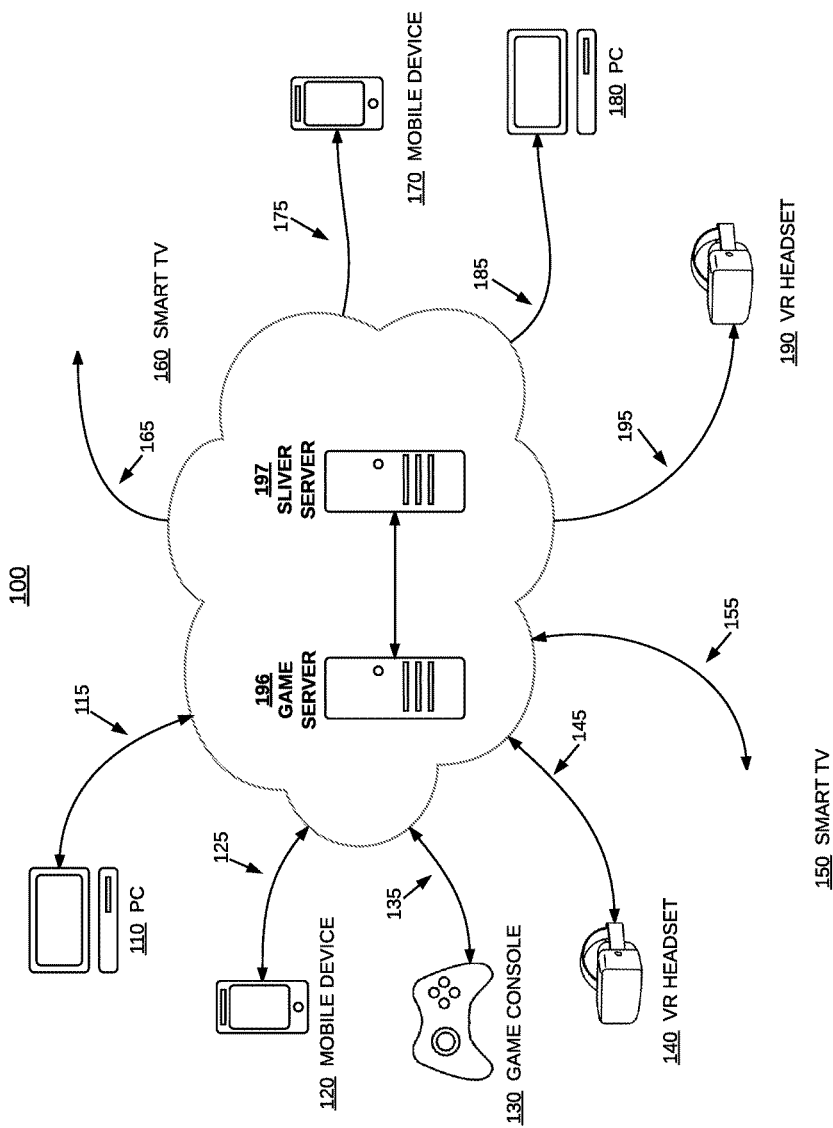
FIG. 1 is a network configuration diagram in which the present invention may be practiced, according to one embodiment of the present invention.

Some illustrative definitions are provided to assist in understanding the present invention, but these definitions are not to be read as restricting the scope of the present invention, application, or uses. The terms may be used in the form of nouns, verbs, or adjectives, within the scope of the definition.

"Game server" is a local or remote server for hosting single-player or multiplayer video games over data networks. A game server is the authoritative source of events in the game—it receives and processes player data, while also transmitting game play data to allow connected clients to maintain their own versions of the game world for display. A game server may be dedicated, listen, or peer-to-peer; it may be hosted or implemented locally, remotely, centrally, distributively, in the cloud, or in any other manner that provides the data communication infrastructure needed for online gaming. In the present disclosure, the term "game server" may also represent a tournament server or an eSport server, which may contain additional modules or components to support competitive gaming broadcast, streaming, and processing.

"Processing server" in the present disclosure refers to a system server encapsulating various components and application interfaces to analyze and process game data received from a game server or a tournament server, where game data may be any numerical, textual, or graphical data, or game metadata. A processing server may also transmit information such as virtual camera control and timing control data to the game server, for game video generation and display.

"Location" generally refers to a point, place, position, or extent in space. In the present disclosure, a location refers to a point, place, position, or extent in a game space or game world, and may be fixed or anchored relative to other objects, bots, or entities within the game world. Thus, an immovable position associated with a fixed set of coordinates may be considered a location within the game world. Similarly, a movable position associated or anchored to a moving player avatar, a moving gadget, or object may also be considered a location within the game world.

"Highlight" of a game play refers to media clips or recordings that feature or focus on one or more particular periods of time ("moments") during a game play, often extending over auto-determined or user-identified gaming events that are either exciting, memorable, or of special interest to viewers. In the present disclosure, a "highlight video" may comprise screencasts captured using pre-existing game virtual cameras within the game world, game play captured from viewing perspectives different from those shown during an initial broadcast, "highlight effects", augmentations, or game video segments generated using any other suitable video processing techniques that make the highlight video attractive to spectators and the like. Exemplary "highlight effects" comprise spatial scaling, temporal scaling, augmentation, and visual special effects, such as bullet-time, glitch, exposure, and noir effects.

"Spherical video," "360 video," "360-degree spherical video," "3D-360 video," or "VR video" is a video with a 360-degree horizontal viewing angle, and possibly a 180-degree vertical viewing angle. In other words, a spherical video is an immersive video where the view in every direction is available at the same time. A spherical video may be viewed in full VR mode with a VR headset, or in slidable panorama-360 mode on a conventional 2D or 3D viewing device. Playback of spherical videos in a VR environment is interactive, with the viewer having control over the viewing directions.

"Spherical media" are any visual media with a 360-degree horizontal viewing angle, and may include panoramic images, screenshots, slideshows, and spherical videos.

"Monoscopic" videos contain visual images that do not provide the perception of depth to the viewer. Monoscopic videos are generally captured from the perspective of a single eye.

"Stereoscopic" videos contain offset visual images to provide the illusion of depth perception when shown on a stereoscopic display. Stereoscopic videos are generally captured separately for both left and right eyes. Stereoscopic display devices may present side-by-side images or use autostereoscopy methods or the like to create depth perceptions.

"Panorama-360 mode" or "Slidable panorama-360 mode" is a display mode where spherical media are shown in panoramic form, possibly on a conventional 2D or 3D viewing device. Interactive user control such as cursor movements or screen swipes may be enabled to direct the viewing angle horizontally or vertically.

"Full VR mode" or "3D-360 mode" is a display mode where spherical media are shown in a fully immersive VR environment, possibly through a head-mounted device such as a VR headset. Interactive user control of the viewing angle is facilitated through head and body movements, and 3D audio is often provided concurrently.

"Game broadcast" and "game streaming" broadly refer to the delivery of media content to one or more end viewers while being provided by the systems disclosed herein. "Live-broadcast" and "live-streaming" refer to media content delivery in real-time, for example, as game plays happen. A noticeable time delay in terms of seconds or even minutes may be present during a live-broadcast or live-stream, due to processing bottlenecks, transmission bandwidth, and the like, and would still be considered "live-streaming", as would be recognized to one of ordinary skill in the art.

"Virtual camera array" is a set of virtual cameras configured in a video game to capture the virtual world in a wide viewing angle, possibly in 360 degrees horizontally and 180 degrees vertically. A virtual camera array includes one or more virtual cameras, each facing a different direction. A virtual camera array may be associated with a set of position coordinates to uniquely identify its location within a game universe or game world, and each virtual camera within a virtual camera array may be characterized in terms of orientation, viewing angle and focal length, zoom factor, and the like.

"Capture" or "record" within a virtual game world refers the saving or storage of rendered game graphics data, with or without explicit graphical or visual display on a computer device.

"Non-transitory storage medium," "physical medium," "storage medium," and the like refer to an article of manufacture in which computer program code may be stored, said program code later to be executed by a computing device having access to at least one hardware processor, such as a server, a cloud repository, an end-user device, and so on. Non-transitory storage medium may be portable, such as a CD or USB drive, or fixed, such as a hard-disk in a cloud server.

"Data repository" and the like refers to a central place, such as a database, where data is stored and maintained. It is also a logical (and sometimes physical) partitioning of data where multiple databases which apply to specific applications or sets of applications reside.

"Interface," "user interface," "graphical user interface (GUI)," and the like is a user interface (UI) in a display of a computer screen, where a user of a computer system can provide input.

"Server" is a computer comprising a processor and a memory that is used by the system to provide the software program code implementing the invention to multiple client devices over a communications network.

"User" is a person or device that interacts with the system disclosed herein. A user may represent a broadcaster, a player, or a spectator of a computer game. A broadcaster may be a presenter or a commentator to a game broadcast. A broadcaster or a player may stream game play in real-time. A player may be a real person or a robot ("bot"). A spectator observes or watches game play unfold, often with special access to player and game information. A user may also be called a viewer to the system in some contexts.

"User-device", "end-user device", "mobile device," and the like refer to a computer with a display, input options, a processor and a memory, often in the form of a laptop, desktop, tablet, smartphone, or the like, that is used by users of the disclosed system to interact with and access the services of the present invention.

"Client-server connection", "communications link", and the like is a connection between a sever and a user-device via a communications network, such as, but not limited to, the Internet.

"Algorithm" is a set of instructions to be followed in calculations or processing, especially by a computing device. In a computer implemented method or system, the term algorithm may be used interchangeably with the terms "rules" or "instructions," to refer to a sequence of steps to be carried out by a computer processor following instructions encoded in memory. An algorithm can be encoded in program code stored on a physical storage medium.

"One embodiment" or "an embodiment" means that a particular feature, structure, or characteristic described in connection with the embodiment is included in at least one embodiment of the invention. The appearance of the phrase "in one embodiment" in various places in the specification is not necessarily all referring to the same embodiment, nor is a separate or alternative embodiment mutually exclusive of other embodiments. Various features are described which may be exhibited by some embodiments and not others.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Broadly, embodiments of the present invention relate to immersive video gaming, and pertain particularly to methods and systems for game video generation for live cast, highlight, and replay, possibly in a virtual reality (VR) environment. More specially, embodiments of the present invention relate to inserting virtual cameras and/or virtual camera arrays into existing single-player or multiplayer mobile, desktop, or console games, to capture game plays, and to generate highlight media of critical gaming moments for live-broadcast, instant-replay, or on-demand replay, possibly in a virtual reality environment. Virtual cameras and virtual camera arrays may be inserted or activated individually or in groups before or after a game play has been initiated, at pre-determined, auto-configured, or user-defined locations, and visual, audio, and/or metadata cues thus captured may be analyzed to determine critical gaming moments to highlight.

Unlike conventional game replays consisting of only screencasts where a viewer sees only one competing player's first-person field of view or a limited third-person view, the present invention allows users to see what is happening in new and novel viewing perspectives, possibly throughout the entire game universe, in real-time or in an off-line fashion. More specifically, by automatically or manually configuring virtual camera and virtual camera arrays in desired arrangements or formations, and by controlling virtual camera locations or movements through pre-designed or live-computed trajectories, embodiments of the present invention may be used to analyze a game play to detect or determine exciting or critical gaming moments that occur on-screen or off-screen during game broadcasts, to generate highlight clips with or without highlight effects such as spatial scaling, temporal scaling, visual special effects, and augmentation, and also to create fully immersive experiences where game replays and/or highlights are presented as spherical media with 360-degree viewing perspectives. Thus, embodiments of the present invention enable users to watch the best parts of a game play in new and novel viewing perspectives, and allow users to see critical gaming moments that otherwise may be omitted with conventional broadcast or screencast highlights.

From a computing perspective, one advantage of the present invention is to provide high-quality non-VR and/or VR media content that highlight critical gaming moments for live-broadcast, instant-replay, and on-demand replay, all with minimal modifications to existing source games, minimal performance impacts on source game plays, in real-time or in an off-line fashion, and minimal data transmission overheads. Systems as disclosed herein achieve such features by using backend or processing servers with high-level computational and graphical processing capacities, as well as intelligent algorithms for game data analysis and processing. Embodiments of the present invention provide a turnkey solution that enable not only individual gamers, but also tournament and league operators to run live streams and generate highlights of existing games including, but not limited to, Counter Strike: Global Offensive (CS:GO), League of Legends (LoL), and Dota2. Systems and methods thus disclosed enable on-site production services including secure integration with tournament game servers, real-time capture and live replay rendered through dedicated GPUs, media streaming and content delivery, end-user eSports viewer apps across all desktop, mobile and VR platforms, and live or post-event tournament highlights and videos on-demand (VOD).

As an example, embodiments of the present invention enable live-replay of particular gaming moments, such as multi-kills in LoL by utilizing machine vision algorithms and automatic generation of slow-motion or bullet-time special effects with close-up and fly-by camera angles. Such instant replay clips may be spliced back into a live stream, or shown with picture-in-picture screens, and optionally be made available to tournament and league operators to incorporate into existing broadcast to other platforms, such as Twitch and YouTube. Both immersive 360 spherical and regular video highlights and replays from one or more desired viewing angles may be generated accordingly, leading to new and dynamic perspectives on eSports spectating beyond today's current static streaming experience.

SLIVER.TV is a trademark name carrying embodiments of the present invention, and hence, the aforementioned trademark name may be interchangeably used in the specification and drawing to refer to the products/services offered by embodiments of the present invention. The terms SLIVER.TV and SLIVER may be used interchangeably in this specification to describe the overall game recording, streaming, highlight, and replaying platform, the technology behind the platform, as well as the company providing said platform, as the context may require. With reference to the figures, embodiments of the present invention are now described in detail.

System Architecture

FIG. 1 shows a schematic diagram of a network configuration 100 for practicing one embodiment of the present invention. One or more user devices may be connected to a SLIVER server 197 or one or more game server 196 through different types of network communication links. In some embodiments, SLIVER server 197 is called a processing server, and game server 196 may be an eSports tournament server. User devices as disclosed may be operated by users such as observing game spectators, or game players and broadcasters who stream or commentate game playthroughs and highlights for broadcasting over the SLIVER platform.

In various embodiments, such user devices may be a personal computer 110, a mobile device 120, a game console 130, a VR headset 140, a smart TV 150, or the like. Mobile device 120 may be a laptop computer, a tablet, a smartphone, or wearable devices such as a watch or smart glasses. Game console 130 may be a dedicated gaming device such as a home video game console or a handheld game console. VR headset 140 may be a head-mounted device capable of recording user head and body movements during game play. For example, it may be a dedicated high-end device such as Oculus Rift or Sony PlayStation VR; it may alternatively be a low-end device such as Google Cardboard or Daydream or Samsung Gear VR, to be used concurrently with a smartphone. In addition, VR headset 140 may be used with a VR motion platform or seat, possibly with an immersive simulator. Smart TV 150 may be a television set or set-top box with integrated processing and networking capabilities, where software applications are pre-loaded into the device. Some exemplary set-top boxes currently available today include AppleTV, Hulu Box, and Mibox. Communication links 115, 125, 135, 145, and 155 may be wireless or wired, and may employ technologies and protocols comprising Ethernet technology, Local Area network (LAN), Wide Area Network (WAN), an optical network, and the like.

In some embodiments, one or more of user devices 110, 120, 130, 140 and 150 may have locally installed game client programs that communicate with game server 196 to facilitate a source game play of a source computer game running on game server 196. Game data such as visual and non-visual recordings of the source game play, rendered game scenes or textures, metadata, and the like, may be sent by game server 196 to SLIVER server 197, while information such as virtual camera control and timing control data may be received by game server 196 from SLIVER server 197, for virtual camera configuration and game video generation.

In some embodiments, game metadata or game stream metadata of a source game play may be used by a game connector component of SLIVER Servers 197 to configure a local game play within the server to replicate the source game play for game play recording and highlight video generation within SLIVER server 197. Such game play recordings and highlight videos may be viewed through user devices such as 110, 120, 130, 140, or 150.

In some embodiments, game server 196 is a conventional server for hosting one or more single-player or multiplayer computer video games, and may be directly connected to user devices such as 110, 120, 130, 140, 150, as well as SLIVER server 197. Thus, in some embodiments, game metadata from individual game plays may be produced by game server 196, and uploaded to SLIVER server 197 directly. In some embodiments, game server 196 may also comprise SDK-based capture clients for direct game play video recording. A Software Development Kit (SDK) is a set of software development tools or programming packages for creating applications for a specific platform. An SDK may be compiled as part of the developed application to provide dedicated interfaces and functionalities. Alternatively, an SDK may be an individually compiled module, incorporable into an existing game on a user device as a plug-in, add-on, or extension in order to add specific features to the game without accessing its source code. Thus, an SDK-based capture client may be integrated into existing 2D, 3D or VR mobile, desktop, and console games during the game development stage; alternatively, an SDK-based capture client may be individually compiled and incorporable into an existing game. The capture client utilizes one or more configurable virtual cameras or virtual camera arrays capable of recording a game from various directions or perspective during real-time game play. Video thus recorded are either monoscopic or stereoscopic, with possible view synthesis through the SLIVER server later. An SDK-based capture client developed according an embodiment of the present invention may be able to record from multiple perspectives within the game universe in real-time without significantly compromising the frame rate of the source game play on a user device. For example, capture performance may be optimized by recording at low resolution and/or low frame rate, or low spatial and/or temporal frequencies, while video post-processing may be performed on the SLIVER to interpolate and/or upscale into high-definition recordings. In addition, an SDK-based capture client may collect training data for use by the SLIVER server, possibly without noticeable impact on the spatial resolution and frame rate of the source game play.

In FIG. 1, game server 196 is shown as a remote server or cloud server for illustrative purposes only. In various embodiments, game server 196 may be any conventional server for hosting computer games, may reside on any type of networked devices, and may employ any communication networking technologies and protocols such as the Internet, TCP/IP, Local Area networks (LAN), Wide Area Networks (WAN), and the like. In some embodiments, game server 196 is a tournament server that also provides spectator interfaces, security measures to protect against data leak and cheating within the game, and other functionalities necessary for running a competitive gaming event. Furthermore, for multiplayer games, each participant may be a client such as user devices shown in FIG. 1, a dedicated server or a listen server such as game server 196, or a combination of client and server at the same time. In a multiplayer game without a dedicated server such as game server 196, one of several players running the game may act as a server to the game, and manages the network state and network connections within the game. Thus, in some embodiments, dedicated game server 196 may be absent, and appropriate network connections may be made by individual user devices to any user device that serves as a game server instead. Game metadata and/or game play recordings may be produced and uploaded to SLIVER server 197 accordingly.

SLIVER server 197 is a platform for processing game data including metadata and/or game play recordings produced from source game plays of source computer games. It may also conduct a plethora of functionalities such as virtual camera control, game environment and game play capture, game map analysis and game map data processing, highlight video generation, spherical media generation and streaming, and the like. In the present disclosure, a source computer game refers to a mobile, desktop, or console game that either lacks spherical video output or is an existing VR game. Copies of a source computer game may be installed in individual user devices, in conventional game servers such as server 196, or in a SLIVER server such as 197. A source game play is an original game play desired to be recorded, streamed, highlighted, or replayed. A local game play is a game play configured and/or replicated from game metadata or game recordings of a source game play. As game metadata are generally much smaller in size than high resolution video recordings, game metadata can be easily transferred among user devices, game servers, or processing servers without imposing constraints on resources such as bandwidth and battery life of a user device on which a source game play may take place.

In FIG. 1, SLIVER server 197 is directly connected to game server 196, which may in turn be connected to user devices 110, 120, 130, 140, 150, or the like. Alternatively, SLIVER server 197 may function as a game server as well to host game plays and eSports tournaments. As a result, game plays may be recorded directly with or without game metadata in different embodiments. In addition, in some embodiments, SLIVER Server 197 may be a distributed system, where constituent controller, algorithmic components and modules, graphical processing units, and media storage and streaming services are implemented on physically or logically separate devices. In some embodiments, SLIVER Server 197 may also be hosted in the cloud. In some embodiments, SLIVER Server 197 is a dedicated server having access to a dedicated local area network connection to game server 196, where game data or video recordings are received through the dedicated local area connection from game server 196. For eSports tournaments, SLIVER server 197 may be located on-site, in close proximity to the tournament hosting server 196, where data transmission latency between the two servers is further reduced, and where SLIVER server 197 may have access to game data not generally available to players, broadcasters, or regular spectators. In some embodiments, during a professional competition, a game play viewed through spectator mode may be delayed by a certain amount of time to prevent competing teams from gaining any competitive advantages over each other. SLIVER server 197 may take advantage of such delays to deploy additional virtual cameras and/or to create game highlight videos that may be instantly replayed, or may be perceived as real-time replays.

In some embodiments, highlight videos or other game media produced by SLIVER server 197 may be spherical. Monoscopic or stereoscopic spherical media thus produced may be downloaded to any of the above-mentioned user devices 110, 120, 130, 140, and 150, for live viewing or on-demand replay through a view client application installed therein. For example, VR headsets such as 140 may be distributed to audiences during a competitive gaming event hosted in a stadium. While VR headset 140 provides a fully immersive VR environment, each of user devices 110, 120, 130 and 150 may allow VR viewing in slidable panorama-360 mode instead. Furthermore, in some embodiments, SLIVER server 197 may be connected to one or more viewing devices with a SLIVER VR client application installed. For example, such a viewing device may be a smart TV 160, a mobile device 170, a personal computer 180, a VR headset 190, or the like. In some embodiments, smart TV 160 is connected to a set-top box such as an Apple TV or a Hulu box, which hosts view client applications instead. Again, communication links 165, 175, 185, and 195 between SLIVER server 197 and the various viewing devices may be wireless or wired, and may employ technologies and protocols comprising Ethernet technology, Local Area network (LAN), Wide Area Network (WAN), an optical network, and the like.

Figure 2:
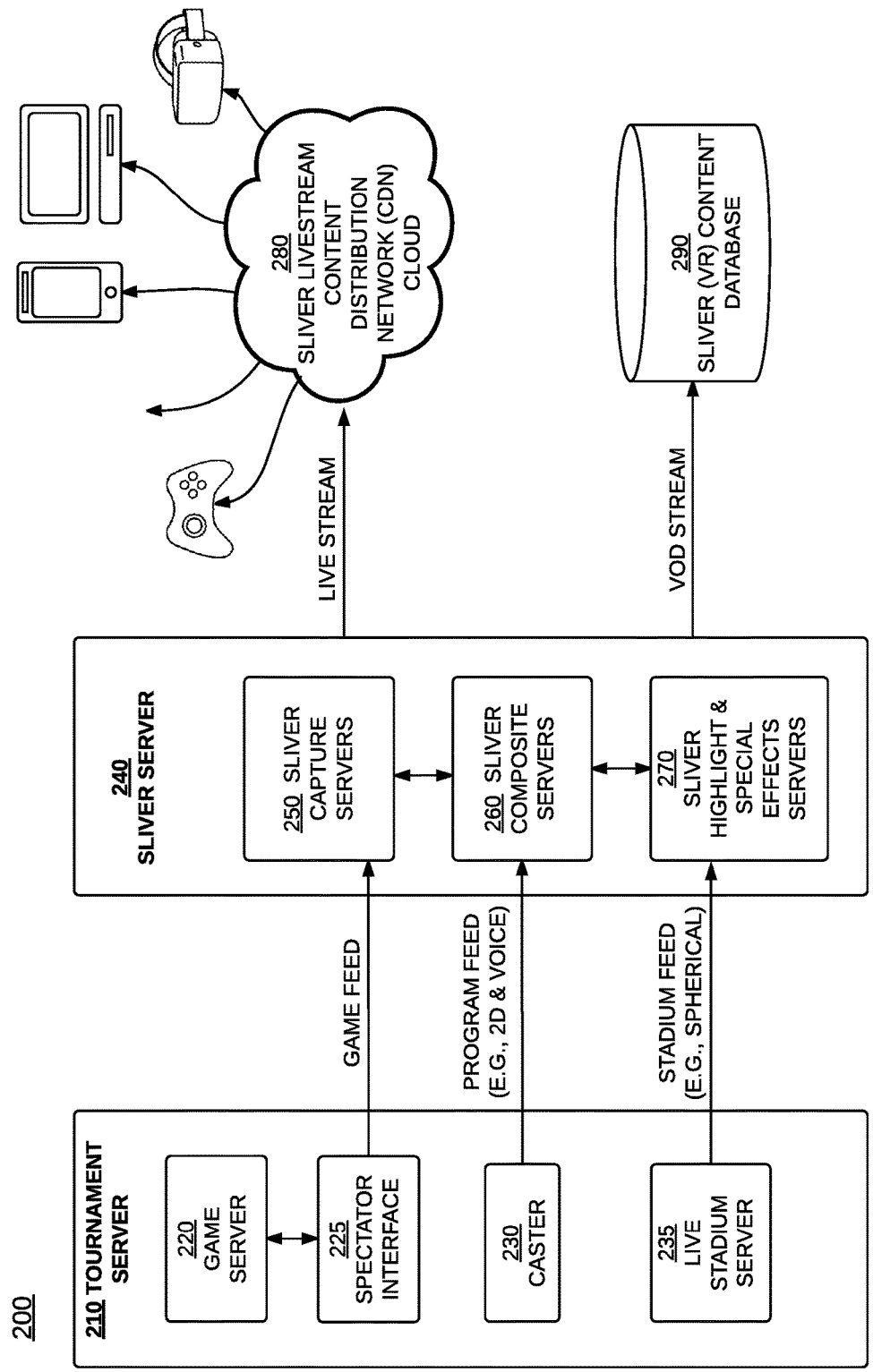
FIG. 2 is an architectural overview of a game video live cast and replay framework, according to one embodiment of the present invention.

FIG. 2 is an architectural overview of a game video live cast and replay framework 200, according to one embodiment of the present invention. In this embodiment, a tournament server 210 provides game feed, program feed, and optionally stadium feed to a SLIVER server 240, which in turn provides media content, either as live streams to a SLIVER livestream content distribution network (CDN) 280, or as video-on-demand to a SLIVER content database 290. Such media content may be audio, video, in 2D, 3D, or spherical media formats, and may comprise static game video screencasts, game moment highlights, broadcast commentaries, and the like.

In some embodiments, tournament server 210 may comprise one or more dedicated game servers such as game server 220, interconnected with a spectator interface 225, a caster 230, and a live stadium server 235. Although only a single interconnection is shown in FIG. 2, each module, component, or server within tournament server 210 may be interconnected to produce the game feed, program feed, and stadium feed as shown.

As previously discussed, a game server is a local or remote server for hosting a single-player or multiplayer video game over a data network or multiple interconnected data networks. A game server is the authoritative source of events in the computer game; it may render the game world in real time, may receive and process player data, and may also transmit game play data to allow connected game clients maintain their own versions of the game world for display. In the embodiment shown in FIG. 2, game server 220 is a dedicated server implemented as a component of tournament server 210. In various embodiments, a game server may be a dedicated server, a listen server, or a peer-to-peer server; it may be hosted or implemented locally, remotely, centrally, distributively, in the cloud, or in any other manner that provides the data communication infrastructure needed for online gaming. In some embodiments, the term "game server" may be used to refer to a more general tournament or eSport server, such as tournament server 210, comprising additional modules or components to support competitive gaming broadcast, streaming, and processing.

For optional viewing experiences, spectator interface 225 provides dedicated and specialized observing features that give spectators access to information that even the players may not have. For example, players usually are provided with a player interface overlay on screen, which may comprise one or more of a minimap, a game time panel, a score panel, a team information panel, a chat panel, or other similar information boxes or annotations. Such player interfaces may vary from game to game, depending on the type of game played. Similarly, spectator interface 225 may add spectator overlays by modifying the player interface to add other information that enhances the viewing experience. For example, spectator interface 225 may modify the minimap so spectators can view movements of players from both teams instead of a player's own team; spectator interface 225 may allow spectators to see avatars or outlines of both teams' players on screen during a battle, and may show game stats at any stage of the game.

Through the game feed from spectator interface 225, SLIVER server 240 may have full access to recordings and data of the game play, including player interface data as shown to individual players, spectator interface data as broadcasted, as well as other game play data compilations, in the form or one or more merged video screencast streams, or in multiple data streams that can be analyzed separately. For example, SLIVER server 240 may examine a video stream to identify or extract visual and/or audio cues that indicate an exciting moment has occurred in the game play. Exemplary visual cues include sudden, successive changes in color that indicates the occurrence of explosions, placement of multiple players within very close proximity which may indicate an intense battle scene, and the like. Exemplary audio cues include explosion sounds, changes in tone in player commentaries, and the like. SLIVER server 240 may further examine game metadata to extract metadata cues for critical game moment identification. For example, death of a player is often considered an important or critical event, and the killing moment is subsequently highlighted or replayed. In some embodiments, such visual, audio, and metadata cues may be combined, correlated or cross-compared to generate highlight metadata, which may provide more accurate gaming moment identification results than using individual cues. In yet some embodiments, highlight metadata may be equivalent to extracted visual, audio, and/or metadata cues.

In contrast to the present invention, in conventional systems, the game feed comprises only game actions on-screen, or as shown or broadcast to spectators. Thus, gaming events occurring off-screen, away from a concurrent game broadcast location within the game map, at locations not selected by a broadcaster, are omitted. In some embodiments of the present invention, video or game data feeds from any number of or all virtual cameras within the game world may be streamed to SLIVER server 240, which may then identify both on-screen and off-screen critical gaming moments, thus enable viewers to have full access to all important events occurred or occurring in a game play, regardless of camera work decisions made by the broadcaster during a game tournament.

In some embodiments, spectator interface 225 may be modified to provide tailored game feed to SLIVER server 240, where non-essential information such as team logos or in-game ads are eliminated, allowing SLIVER server 240 to better perform computer vision analysis of game recordings to identify critical gaming moments for highlight video generation. In some embodiments where separate data streams are utilized, SLIVER server 240 may choose one or more data stream to analyze, again to better perform computer vision or other machine learning algorithms for gaming moment identification and game video processing, without interferences from non-essential or unrelated information. In some embodiments, SLIVER server 240 may utilize game metadata or rendered scenes or textures received through the game feed to replicate or configure a local game play, where additional virtual cameras may be inserted, for game video capture and subsequent processing. In some embodiments, spectator interface 225 may provide full screen overlay frames or picture-in-picture windows that can be utilized by SLIVER server 240 to display game moment highlights or other SLIVER-specific game information for broadcast. In summary, spectator interface 225 provides the game feed to SLIVER server 240 for further game video capture and processing. Having access to the spectator interface allows SLIVER server 240 to obtain game play data without or only minimally modifying the original computer video game.

Caster 230 facilities actions by broadcasters and provides the program feed to SLIVER server 240. A broadcaster may be a person or a software engine based on artificial intelligence. A broadcaster may be a commentator who has in-depth knowledge of the game and the players to easily identify what players are doing or planning to do within the game, and to provide play-by-play explanations of game tactics deployed. Caster 230 may provide multiple interfaces to allow commentators to see what the players and/or the spectators see. Caster 230 may also allow broadcasters to explore the game play or the game world freely. A broadcaster may alternatively take on the role of a camera man in regular sports, manipulating virtual cameras within the source game to make sure spectators understand events occurring in the game play. Such "camera work" is crucial to the production of a great tournament event. In some embodiments, caster 230 may be modified to allow virtual camera control configurations by SLIVER server 240, enabling new, novel, or easily overlooked or omitted viewing perspectives to be used for game play capture.

In some embodiments, through the program feed from caster 230, SLIVER server 240 may further extract visual, audio, or metadata cues for gaming moment identification. For example, a sudden rise in the tone of a commentary may indicate that an exciting moment has occurred. Similar visual, audio, and/or metadata cues may be extracted from the stadium feed transmitted by live stadium server 235 as well.

Live stadium server 235, as the name implies, may capture and process actions or reactions from a spectating crowd. Such stadium feed provided to SLIVER server 240 may be further processed and spliced into tournament videos for showing on the stadium screen, or for streaming to remote spectators.

Moreover, in some embodiments such as shown in FIG. 2, SLIVER server 240 may comprise one or more capture servers 250, one or more composite servers 260, and one or more highlight and special effects servers 270. A capture server may use one or more dedicated Graphical Processing Units (GPUs) to capture game video recordings from the game feed, to render portions of a local game play, possibly in 360 degrees, and to capture game environment and game players together or separately for spherical video generation.

A composite server may combine multiple video segments or multiple video streams and corresponding game metadata to generate game videos for streaming and replay. For example, a composite server may generate picture-in-picture displays of 2D broadcasts superimposed on 360 spherical media, according to embodiments discussed in priority applications U.S. Pat. Nos. 9,573,062 and 9,473,758, issued to the same inventors as this application.

In some embodiments, composite servers 260 may splice game feed, program feed, or stadium feed to create broadcast video streams with or without picture-in-picture displays. In some embodiments, composite servers 260 may combine media broadcasts with highlight clips generated by highlight and special effects servers 270. In some embodiments, spherical media broadcast is created through SLIVER server 240, and the highlight clips may be of spherical formats as well.

Highlight and special effect servers 270 may utilize machine learning and/or machine vision algorithms to auto-detect particular game events, scenes or moments of interest, and generate highlight videos, with or without highlight effects such as slow-motion or close-up with fly-by camera angles. Such highlight videos may be broadcasted or streamed on its own, may be spliced back into a live stream, or may be made available to tournament and league operators to incorporate into existing broadcast to game video streaming and sharing platforms, such as Twitch and YouTube.

In the present disclosure, a highlight of a game play refers to media clips or recordings that feature or focus on one or more particular periods of time, or moments, during a game play, often extending over auto-determined or user-identified gaming events that are either exciting, memorable, or of special interest to viewers. A gaming event or moment is generally associated with a timestamp and/or a location with a game map of the source computer game. A highlight video may comprise screencasts captured using pre-existing virtual cameras within the game world, game play captured by inserted virtual cameras from viewing perspectives different from those shown during an initial broadcast, highlight effects, augmentations, or game video segments generated using any other suitable video processing techniques that make the highlight video attractive to spectators and the like. Exemplary highlight effects include spatial scaling, temporal scaling, visual special effects, augmentations, or any other processing techniques that make the highlight video different from a static screencast of the original game play. Examples of spatial scaling includes zoom-in, zoom-out, preview close-up, and the like. Examples of temporal scaling includes time freeze, time-lapse, slow-motion, and the like. Examples of visual special effects include bullet-time, glitch effect, exposure effect, noir effect, morphing, stitching, optical effects, and the like. Augmentations or annotations may be performed to supplement the highlight video with game metadata or other available game information. For example, annotations may be provided by the SLIVER system, by broadcasters, or even spectators; augmentation may also be provided by marking the location and field-of-view of an active player, and overlaying game statistics on a video. In different embodiments, augmentations or annotations may be provided in audio and/or visual forms.

Figure 3:
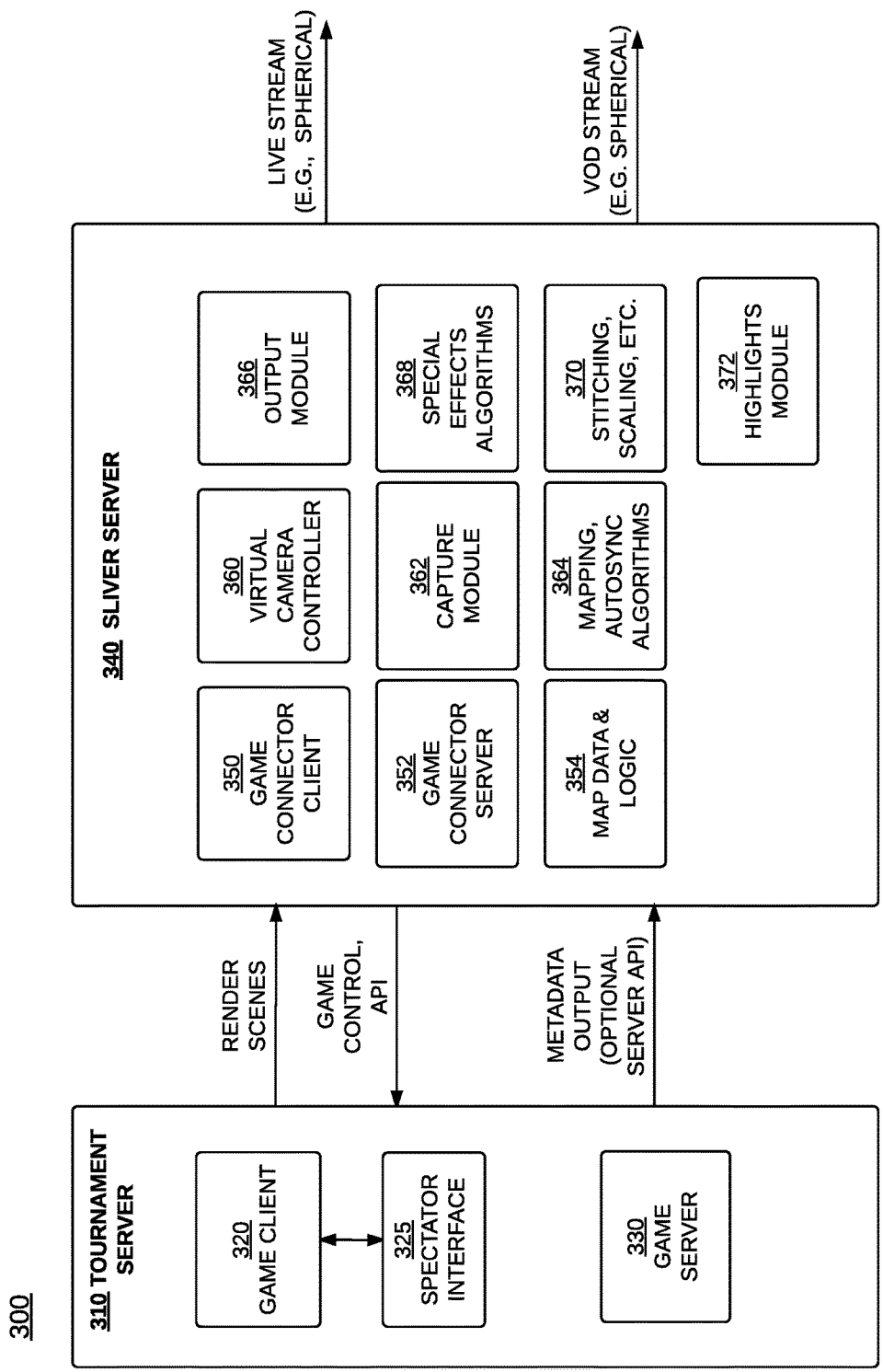
FIG. 3 is a schematic diagram showing the overall architecture of game and system servers for game video generation, according to one embodiment of the present invention.

FIG. 3 is a schematic diagram showing the overall architecture 300 of game and system servers for game video generation and processing, according to another embodiment of the present invention. In this embodiment, a tournament server 310 provides game data such as metadata and rendered scenes to SLIVER server 340, and in turn receives game control information as well as API handles for game or tournament configuration and other functions necessary for running a game play and capturing recordings of the game play. Such game control data may include virtual camera control signals and other game capture configuration parameters.

In various embodiments of the present invention, SLIVER servers 340 may comprise multiple modules, components, or dedicated servers, including, but not limited to, game connector client 350, game connector server 352, game map data and logic analyzer 354, virtual camera controller 360, capture module 362, mapping and autosyncing algorithms 364, output module 366, special effects algorithms 368, post-processing server 370 for performing functions such as stitching and scaling, and highlights module 372. Although not shown explicitly in FIG. 3, each individual module of SLIVER server 340 may be interconnected to other modules to share control and game data, and each individual module may be implemented on physically or logically separate devices.

More specifically, game connector capture client 350 and game connector server 352 may be viewed as a conversion tool, which can transform input visual or non-visual game recordings such as CounterStrike demo files into raw video recordings that may be further analyzed or processed to detect critical gaming moments, and to generate 2D, 3D, or spherical media for live or on-demand streaming.

Map data and logic analyzer 354 may analyze different areas of a game map or minimap, to determine optimal virtual camera locations that are more likely to capture exciting or critical gaming moments during a game play.

In some embodiments, map data and logic analyzer 354 may collaborate with other components such as mapping and autosyncing algorithms 364, capture module 362 and/or highlights module 372 to conduct auto-detection of one or more optimal virtual camera locations even before a game play is initiated, by analyzing map or game data as provided by game developers or tournament operators, or by leveraging computer vision as well as other machine learning algorithms applied to previously recorded game plays or the game environment itself. Such identified virtual camera locations may be considered "pre-determined" relative to the game play, and the identified optional game virtual camera locations may or may not coincide with virtual camera locations within the game map as originally provided by the game developers. In some embodiments, pre-determined locations may refer to user-identified or user configured locations. In yet some embodiments, locations may be considered "pre-determined" relative to particular gaming moments; in other words, any virtual camera inserted, activated, or configured before or when a gaming event or moment takes place, even after initiation of the overall game play, may be considered "pre-determined." In some embodiments, each predetermined location may be a static location within a game map, a tracking location associated with a game player, a tracking location associated with a game object, a dynamic location that may be controlled by a game broadcaster, or a dynamic location that may be controlled by a spectator. In some embodiments, virtual cameras may be inserted into the source computer game at the identified optional virtual camera locations using an SDK such as SLIVER SDK 425 shown in FIG. 4 or a game connector module, such as game connector client 350 and game connector server 352.

Furthermore, in some embodiments, auto-detection or auto-identification of optimal virtual camera locations may be conducted live during a game play, again by leveraging computer vision and/or other machine learning algorithms to determine highlight metadata based on extracted visual, audio, and/or metadata cues, then identifying critical gaming moments based on the generated highlight metadata, and finally identifying optimal locations for placement of highlight virtual cameras based on the highlight metadata. Such optimal locations may broadly refer to static or tracking positions, as well as dynamic virtual camera trajectories. Each virtual camera trajectory may be further associated with at least one movement speed function of the trajectory, and one capturing angle function of the trajectory, where a given virtual camera that moves along a given trajectory may move according to the movement speed function and the capturing angle function. Again, such highlight virtual cameras may be inserted into the source computer game at the identified optional virtual camera locations using an SDK such as SLIVER SDK 425 shown in FIG. 4 or a game connector module, such as game connector client 350 and game connector server 352. In some embodiments, sets of highlight virtual cameras and game virtual camera may overlap, where a single virtual camera or virtual camera array may function as either or both.

As discussed, computer vision and other machine learning algorithms may be applied to the game environment, previously recorded game plays, or live game plays for highlight metadata generation, possibly based on extracted visual, audio, and/or metadata cues, in different embodiments of the present invention. Examples of such algorithms include, but are not limited to edge detection, feature extraction, segmentation, object recognition, pose estimation, motion analysis, liner and non-liner transforms in time, spatial, or frequency domains, hypothesis testing, decision trees, neural networks including convolutional neural networks, vector quantization, and many others. Moreover, historical data including statistics from multiple game plays may be correlated and/or analyzed, possibly together with live game play data, to determined virtual camera locations for gaming moment capturing and highlight video generation. For example, virtual cameras may be inserted around areas where a competing player is most likely to get killed, where a visually-spectacular event is most likely to happen, or along a path or lane that is most critical for winning a game. In some embodiments, such historical data may be player-specific, team-specific, or be classified or selected based on predetermined or configurable conditions.

Virtual camera controller 360 may insert virtual cameras and virtual camera arrays into a source computer game at optimal virtual camera locations, before and/or during a game play, and subsequently activate, control, or configure such virtual cameras or virtual camera arrays as needed. A virtual camera array is a set of virtual cameras configured in a video game to record the virtual world in a wide viewing angle, possibly in 360 degrees horizontally and 180 degrees vertically. A virtual camera array includes one or more virtual cameras, each facing a different direction. Similar to physical camera arrays, a virtual camera or a virtual camera array may be associated with a location within a game universe or game world, and each virtual camera may be characterized in terms of orientation, viewing angle and focal length, zoom factor, and the like. In the present disclosure, a location refers to a point, place, position, or extent in a game space or game world, and may be fixed or anchored relative to other objects, bots, or entities within the game world. Thus, an immovable position associated with a fixed coordinate may be considered a location within the game world; a movable position associated or anchored to a moving player avatar, a moving gadget, or object may also be considered a location within the game world. In some embodiments, at least one virtual camera is inserted by SLIVER servers 340 into the source computer game hosted on tournament server 310 before a game play is initiated, to monitor places or paths around which exciting or critical gaming moments are more likely to occur. In some embodiments, only virtual cameras as originally provided by the source computer game are used for monitoring purposes. In some embodiments, the virtual camera is inserted by SLIVER servers 340 into a local game play hosted internally on SLIVER server 340 instead, without affecting the original source game play in anyway. More virtual cameras or virtual camera arrays may be inserted into the source game play on tournament server 310 or a local game play within SLIVER server 340 during a live game play. Such virtual cameras may be called "highlight virtual cameras" as they capture video recordings that are used for highlight cue identification and may be used to generate highlight videos. Again, each highlight virtual camera may be associated with a particular location, or move along a dynamic virtual camera path or trajectory as computed by SLIVER 340, utilizing different component modules shown in FIG. 3. A virtual camera trajectory may also be associated with functions of virtual camera characteristics such as camera movement speed, orientation, and zoom factor, some or all of which may be based on a desired highlight effect to be used. For example, a slow-motion ("slow-mo") highlight effect would require a virtual camera trajectory that follows an original virtual camera path, but where a highlight virtual camera moves with half the original movement speed. In this particular example, if the highlight virtual camera also uses exactly the same camera characteristics such as camera angle and zoom factor, the slow-motion highlight effect may alternatively be achieved by direct processing of originally captured video recordings of the game play, as received through the game feed, without additional virtual camera configurations, by a temporal scaling of the captured video recording. However, if a full 360-degree view is desired, a virtual camera array may be inserted along the known trajectory for gaming moment highlight. In another example, a bullet-time effect may require either a rig-shaped virtual camera array where all virtual cameras capture an instant of a gaming moment simultaneously. Alternatively, the bullet-time effect may use a single virtual camera that moves in a circular trajectory around the gaming event to be captured, at a relatively fast speed, as if the gaming event has been temporarily paused for the bullet-time effect to be captured.

Capture module 362 may perform game environment or game play captures using virtual cameras or virtual camera arrays that originally existed in the source computer game, or are inserted by SLIVER server 340 before a game play is initiated, or during an active game play. "Capture" or "record" within a virtual game world refers the saving or storage of rendered game graphics data, with or without explicit graphical displays on a computer device.

Mapping and auto-syncing algorithms 364 may analyze the program feed in real-time, apply computer vision or other machine learning algorithms to determine the location of the current or the first point-of-view player, and identify one or more best or optimal locations of virtual cameras or virtual camera arrays to capture actions in and around this player. Similarly, in some embodiments, mapping and auto-syncing algorithms 364 may be configured to determine the location of players not shown on screen, and identify optimal virtual camera locations in and around such off-screen players.

Output module 366 may function similar to composite server 260 in combining game feed, program feed, stadium feed, post-processed game recordings, and generated game highlights into one or more output data stream, for live or on-demand streaming. Again, game highlight videos may be broadcast or streamed on its own, or may be spliced back into a live stream, or be made available to tournament and league operators to incorporate into existing broadcast to game video streaming and sharing platforms, such as Twitch and YouTube. Thus, output data from output module 366 may be audio, video, in 2D, 3D, and/or 360 spherical media formats, and may comprise static game video screencasts, game moment highlights, broadcast commentaries, and the like.

To generate highlight videos of critical gaming moments of a game play, special effects algorithms 368, post-processing server 370, and highlight module 372 may collaborate in the overall generation process and function similar to SLIVER highlight & special effects servers 270 shown in FIG. 2. Map data and logic analyzer 354, capture module 362, and mapping and autosyncing algorithms 364 may also be involved in this process. For example, intelligent machine learning and/or computer vision algorithms may be first used to extract highlight cues, which in turn assist in the auto-detection of particular game scenes or game moments of interest. Highlight effects may then be applied, including image or video stitching and scaling, which may group multiple captured critical gaming moments into a single game highlight video, or make the game highlight video into 360 spherical formats. Each of map data and logic analyzer 354, capture module 362, and mapping and autosyncing algorithms 364, special effects algorithms 368 and post-processing server 370 may be a sub-component of highlight module 372 in different embodiments of the present invention. Again, highlight effects include spatial scaling, temporal scaling, visual special effect, augmentation, and many others. In different embodiments, special effects algorithms 368 may be used to perform any desired type of highlight effect, or may be used to perform visual special effects only.

Figure 4:
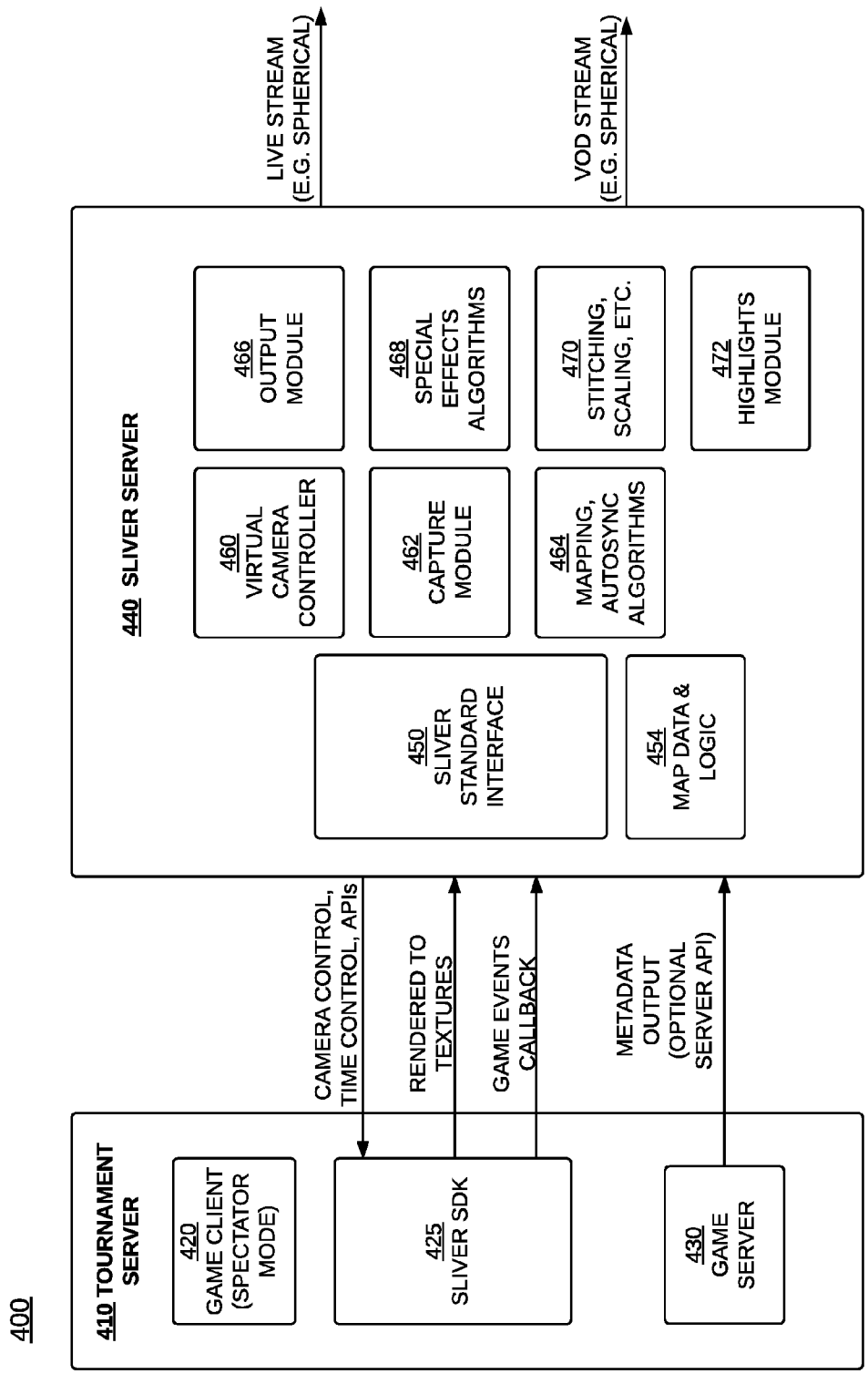
FIG. 4 is another schematic diagram showing the overall architecture of game and system servers for game video generation, using integrated Software Development Kits (SDKs), according to another embodiment of the present invention.

FIG. 4 is another schematic diagram showing the overall architectures 400 of game tournament server 410 and SLIVER server 440 for game video generation and processing, using integrated Software Development Kits (SDKs), according to another embodiment of the present invention. In this embodiment, SLIVER server 440 also comprise multiple modules, components, or dedicated servers, including, but not limited to, SLIVER standard interface 450, game map data and logic analyzer 454, virtual camera controller 460, capture module 462, mapping and auto-syncing algorithms 464, output module 466, special effects algorithms 468, post-processing server 470, and highlight module 472. Again, each individual module of SLIVER server 440 may be interconnected to other modules to share control and game data, and each individual module may be implemented on physically or logically separate devices.

In the particular embodiment shown in FIG. 4, tournament server 410 comprises a game client 420, a SLIVER SDK 425, and a game server 430. Game client 420 may be configured into a spectator mode to provide functionalities similar to those performed by spectator interface 225, caster 230, and live stadium server 235 shown in FIG. 2. SLIVER SDK 245 is integrated into the tournament server 410 to interface with SLIVER server 440. A Software Development Kit (SDK) is a set of software development tools or programming packages for creating applications for a specific platform. An SDK may be compiled as part of the developed application to provide dedicated interfaces and functionalities. Alternatively, an SDK may be an individually compiled module, incorporable into an existing game on a user device as a plug-in, add-on, or extension in order to add specific features to the game without accessing its source code. In this embodiment, SLIVER SDK 425 may be used to insert virtual cameras or virtual camera arrays into the source computer game, while also collaborating with SLIVER server 440 through SLIVER standard interface 450 to control such virtual cameras for game video and game highlight video generation. For example, SLIVER SDK 425 may receive camera control data, time control data, or API handles for game or tournament configuration and other functions necessary for capturing recordings of the game play. SLIVER SDK 425 may also provide rendered textures and game event callbacks to SLIVER server 440.

As another detailed example for highlight video generation, the following embodiment may be implemented for highlight modules 372 or 472. In this embodiment, highlight modules 372 or 472 may comprise one or more of three sub-modules for automatic gaming moment detection and highlight generation, including a highlight analyzer sub-module, a replay capture sub-module, and a highlight post-processor sub-module.

The highlight analyzer sub-module may have two functionalities. First to automatically detect one or more critical gaming moments, and second to determine a best camera trajectory to capture the one or more critical gaming moments. Again, auto-detection may be based on map data and logic analysis, and may be conducted by first leveraging computer vision and similar machine learning algorithms to identify highlight metadata based on extracted visual, audio, and metadata cues, then identifying critical gaming moments based on the generated highlight metadata. Gaming moment detection may also be done via callback hooks if an SDK such as SLIVER SDK 425 is integrated with the game on a game server or a tournament server such as server 410. Each gaming moment may be associated with a timestamp and/or location within a game map of the source computer game. With such timestamp and location information, the highlight analyzer sub-module may determine best camera trajectories in the virtual game world to best capture the critical moments. One example of the camera trajectory is the "bullet-time" trajectory. Such trajectories may be determined based on a desired highlight effect, which may in turn depend on a type of the game being played, and a type or category for the captured critical gaming moment. In some embodiments, historical game play data may be used for game moment determination and virtual camera trajectory computation as well.

The replay capture sub-module may then receive camera trajectory information from the highlight analyzer sub-module and interact through a game connector with either spectator interface 325, game client 420, or SLIVER SDK 425 to capture a game play following the given camera trajectory. Such a game play may be live, where data may be buffered for analysis and direct post-processing by the SLIVER server. Such a game play may be a local game play or local "gaming moment" play, where the gaming moment of interest is configured and replicated according to received game play data, but with new virtual cameras inserted accordingly to the computed virtual camera trajectories. One exemplary camera trajectory is for a kill event in a first-person shooter game, involving a slowdown and zoom into the killing moment. Another example of a camera trajectory is for multiple-kills, which not only involve a slowdown and zoom into each killing moment, but also speedup transitions between individual kills. Such camera trajectory may also be viewed as a group, set, or collection of multiple sub-trajectories. The captured game play may be either a 2D, 3D, or a 360-spherical video footage. For the same critical gaming moment, multiple cameras or camera arrays may be used to capture the scene from different perspectives.

Raw footage output by the replay capture sub-module may then be sent to the highlight post-processor sub-module. In some embodiments, this highlight post-processor sub-module is realized using special effects algorithms 368 and post-processor 370 shown in FIG. 3. The post-processor sub-module may apply a set of special effects or video post-processing algorithms such as filtering and augmentation. For example, for the multiple-kill gaming moment example, instead of having multiple trajectories associated with different movement speeds, each virtual camera may be configured to capture the kill scenes using the same movement speeds in one embodiment of the present invention. The post-processor sub-module may then slowdown and digitally zoom into the killing moment, or speedup the video footage between the kills. Also, examples of augmentation include marking the location and field-of-view of an active player, and overlaying game stats on a video.

In yet some embodiments of the present invention, the SLIVER system may automatically curate one or more videos comprising replay highlights from the entire duration of a game play. In some embodiments, the system automatically generates highlights in real-time, and automatically generates a just-in-time video highlight of the game play through the present moment. In some embodiments, the replay highlights videos are shared in real-time, just-in-time, or in video-on-demand (VOD) format. In yet other embodiments, a broadcaster may edit, modify, and curate his or her own compilation of highlights, either in real-time, just-in-time, or after the fact.

In some embodiments, tournament operators may automatically, manually, or in some combination, generate, distribute, and advertise their tournaments using replay highlight videos thus created. In some embodiments, the SLIVER system may connect to conventional media networks or social media networks, such as Facebook, game forums, developer forums, and so on, and may automatically distribute replay highlights to potential users or viewers such as tournament operators, media partners, influencers, social network users, and other end-users. In some embodiments, replay highlight videos distributed may automatically link back to the source game tournament, game tournament sponsors, or participating teams, and allow potential viewers to either live-stream the current game tournament, or view past recorded game tournaments. This creates valuable viral loops in which new users join the service. In some embodiments, replay highlight videos are distributed via channel partners to other game sites, or inserted as advertisements into other videos.

In yet some embodiments, one or more viewers can specify important game actions, and direct the system to highlight certain game actions or game moments. In some embodiments, one or more viewers can vote highlight videos up or down or score different aspects of highlight videos, thus providing feedback to machine learning algorithms driving the highlight generation module.

Figure 5:
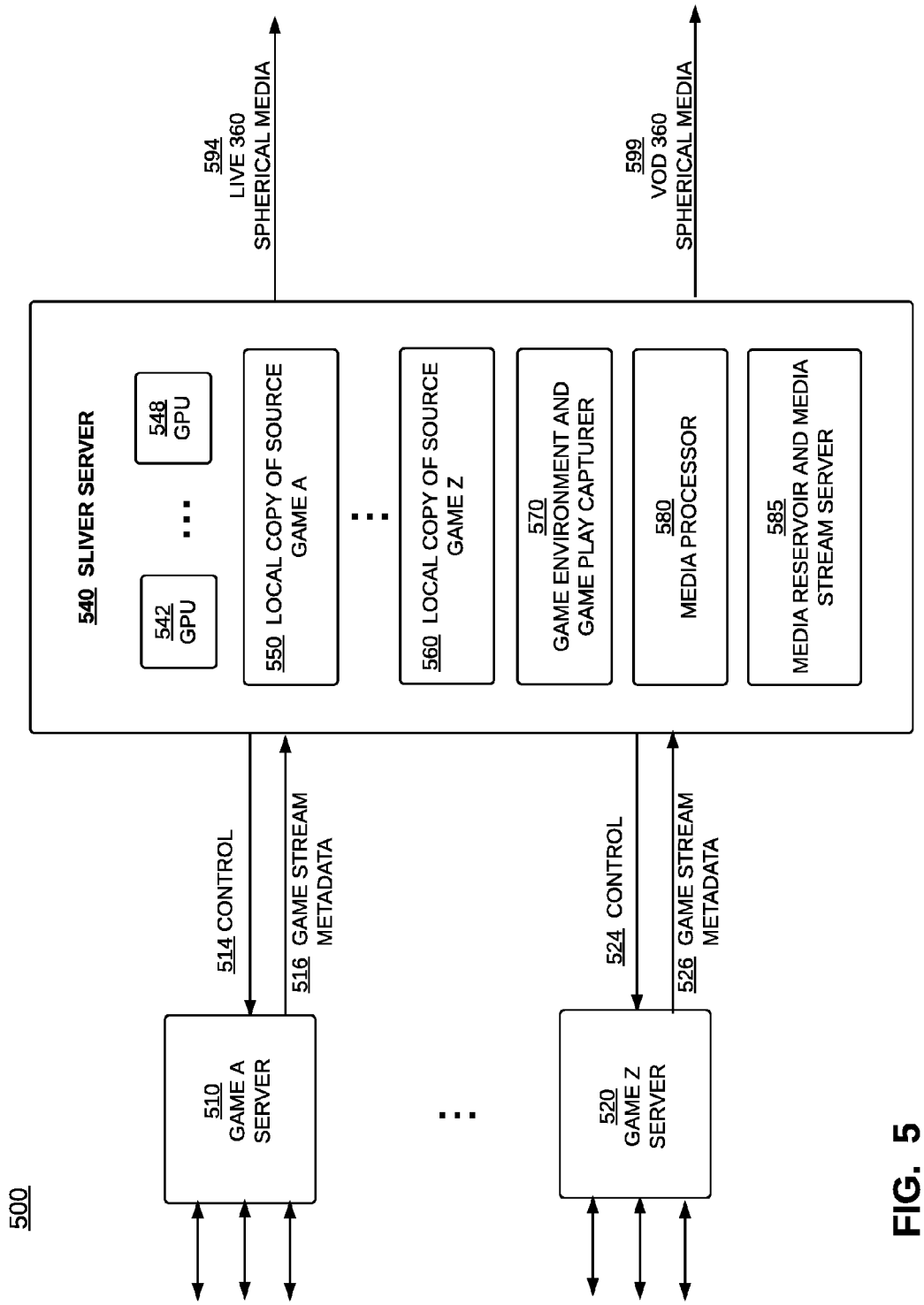
FIG. 5 is a schematic diagram of a server for spherical game video generation, according to one embodiment of the present invention.
Figure 6:
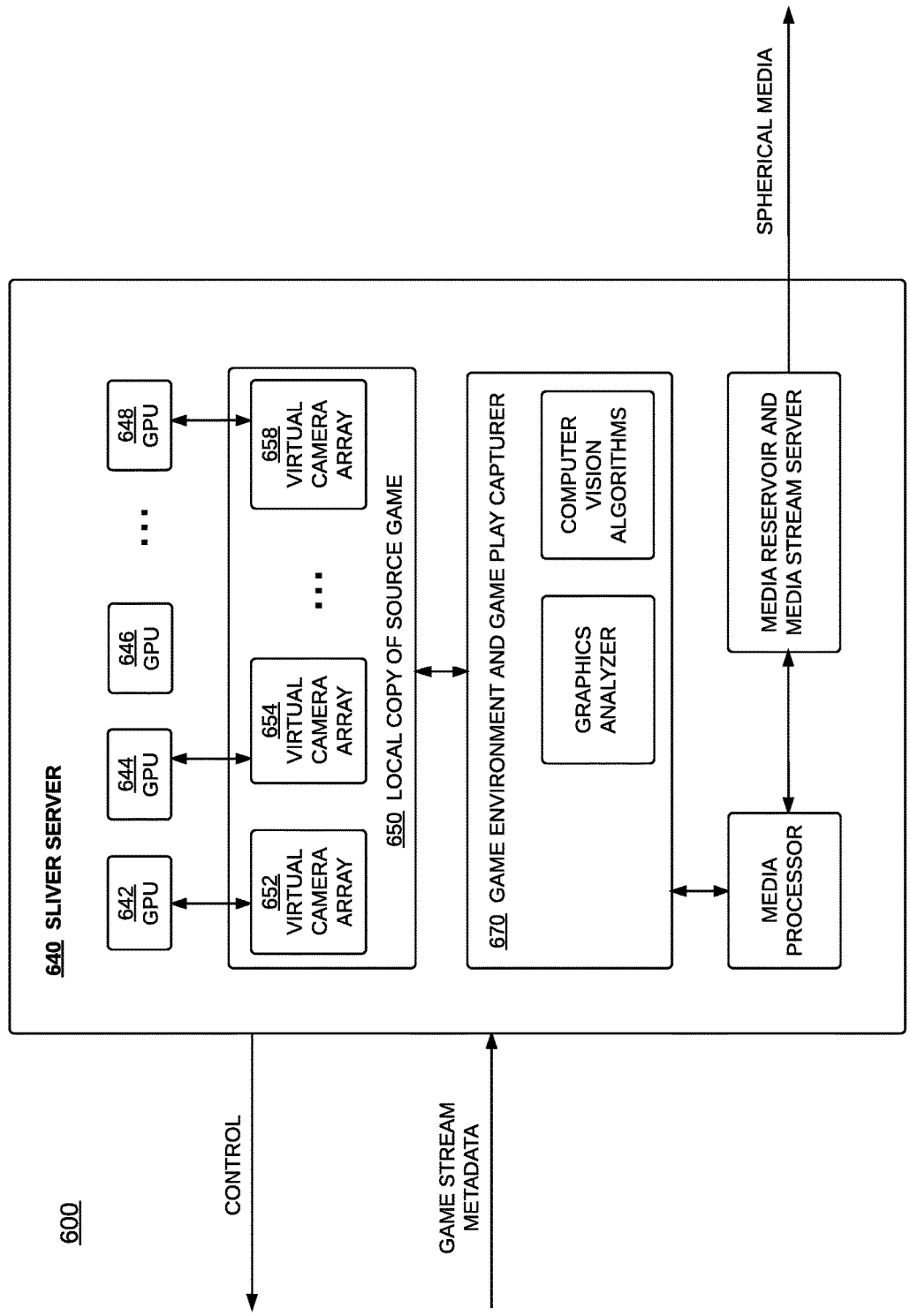
FIG. 6 is another schematic diagram of a server for spherical game video generation, according to another embodiment of the present invention.

While FIGS. 2, 3, and 4 provide exemplary embodiments for generating highlight videos which may or may not be in 360-spherical formats, FIGS. 5 and 6 provide additional illustrative systems 500 and 600 for spherical game video generation, respectively, similarly utilizing new and novel virtual camera locations and additional viewing perspectives. In the embodiment shown in FIG. 5, a SLIVER server 540 is connected to one or more game servers such as 510 and 520. SLIVER server 540 may comprise one or more dedicated graphical processing units 542 and 548, local copies 550 and 560 of one or more source games, a game environment and game play capturer 570, media processor 580, and components for general media hosting services such as media reservoir and media stream server 585. In some embodiments, additional services such as user login and management, and video search, ranking, rating, and commenting, are also provided through SLIVER server 540. In some embodiments, game environment and game play capturer 570 is integrated with local copy 550 of source game A, such that video may be rendered in VR mode directly, and media processor 580 may become optional. Game servers 510 and 520 may host source computer games and produce game metadata of source game plays for upload to SLIVER server 540. System 500 as disclosed herein may produce spherical videos for VR streaming and replay with minimal modifications to existing source games, minimal performance impacts on source game plays, in real-time or in an off-line fashion, and minimal data transmission overheads.

As previously discussed, in the present disclosure, a source computer game may be a mobile, desktop, or console 2D or 3D game played in first-person or third-person perspectives, and may lack spherical video output. Some examples of such source computer games include first-person shooter games Counter Strike and Call of Duty, online battle arena games League of Legends and Dota2, and sandbox game Minecraft. Several existing games offer killcam and deathcam functionalities to show a player's death from a killer's perspective, or to show a killer's state upon a player's death. Nonetheless, both provide only limited video sequences with limited field of views, without spherical video output for a viewing user to explore. In some other embodiments, a source computer game may be an existing VR game with spherical video output, to be played in immersive mode with a simple or a professional VR headset. Generally, VR games are played in a first-person perspective, where a player's locomotion is detected and incorporated into the corresponding monoscopic or stereoscopic VR display during a game play, so a player experiences simulated vision, hearing, and haptic feedbacks firsthand. Nonetheless, as virtual cameras in VR games generally track an active player only, game viewers such as broadcasters and spectators are often unable to watch the game play from other optimized or customized viewing perspectives. Again, the SLIVER platform as disclosed herein expand such limited fields of views or limited viewing perspectives by capturing game plays from other pre-determined or user-configured virtual cameras and virtual camera arrays, through automatically generated or pre-configured trajectories, thus allowing game viewing from new, optimized and customized perspectives. Resulting spherical media such as 594 and 599 may be subsequently downloaded or streamed to view clients. A view client may be a standalone application dedicated to VR streaming and replay of spherical media. For example, it may be a mobile client application installed on a smartphone, or a display module loaded into a PC or game console connected to a VR headset. In some other embodiments, a view client is a plug-in, add-on, or extension to an application such as a web browser or a video game emulator, a gaming platform such as PlayStation or Xbox, a content-sharing platform such as Twitch or Facebook, or any other similar software or portals that may be used to distribute and view spherical media served by SLIVER server 540. In yet some other embodiments, a view client is a conventional general purpose video sharing platform, such as YouTube, Vimeo, Youku, and Bilibili, which may support content viewing in slidable panorama-360 mode.

FIG. 6 is another schematic diagram of a server for spherical game video generation, according to another embodiment of the present invention. SLIVER server 640 may host one or more local copies of source games, and employ a game environment and game play capturer 670 to control one or more virtual camera arrays 652, 654, and 658 embedded in a local copy 650 of the source computer game. Server 640 may employ one or more physical or logical GPUs to process visual data captured by individual virtual camera arrays. In this particular example, GPUs 642, 644, and 648 correspond in a one-to-one relationship to virtual camera arrays 652, 654, and 658, thus game environment and game plays captured by different virtual camera arrays may be handled concurrently by individual GPUs, and shots from more than one virtual camera arrays may be made available for streaming to multiple users.

Figure 7:
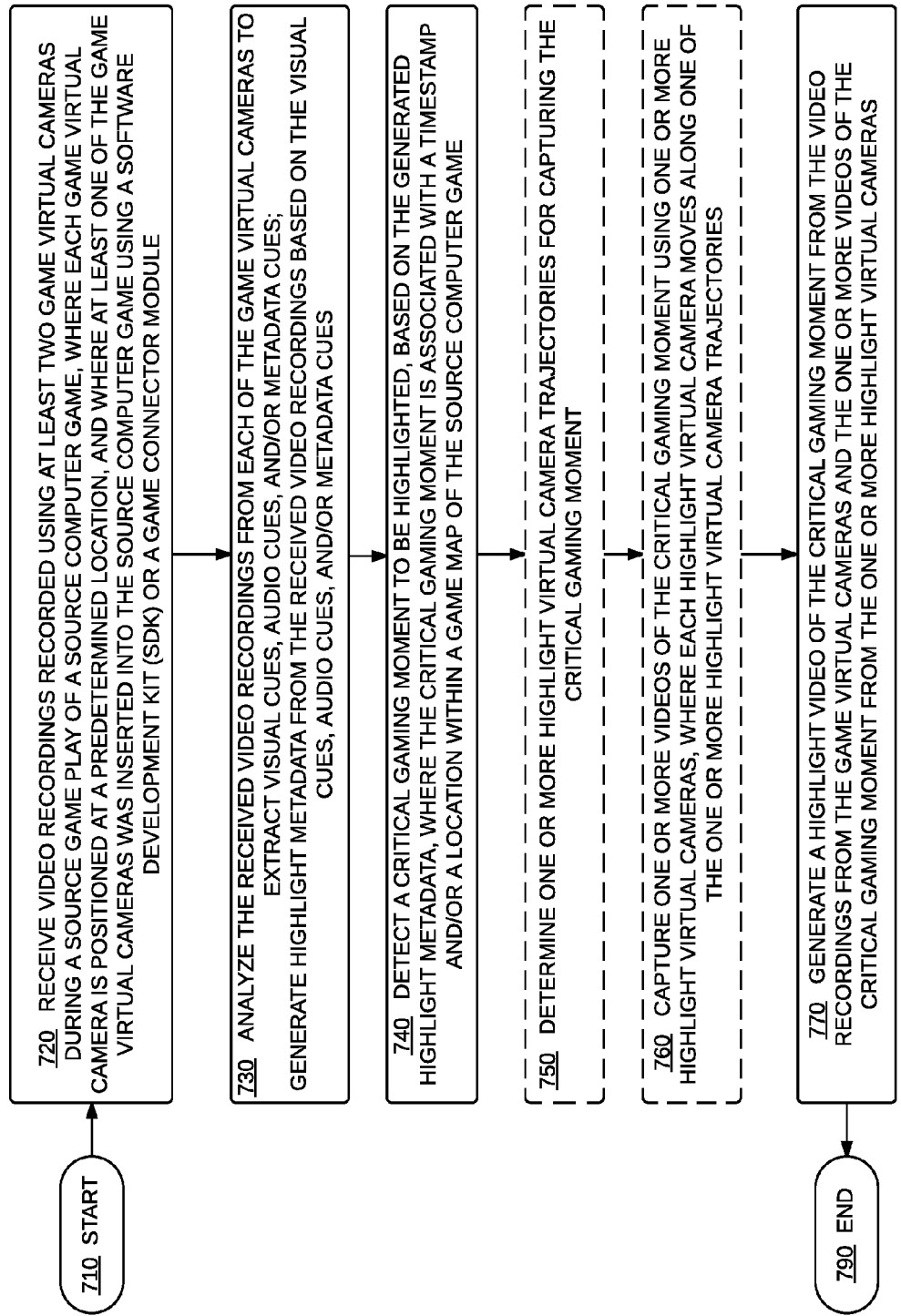
FIG. 7 is a flow diagram illustrating a process for generating a highlight video of a critical gaming moment, according to one embodiment of the present invention.

FIG. 7 is a flow diagram 700 illustrating individual steps in an exemplary process for generating a highlight video of a critical gaming moment from a source computer game, according to one embodiment of the present invention. Specifically, upon initiation at step 710, video recordings recorded using at least two game virtual cameras during a source game play of the source computer game are received at step 720, where each game virtual camera is positioned at a predetermined location, and where at least one of the game virtual cameras was inserted into the source computer game using a Software Development Kit (SDK) or a game connector module. At step 730, the received video recordings from each of the game virtual cameras are analyzed to extract visual cues, audio cues, and/or metadata cues, and highlight metadata are generated from the received video recordings based on the visual cues, audio cues, and/or metadata cues. At step 740, a critical gaming moment to be highlighted is detected, based on the generated highlight metadata, wherein the critical gaming moment is associated with a timestamp and/or a location within a game map of the source computer game. At step 750, one or more highlight virtual camera trajectories are determined for capturing the critical gaming moment. At step 760, one or more videos of the critical gaming moment are captured using one or more highlight virtual cameras, wherein each highlight virtual camera moves along one of the one or more highlight virtual camera trajectories. At step 770, a highlight video of the critical gaming moment is generated from the video recordings from the game virtual cameras and the one or more videos of the critical gaming moment from the one or more highlight cameras, before the overall process terminates at step 790. In some embodiments, steps 750 and 760 are optional.

An example for the process illustrated by FIG. 7 is for a first-person shooter game where an intensive ambush event may take place in a closed room. Through auto-configuration or user-selection, virtual cameras may be inserted at the four corners of the room, to detect the entrance of a player into the room through the door or through a window, which would signal that the ambush event may takes place soon. Additional virtual cameras may then be inserted or activated to capture the live actions in more detail, right before, during, and after the ambush event, tracking particular paths throughout the room or around the player, or to inject special effects into the capture video to generate a highlight clip.

A gaming moment may be a particular period of time extending over an auto-determined or user-identified gaming event that are either exciting, memorable, or of special interest to viewers during a game play. Thus, the gaming moment may start before the gaming event of interest takes place. Such a "premonition" of the gaming event for game moment capture may be enabled by the use of buffered data, where a SLIVER server may record and store game data including game metadata and video recordings for any duration, from a few milliseconds to an entire game play, for "post-processing" actions where such post-processing may occur with very little delay relative to the live game play. In some embodiments, the SLIVER server may utilize inherent transmission delays in a game broadcast to process game data, thus providing highlight videos in perceived real-time, or just-in-time. In addition, machine learning algorithms may be employed to see if particular triggering actions are expected, where thresholds and auto-signals may be used to predict is something might happen soon with high probability. Such machine learning algorithms may be trained using historical game play data and viewer feedbacks.

Figure 8B:
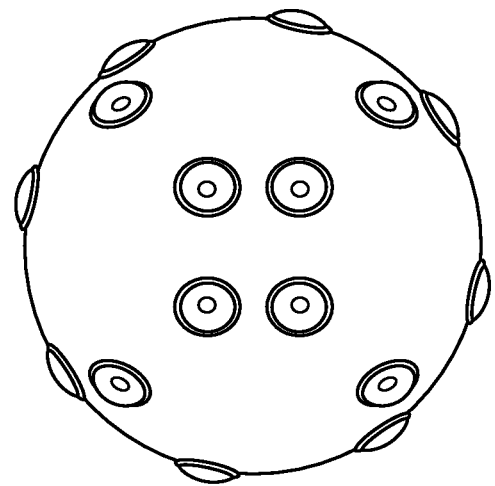
FIG. 8B is another illustrative example of a virtual camera array arrangement for 360-degree capture, according to one embodiment of the present invention.
Figure 8A:
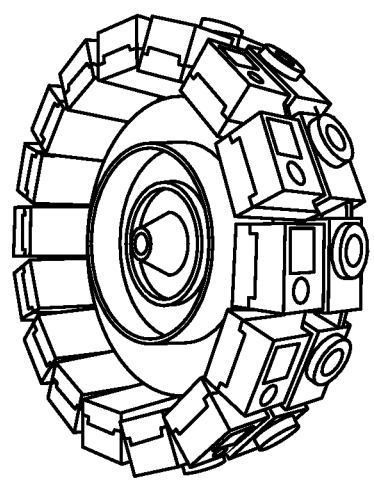
FIG. 8A is an illustrative example of a virtual camera array arrangement for 360-degree capture, according to one embodiment of the present invention.
Figure 8D:
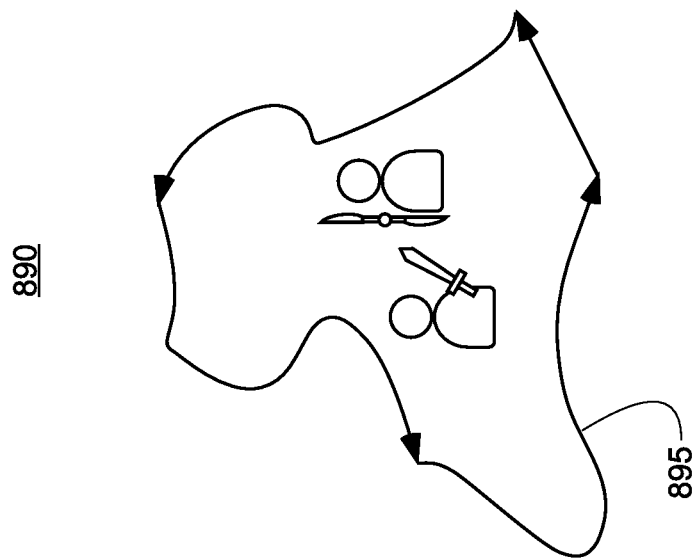
FIG. 8D is an illustrative virtual camera trajectory, according to one embodiment of the present invention.
Figure 8C:
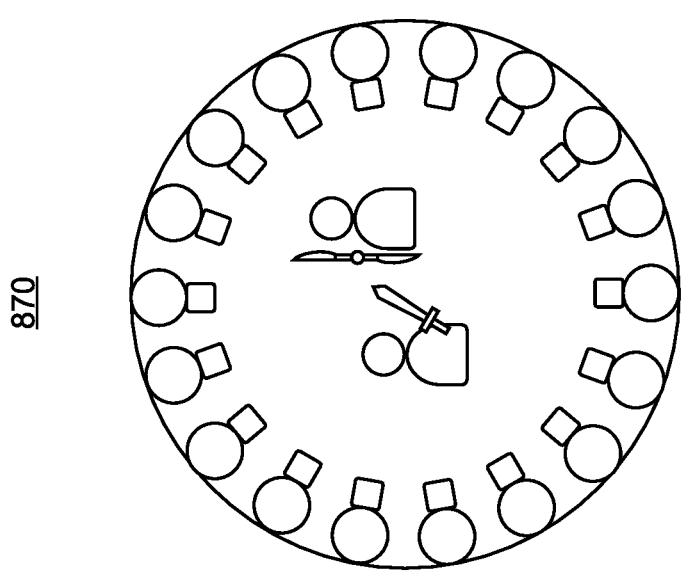
FIG. 8C is an illustrative example of a virtual camera array rig arrangement for 360-degree capture, according to one embodiment of the present invention.

FIGS. 8A, 8B, and 8C are illustrative examples of virtual camera array arrangements for 360-degree capture, according to various embodiments of the present invention. Virtual camera array 800 is a circular rig with sixteen virtual cameras, facing radically outward. Virtual camera array 840 is a spherical arrangement with twenty-four virtual cameras, sixteen of which are directly visible. Each virtual camera may have a viewing angle ranging from 45 to 170 degrees. While having a fewer number of virtual cameras may be more resource efficient, having a larger number of virtual cameras may reduce distortion captured by each camera. By comparison, virtual camera array rig 870 comprises eighteen virtual cameras arranged in a large circular fashion, each facing radically inward, to capture game actions that may happen within the given peripheral circle. Such a virtual camera array arrangement or formation enables 360-degree view of a battle scene and bullet-time capture. In addition, unlike real-world camera arrays where each of the eighteen cameras as shown in FIG. 8C may need to be physically present, in some embodiments of the present invention, a single virtual camera or a single virtual camera array may travel in real-time along a trajectory such as the peripheral circle shown in FIG. 8C, to provide close-up or fly-by perspectives as desired. Similarly, FIG. 8D provides an exemplary, non-limiting, virtual camera trajectory 895 for scene capture, in a counterclockwise fashion, surrounding a battleground, and moving closer or further away depending on desired viewing distances or viewing angles. Highlight video thus generated may provide 360-degree views in the form of spherical media, or may be conventional 2D or 3D videos. In various embodiments, a virtual camera or virtual camera array may travel along any pre-determined or auto-computed trajectories within the game universe, in 3-dimensional space, for example.

Highlight Effect Examples

As illustrative examples of highlight effects that may be performed by different embodiments of the present invention, two sets of screenshots are discussed below. A first set is for a game play of the multiplayer online battle arena game League of Legends; a second set is for a game play of the multiplayer shooter game Counter Strike: Global Offensive (CS:GO). Although not illustrated here, similar gaming moment capture and highlight effects may be applied to single player games as well.

Figure 9A:
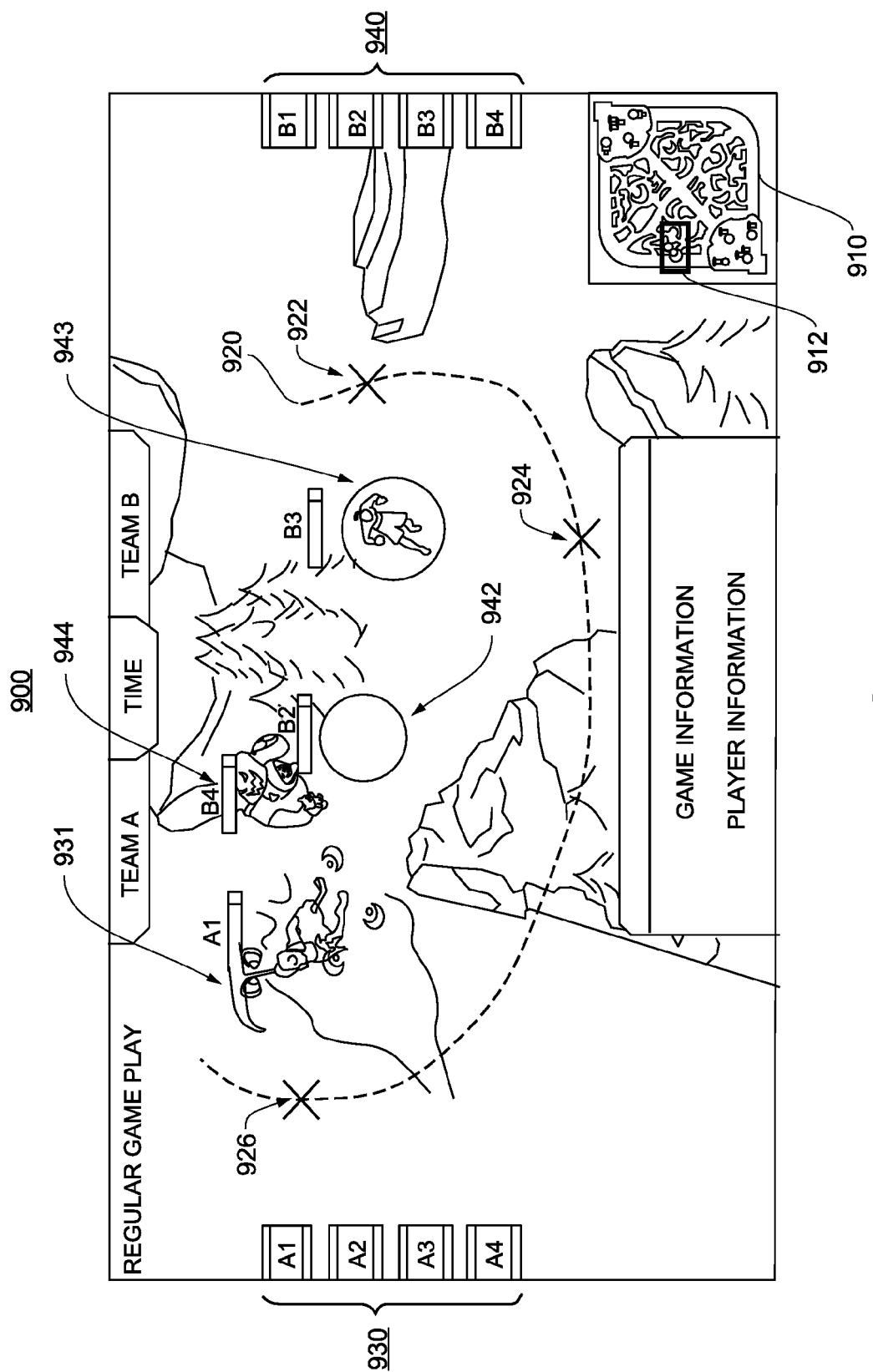
FIG. 9A is an exemplary screenshot of a regular game broadcast of a multi-player online battle arena game, according to one embodiment of the present invention.

FIG. 9A is an exemplary screenshot 900 of a regular game broadcast of the multi-player online battle arena game League of Legends, according to one embodiment of the present invention. Panels 930 and 940 on the left and right sides of the screenshot 900 list player information including player names A1, A2, A3, A4 for a Team A, and B1, B2, B3, and B4 for a Team B. Shown on screenshot 900 is a game scene taking place within area 912 of the minimap 910. Avatars for four players are visible, including player A1 931, player B2 942, player B3 943, and player B4 944. For illustrative purposes, a dotted path 920 has been added to the game broadcast to represent a possible virtual camera trajectory for recording a bullet-time effect highlight of the game play.

Figure 9B:
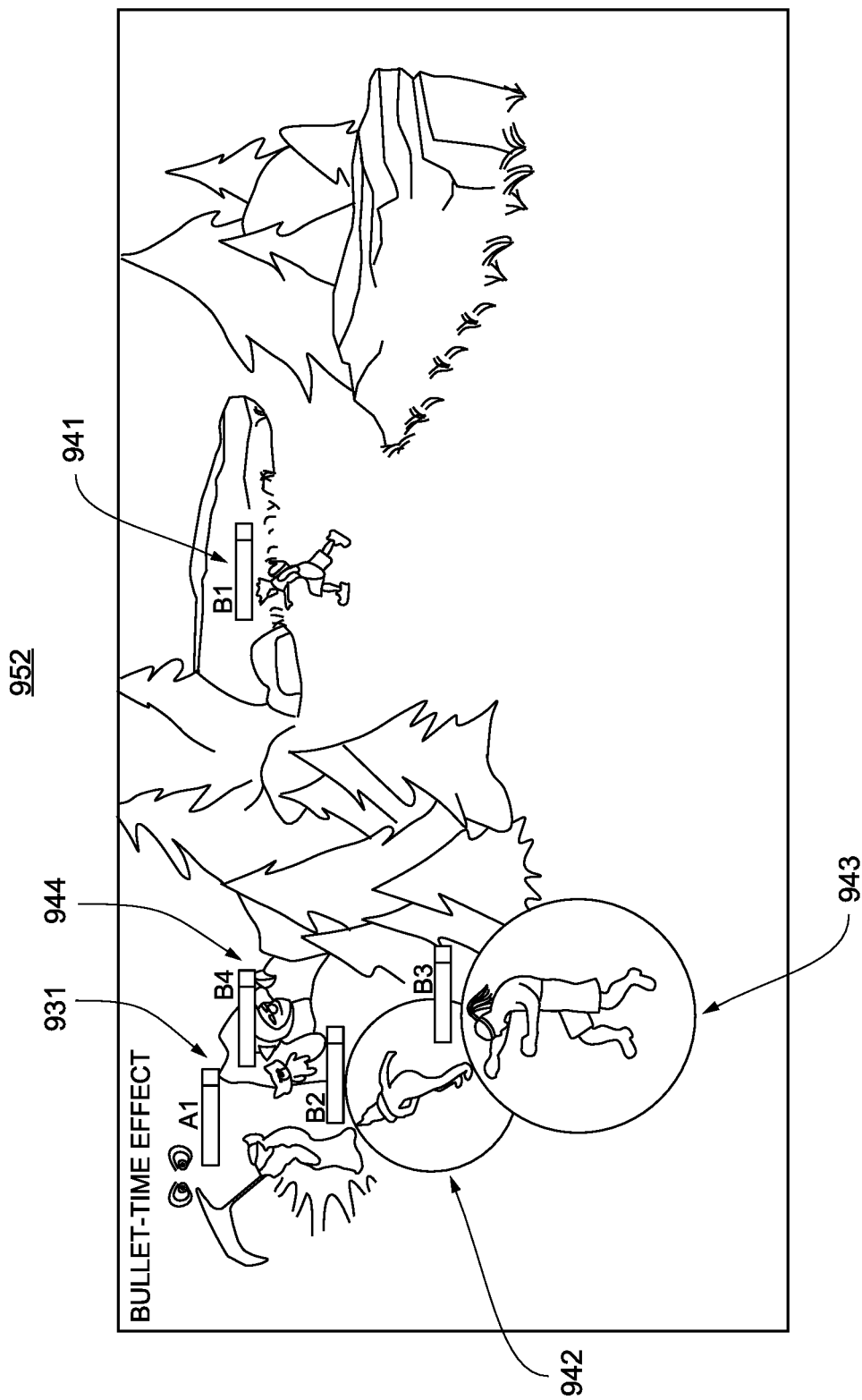
Figure 9C:
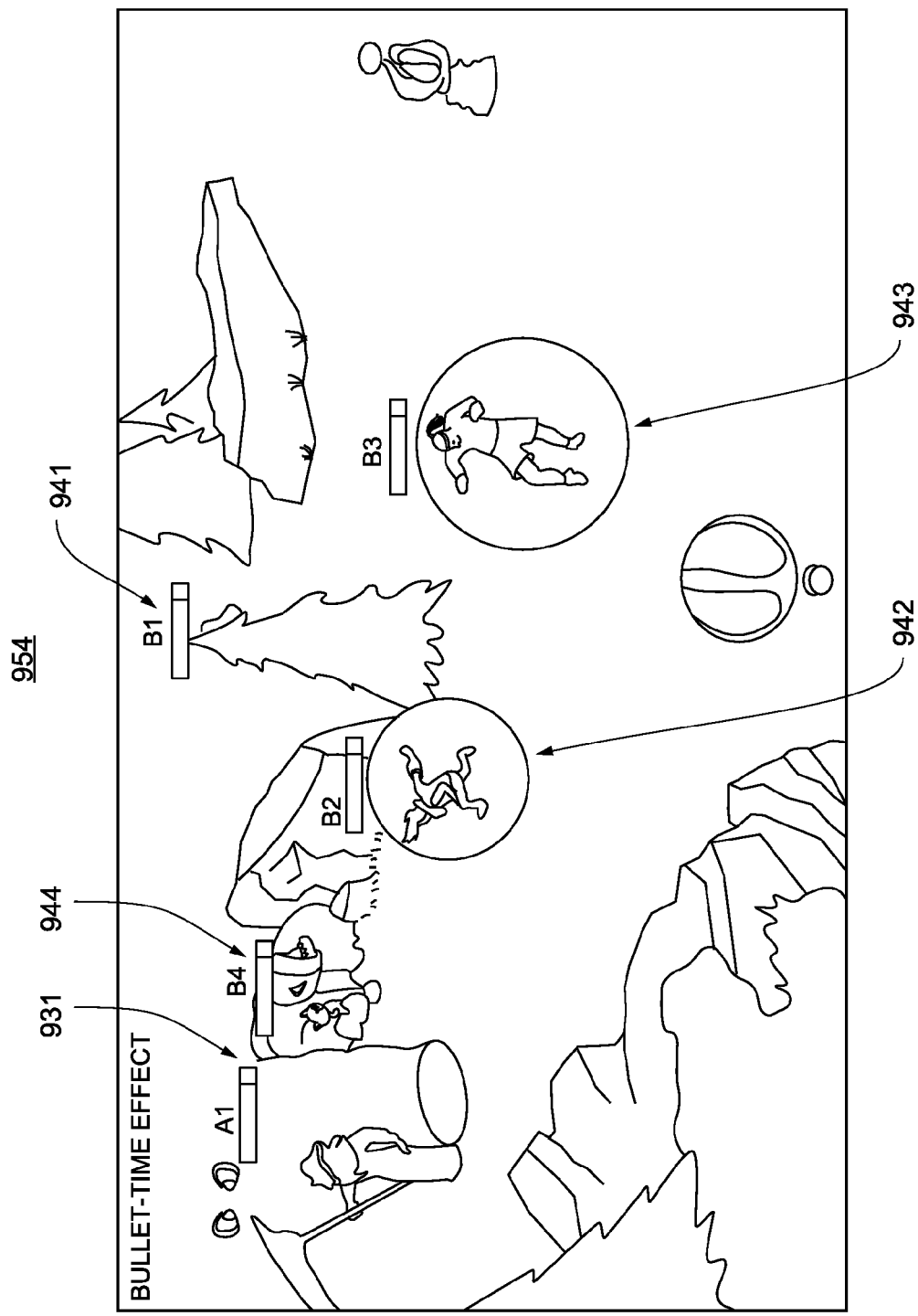

FIGS. 9B, 9C, and 9D are exemplary screenshots 952, 954, and 956 of a bullet-time highlight replay of the game play in FIG. 9A, captured at locations 922, 924, and 926, as a virtual camera pans-in or scans around the group of players shown, in a clockwise direction, along virtual camera trajectory or path 920. The virtual camera points radially inward along the trajectory. In screenshot 952 shown in FIG. 9B, player B1 941 not visible in screenshot 952 in FIG. 9A becomes clearly visible; in screenshot 954 shown in FIG. 9C, player B1 941 is still partially visible through the player information bar displayed on top of the player avatar. Thus, the SLIVER bullet-time effect shown in this example allows the viewer to see players and possibly other parts of the game world that would have otherwise been omitted or obstructed in a conventional screencast game video of a regular gameplay.

Figure 10:
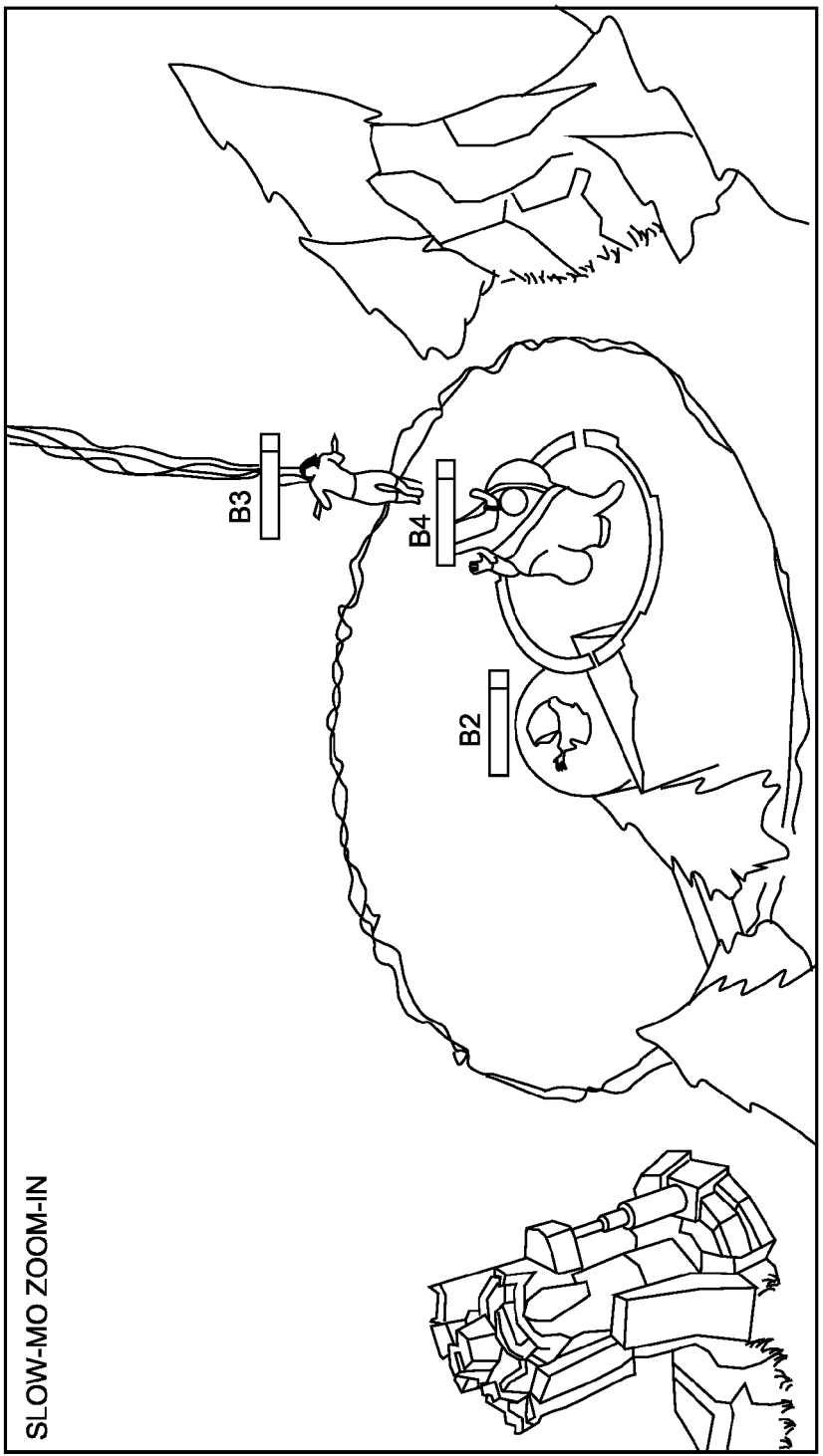
FIG. 10 is an exemplary screenshot of a slow-motion zoomed-in replay of a gaming moment in the game play referenced in FIG. 9A, according to one embodiment of the present invention.

Similarly, FIG. 10 is an exemplary screenshot 1000 of a slow-motion zoomed-in replay of a critical gaming moment in the same game play as referenced by FIG. 9A, according to one embodiment of the present invention.

Figure 11:
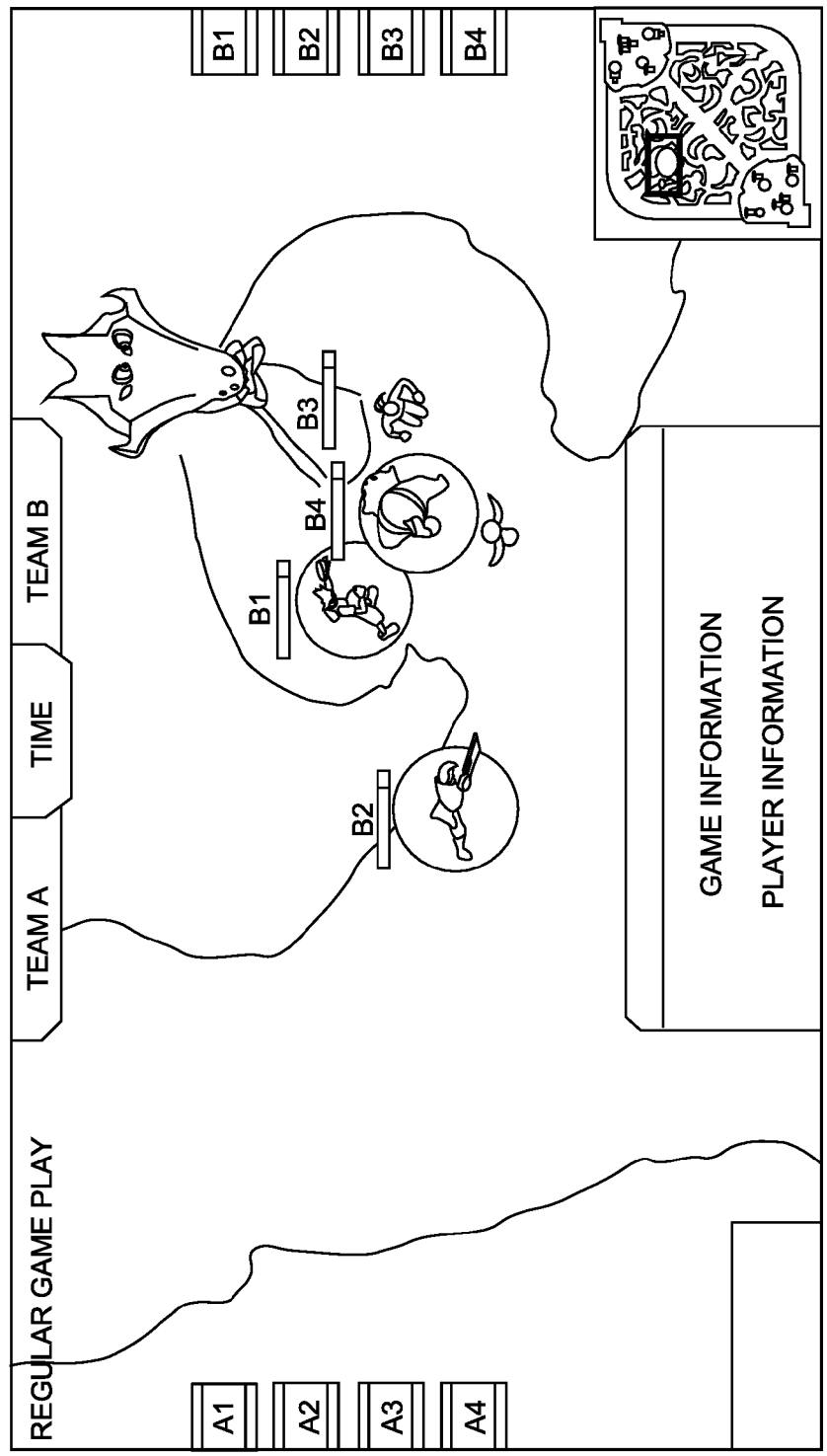
FIG. 11 is an exemplary screenshot of another regular game broadcast of the multi-player online battle arena game, according to one embodiment of the present invention.
Figure 12A:
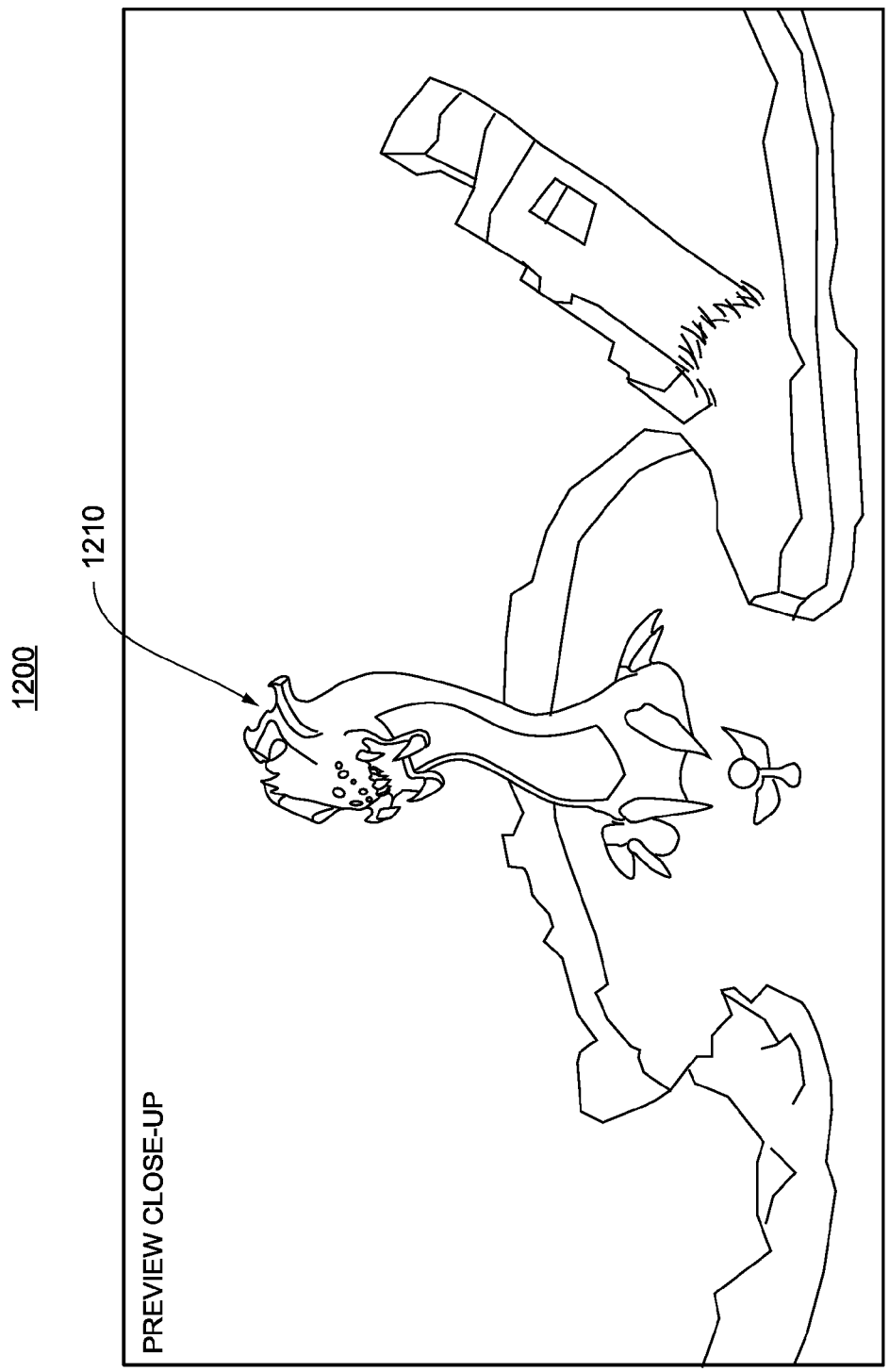
FIGS. 12A and 12B are exemplary screenshots of a preview close-up of a battleground in the game play referenced in FIG. 11, according to one embodiment of the present invention.
Figure 12B:
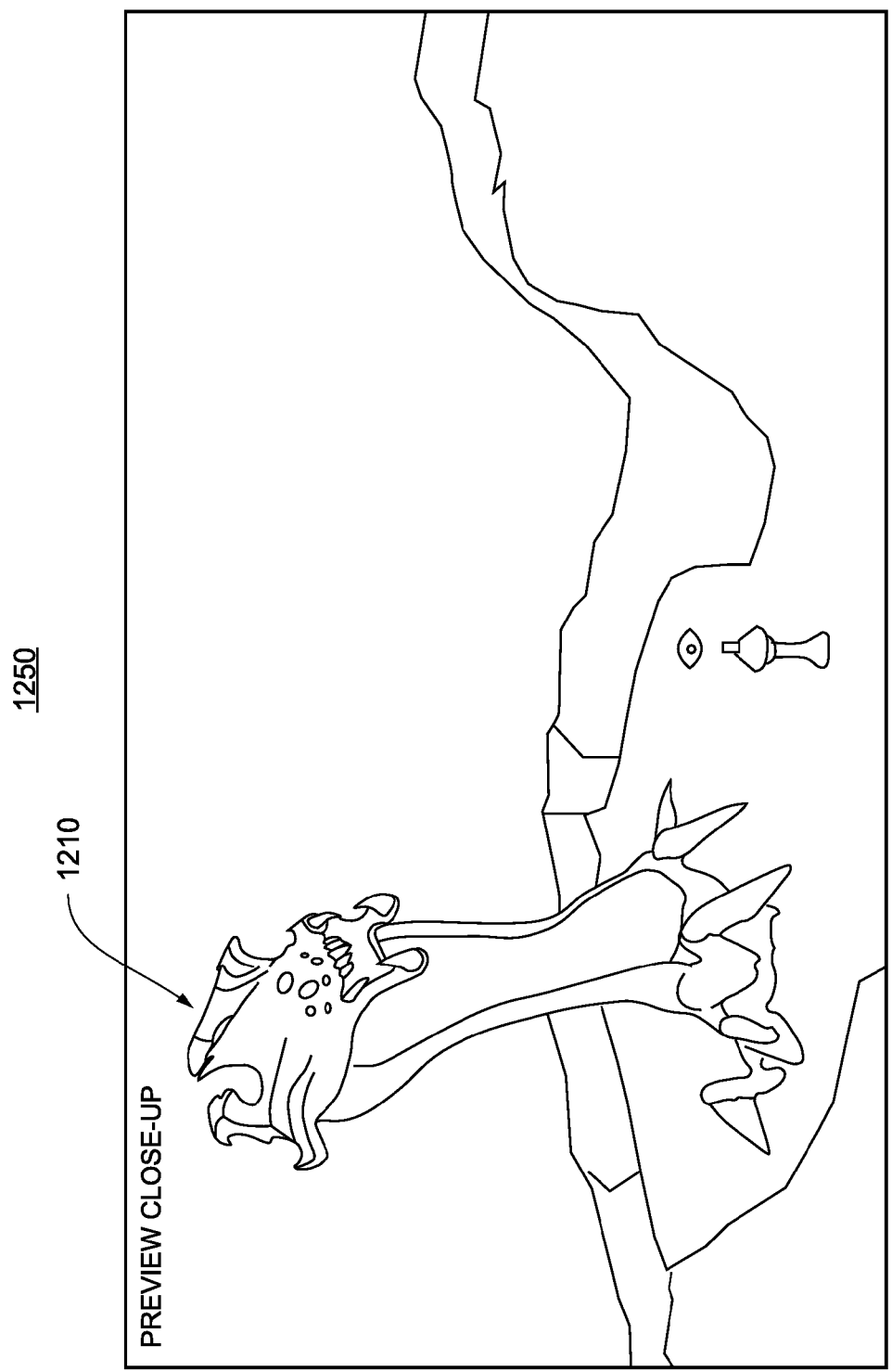

FIG. 11 is an exemplary screenshot of another regular game broadcast of a game play of the multi-player online battle arena game League of Legends, according to one embodiment of the present invention. FIGS. 12A and 12B are two exemplary screenshot 1200 and 1250 of a preview close-up of a battleground in the game play, shot from two separate viewing angles along a virtual camera trajectory. These screenshots show an epic monster 1210, without any of the players present. In various embodiments, such preview close-up features may utilize any suitable camera trajectories to provide to viewers a fly-by but detailed look at game characters and/or game environments of interest. In some embodiments, the utilized virtual camera trajectory may be determined by the SLIVER system automatically. In some embodiments, the utilized virtual camera trajectory may be manually configured or controlled by a viewer such as a broadcaster, a player, or a spectator.

Figure 13B:
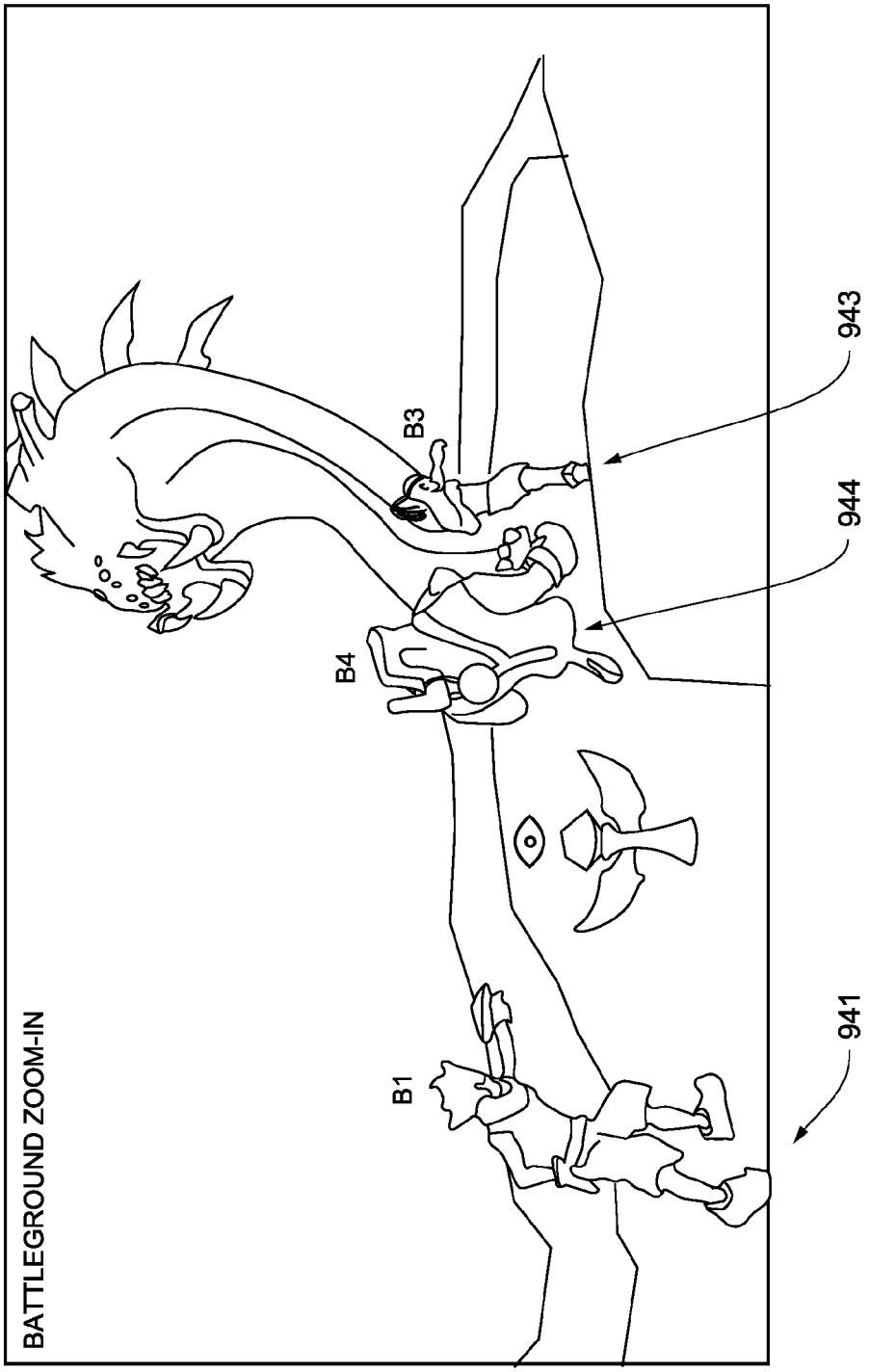
Figure 13C:
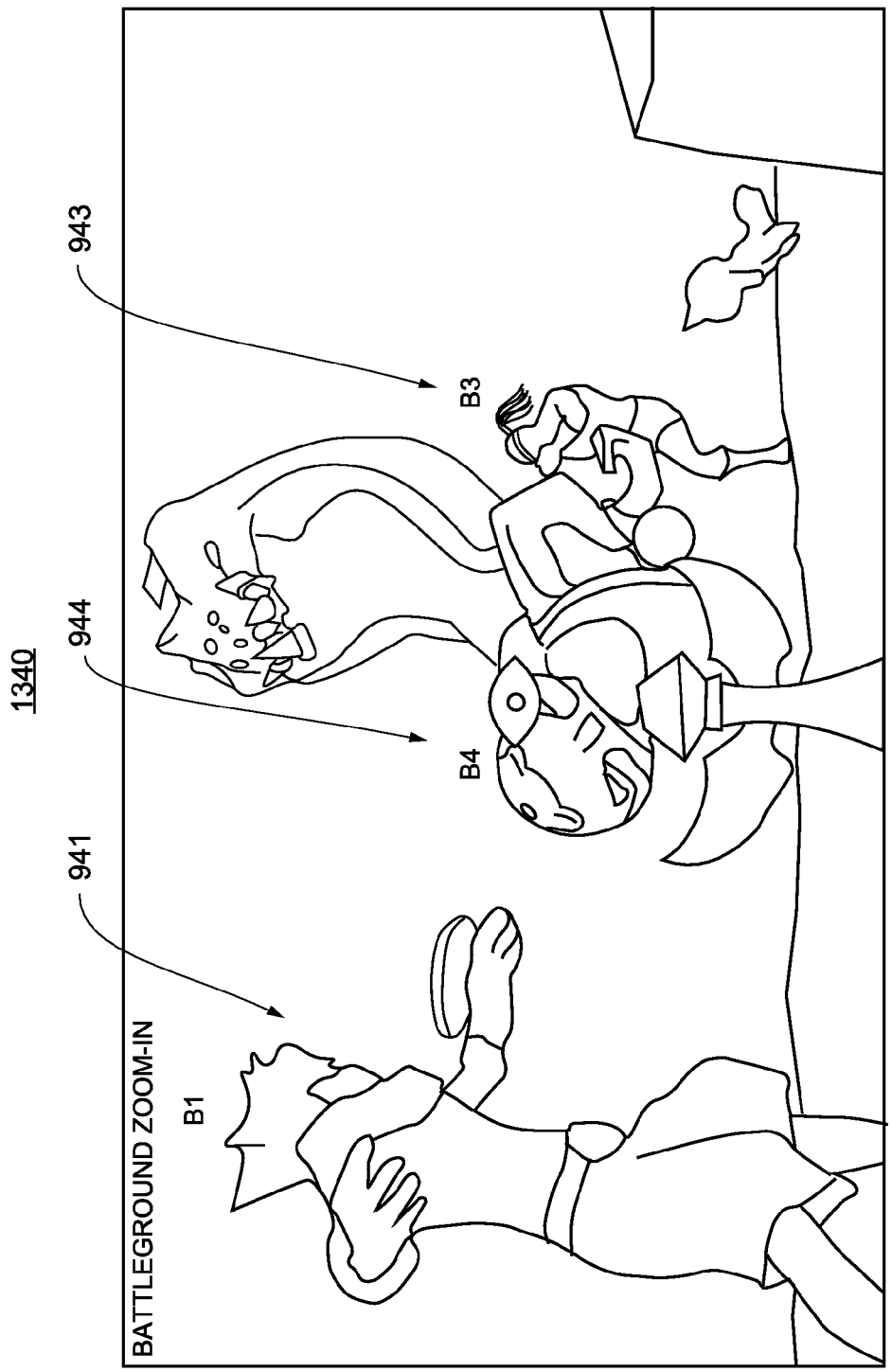

FIGS. 13A, 13B, and 13C are exemplary screenshots 1300, 1320, and 1340 of a zoomed-in replay of the game play, as a virtual camera flies or moves down towards the battleground, closer to players B1 941, B3 943, and B4 944, and closer to the ground level within the game universe. It is easy to see that as the virtual camera zooms in by traveling along a trajectory approaching to the ground level, the virtual camera is also tilted upwards to capture full images of the players and monster 1210. In screenshot 1340 shown in FIG. 13C, the virtual camera has rotated or traveled to a position right behind player B1 941.

Figure 14:
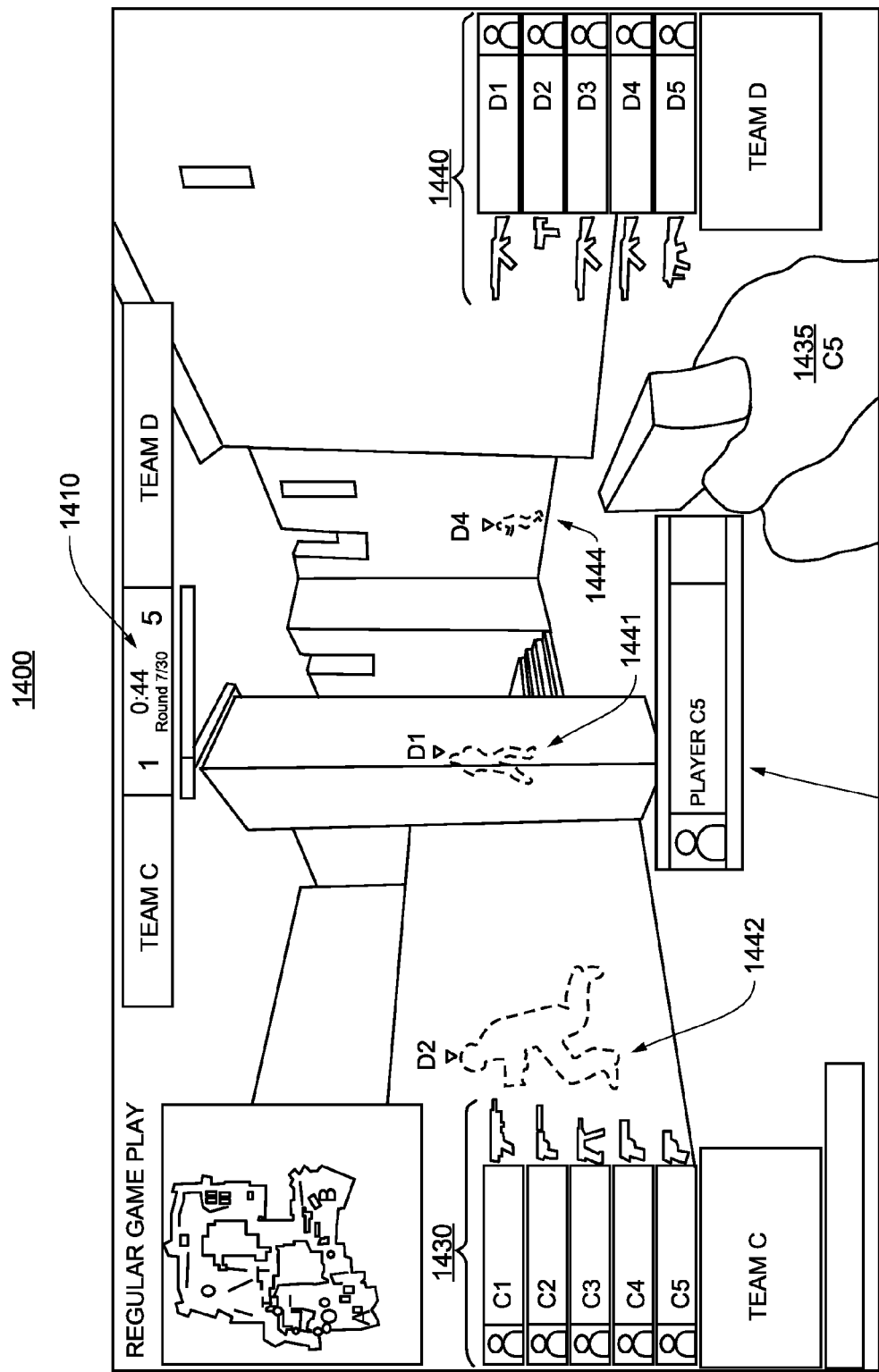
FIGS. 14, 15, 16, 17, 18, 19, 20, 21, and 22 are exemplary screenshots of a regular game broadcast of a multi-player shooter game, respectively, according to one embodiment of the present invention.

FIGS. 14, 15, 16, 17, 18, 19, 20, 21, and 22 are exemplary screenshots 1400, 1500, 1600, 1700, 1800, 1900, 2000, 2100, and 2200 of a regular game broadcast of the multi-player shooter game Counter Strike: Global Offensive (CS: GO), respectively, according to one embodiment of the present invention. Player information are listed on side panels in each screenshot. For example, in screenshot 1400 shown in FIG. 14, panels 1430 and 1440 on the left and right sides of the screen provide names of active players C1, C2, C3, C4 and C5 for a Team C, and D1, D2, D3, D4, and D5 for a Team D. Also shown in FIG. 14 is a floating player panel 1450 listing information for the current player C5 1435, who provides the first-person perspective for this game play recording.

A "time remaining" panel located at the top middle portion of each screenshot shows the amount of time remaining in the current game play. For example, panel 1400 in FIG. 14 shows that there are only 44 seconds left in the current game play. Following the sequences of player actions from 0:44 s to 0:36 s, shown sequentially in FIGS. 14 to 22, it is easy to see that the current player C5 is battling against multiple opponents around a building structure. Outlines of opponent players within C5's field of view is drawn in solid lines, while outlines of opponent players obstructed by building structures, outside of C5's field of view but still within the captured screenshot is drawn in dashed lines.

In FIG. 14, player C5 1435 encounters players D1 1441, D2 1442, and D4 1444, with player D2 1442 running to the left, behind the building structure to the left of the screen. Player C5 1435 kills player D1 1441 in FIG. 15, as indicated by the cross-out of player D1's information box in FIG. 16, then kills player D2 1442 in FIG. 16, as indicated by the cross-out of player D2's information box in FIG. 17. Next, running to the right from FIG. 17, FIG. 18 to FIG. 19, around a corner column 1710, current player C5 1435 is able to see players D4 and D5 originally shielded by a building structure 1720. Current player C5 1435 is killed in FIG. 20 by player D5. As player C5 1435 falls to the ground, FIG. 21 outlines player C5's back, and FIG. 22 shows his dead body on the ground.

Figure 15:
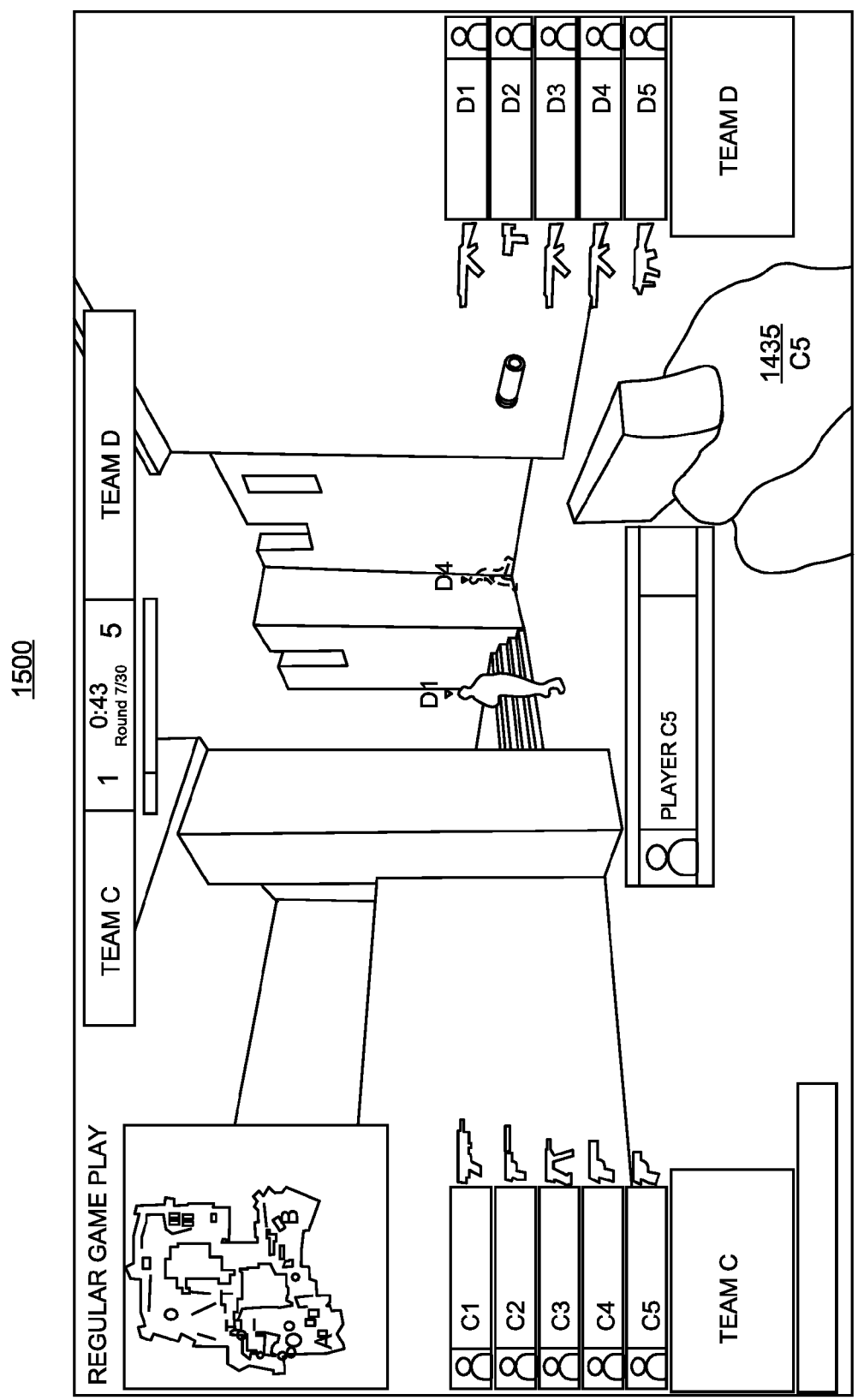
Figure 23:
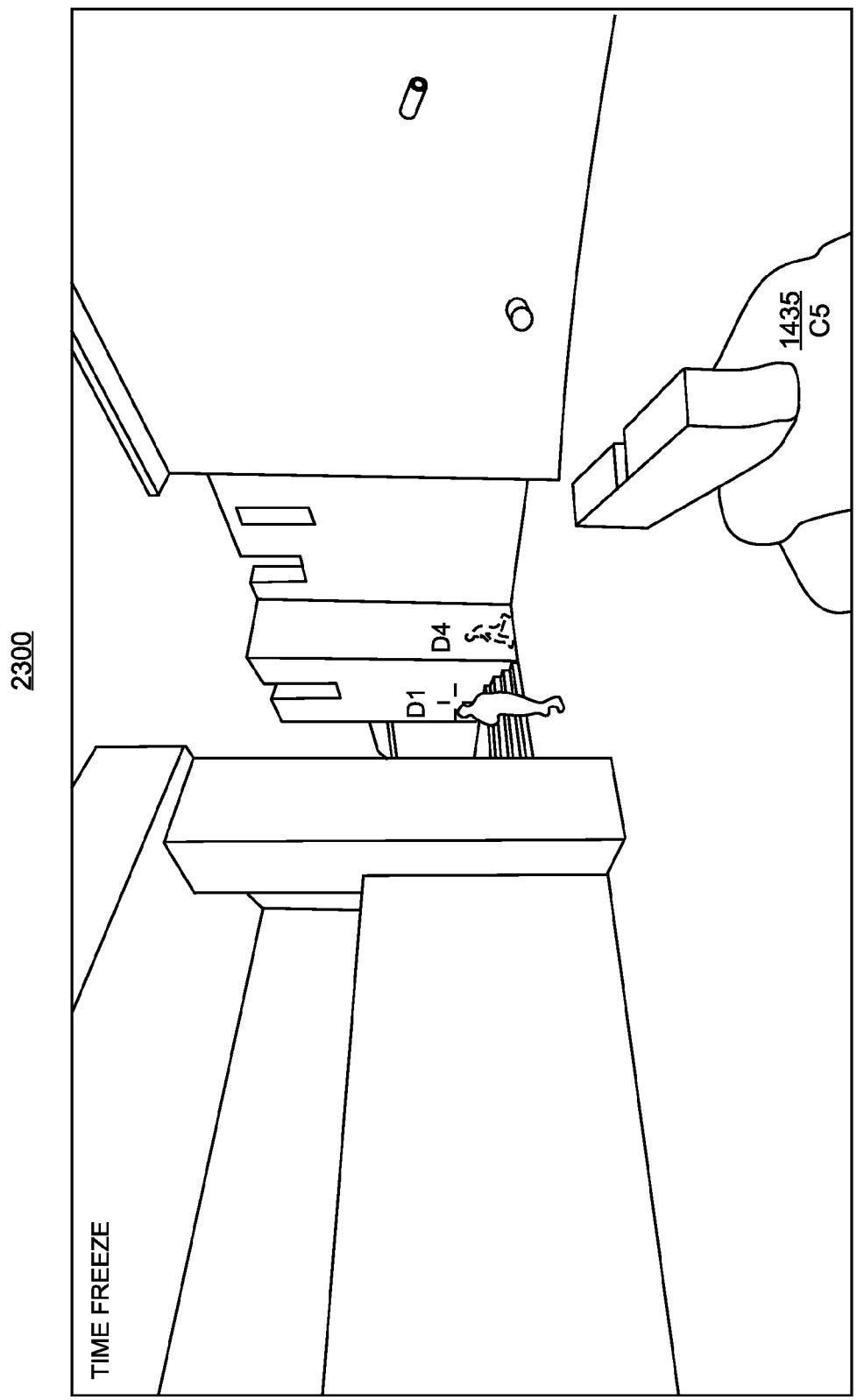
FIGS. 23 and 24 are exemplary screenshots of a time freeze highlight of the multi-player shooter game, respectively, according to one embodiment of the present invention.
Figure 24:
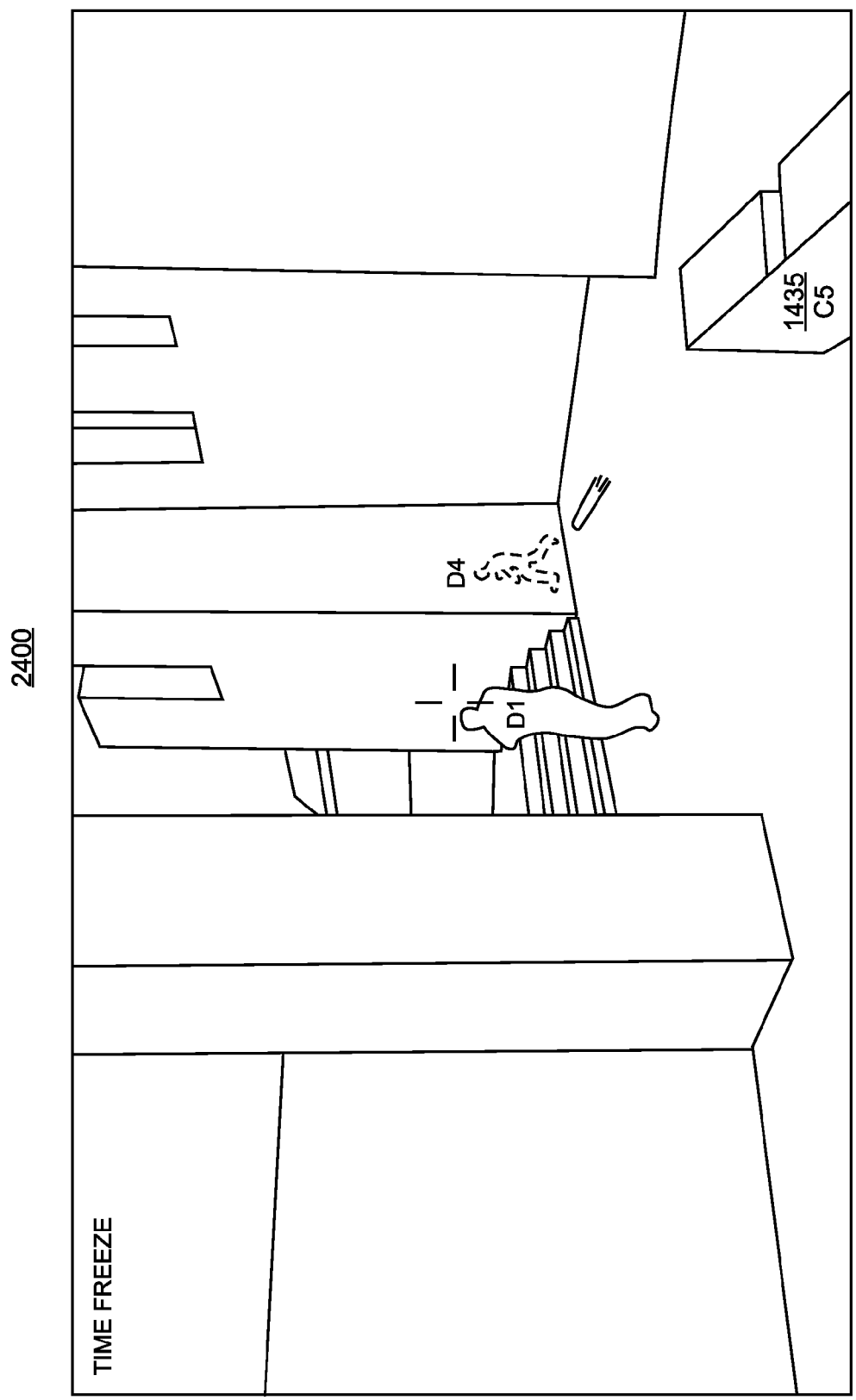

FIGS. 23 and 24 are exemplary screenshots 2300 and 2400 of a time freeze highlight of the gaming moment shown in FIG. 15, respectively, according to one embodiment of the present invention. The time freeze highlight effect is captured or applied at the killing moment of player D1, right before or just-in-time for the kill. The game video is paused in FIG. 23, zooms into player D1 briefly with some transition effects in FIG. 24, for example, for half a second, then zooms out again to resume the game video.

Figure 17:
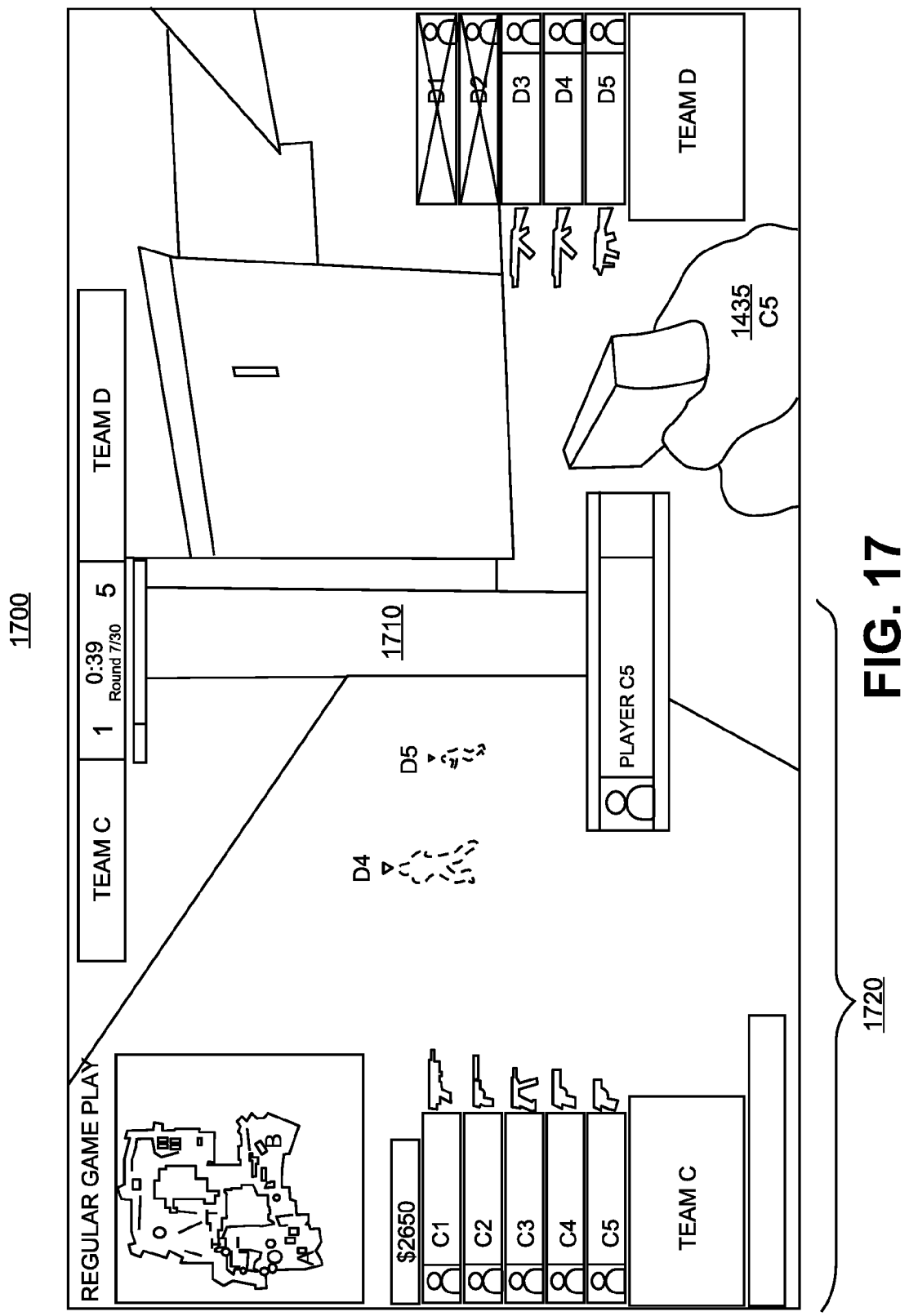
Figure 18:
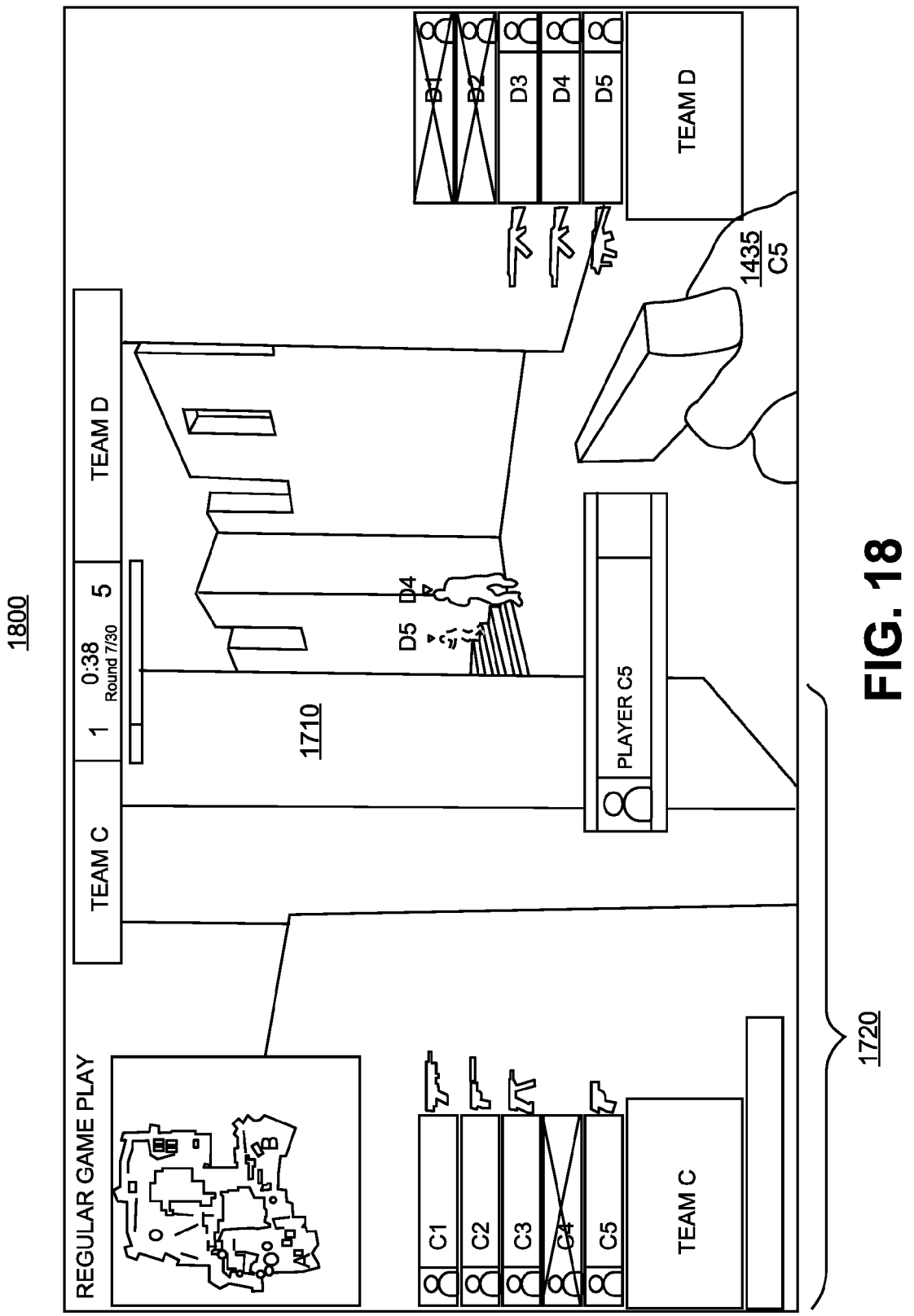
Figure 25:
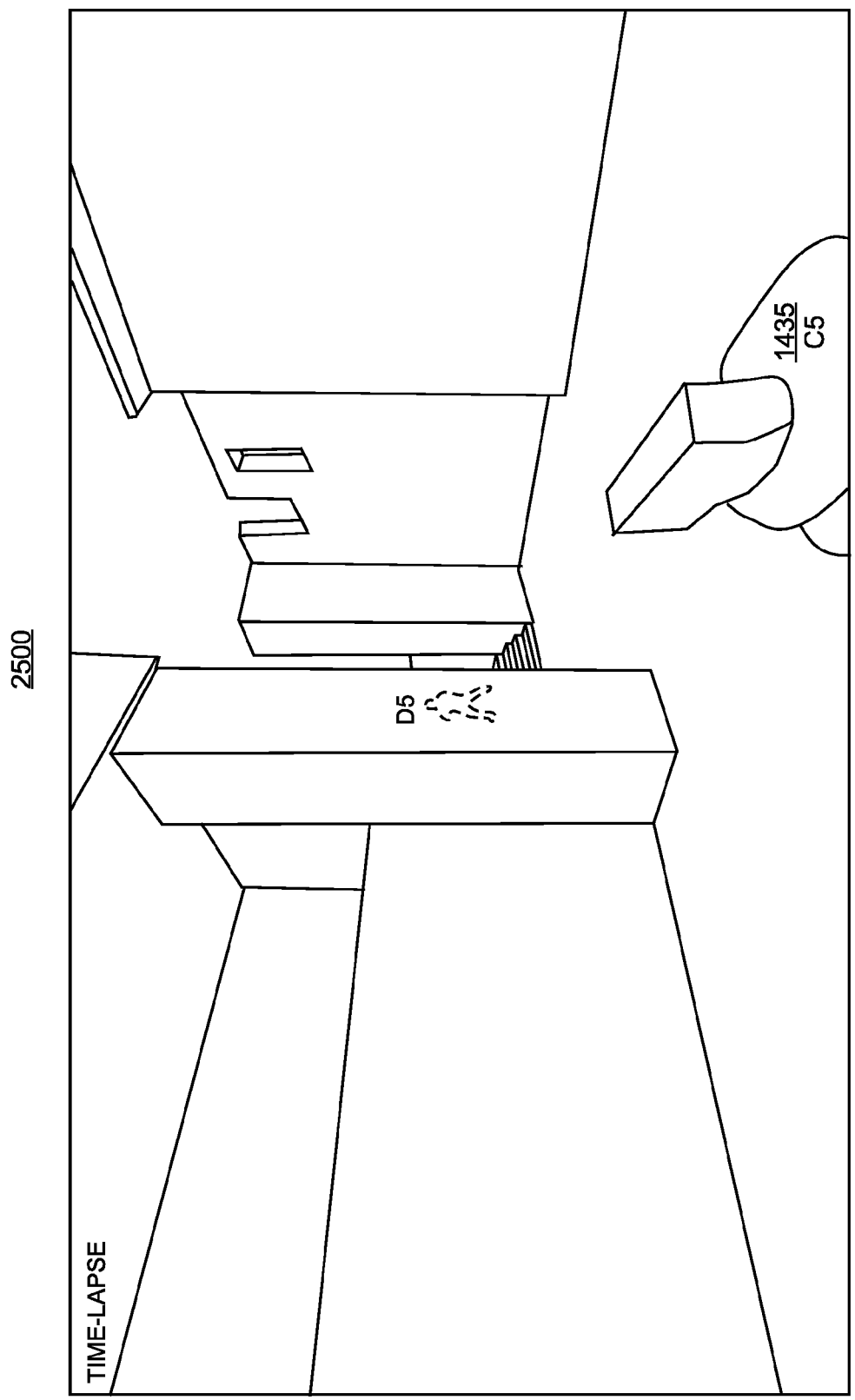
FIG. 25 is an exemplary screenshot of a time-lapse highlight of the multi-player shooter game, according to one embodiment of the present invention.

FIG. 25 is an exemplary screenshot 2500 of a time-lapse highlight of the gaming moment shown in FIGS. 17 and 18, according to one embodiment of the present invention. Here only a single screenshot is shown for illustrative purposes. In general, a time-elapse effect allows a particular gaming moment to be scaled temporally, where the display framerate may be adjusted dynamically to show actions taking place during the gaming moment.

Figure 19:
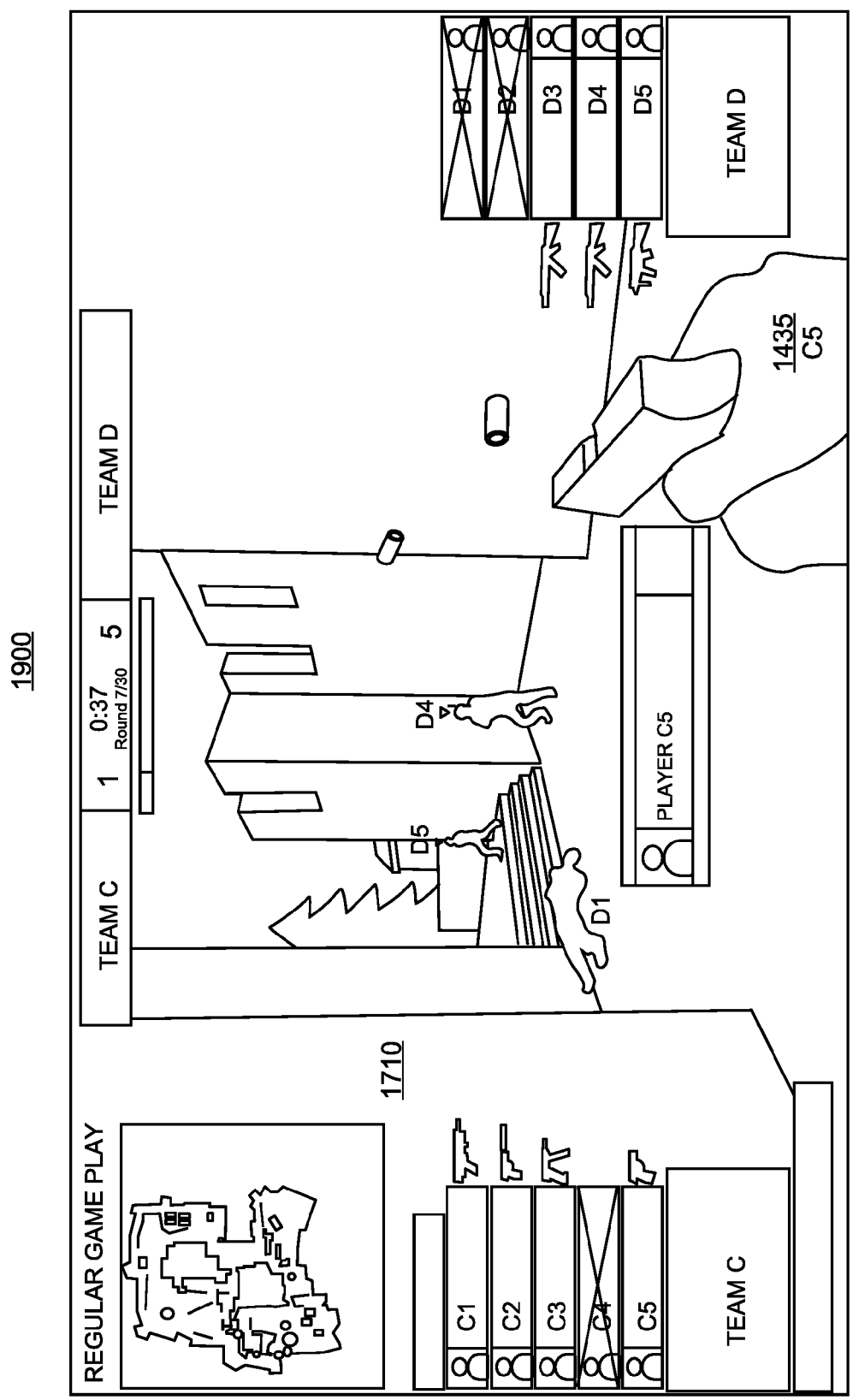
Figure 20:
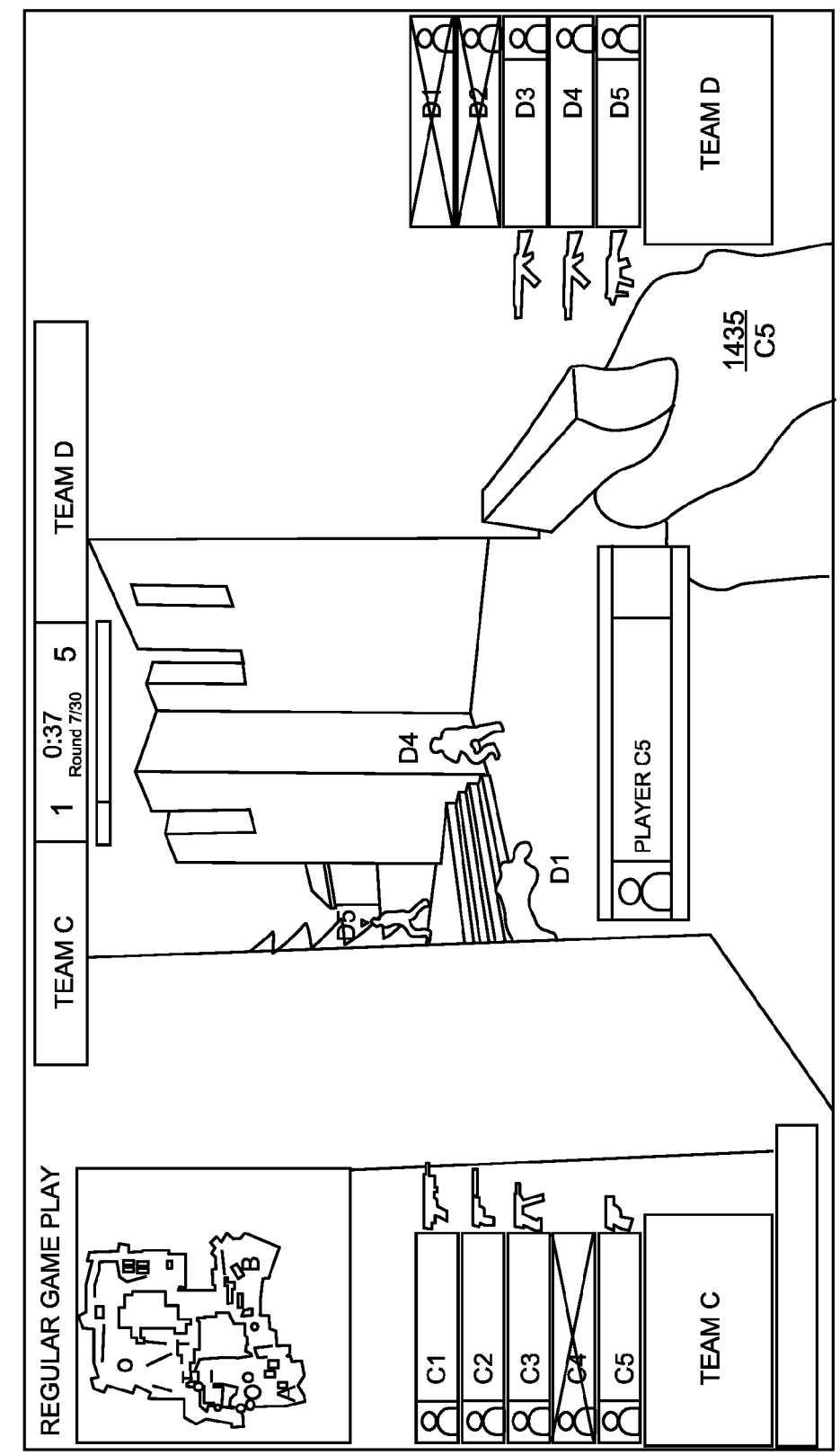
Figure 26:
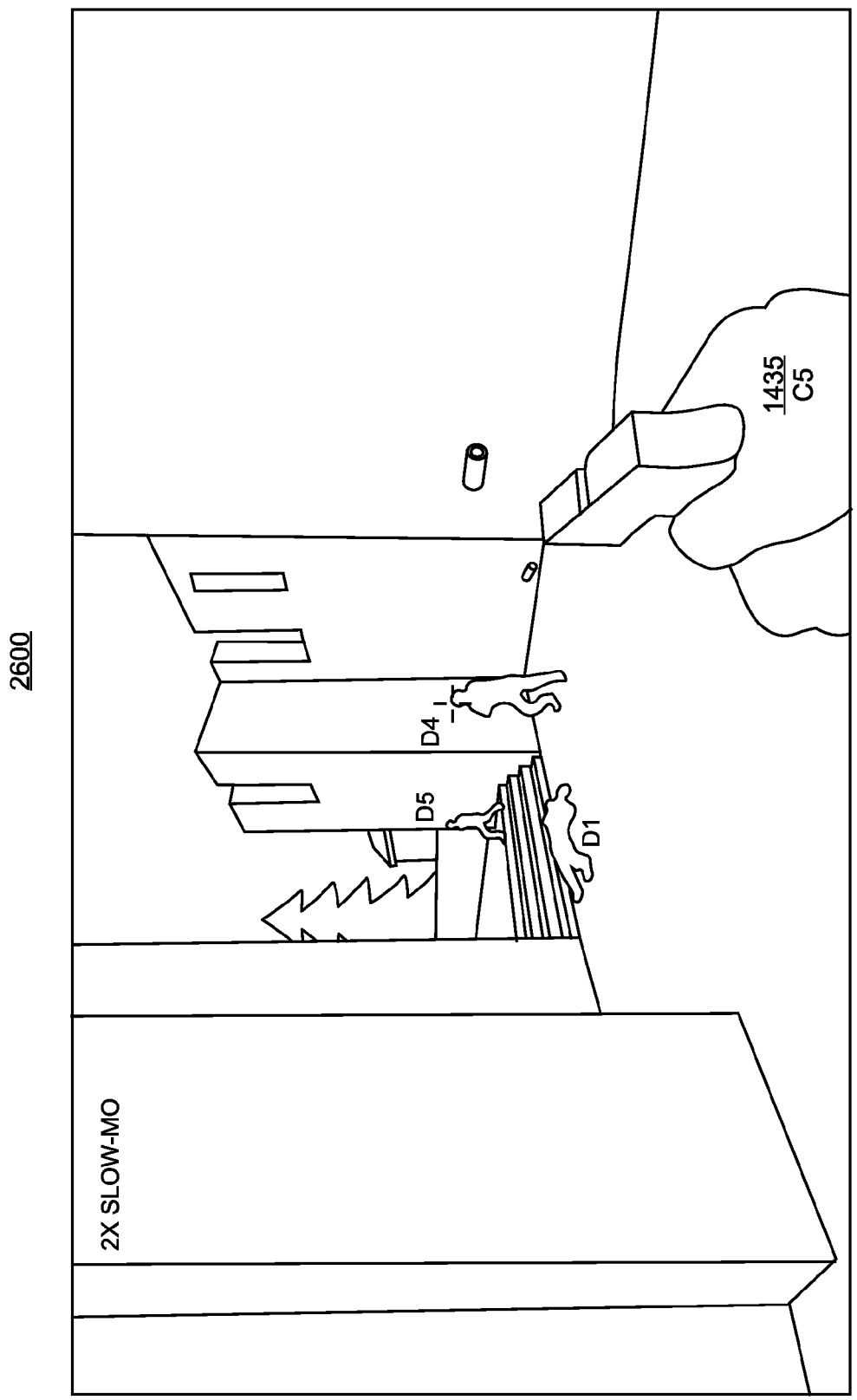
FIG. 26 is an exemplary screenshot of a slow-motion highlight of the multi-player shooter game, according to one embodiment of the present invention.

FIG. 26 is an exemplary screenshot 2600 of a 2× slow-motion highlight of the gaming moment shown in FIG. 19, according to one embodiment of the present invention. Again, although only a single screenshot is shown for illustrative purposes here, the slow-motion highlight effect allows the gaming moment to be replayed at a lower speed or a higher frame rate, so the viewer may see more details of the game action or game event covered.

Figure 27:
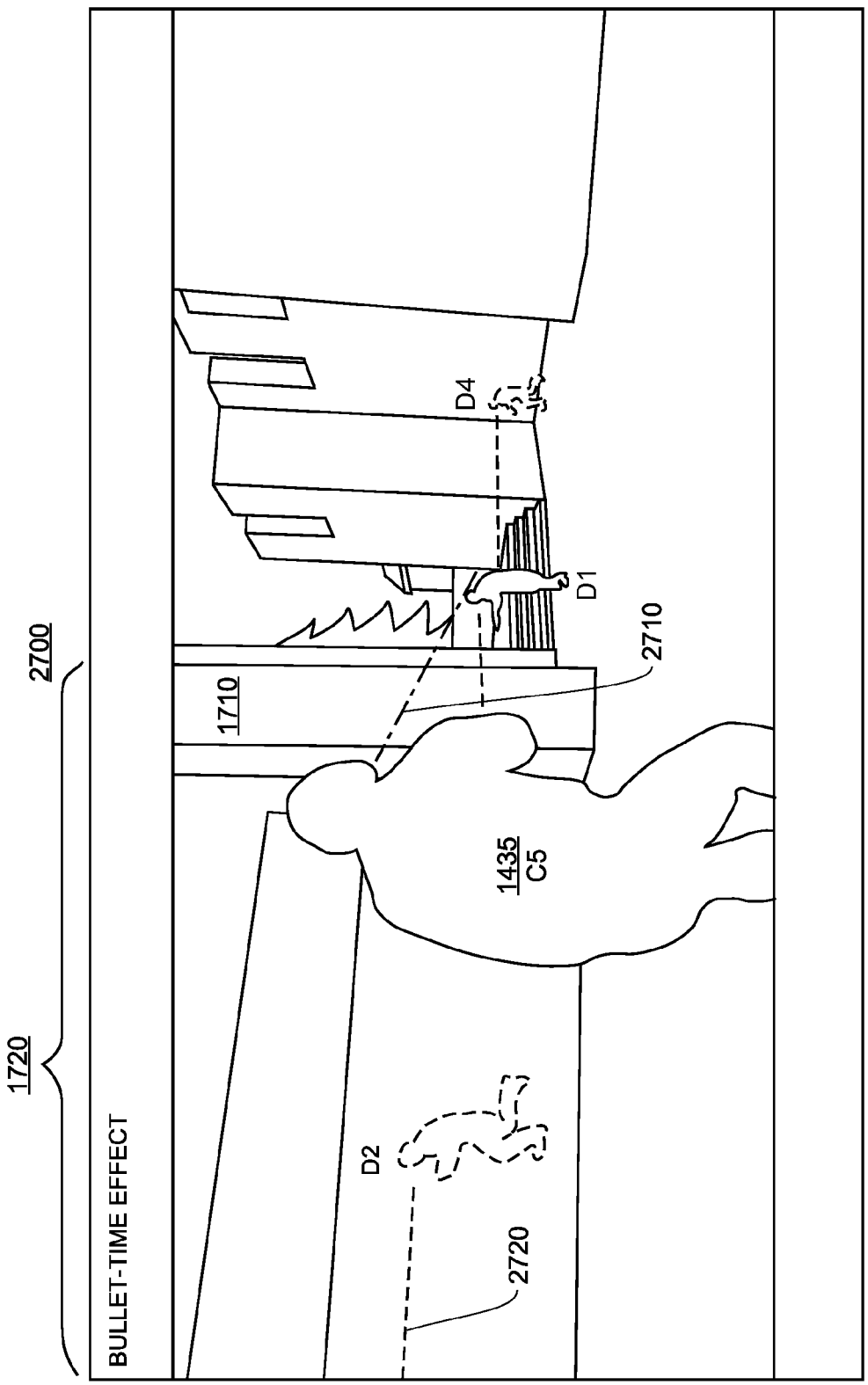
FIGS. 27 and 28 are exemplary screenshots of a bullet-time highlight of the multi-player shooter game, respectively, according to one embodiment of the present invention.
Figure 28:
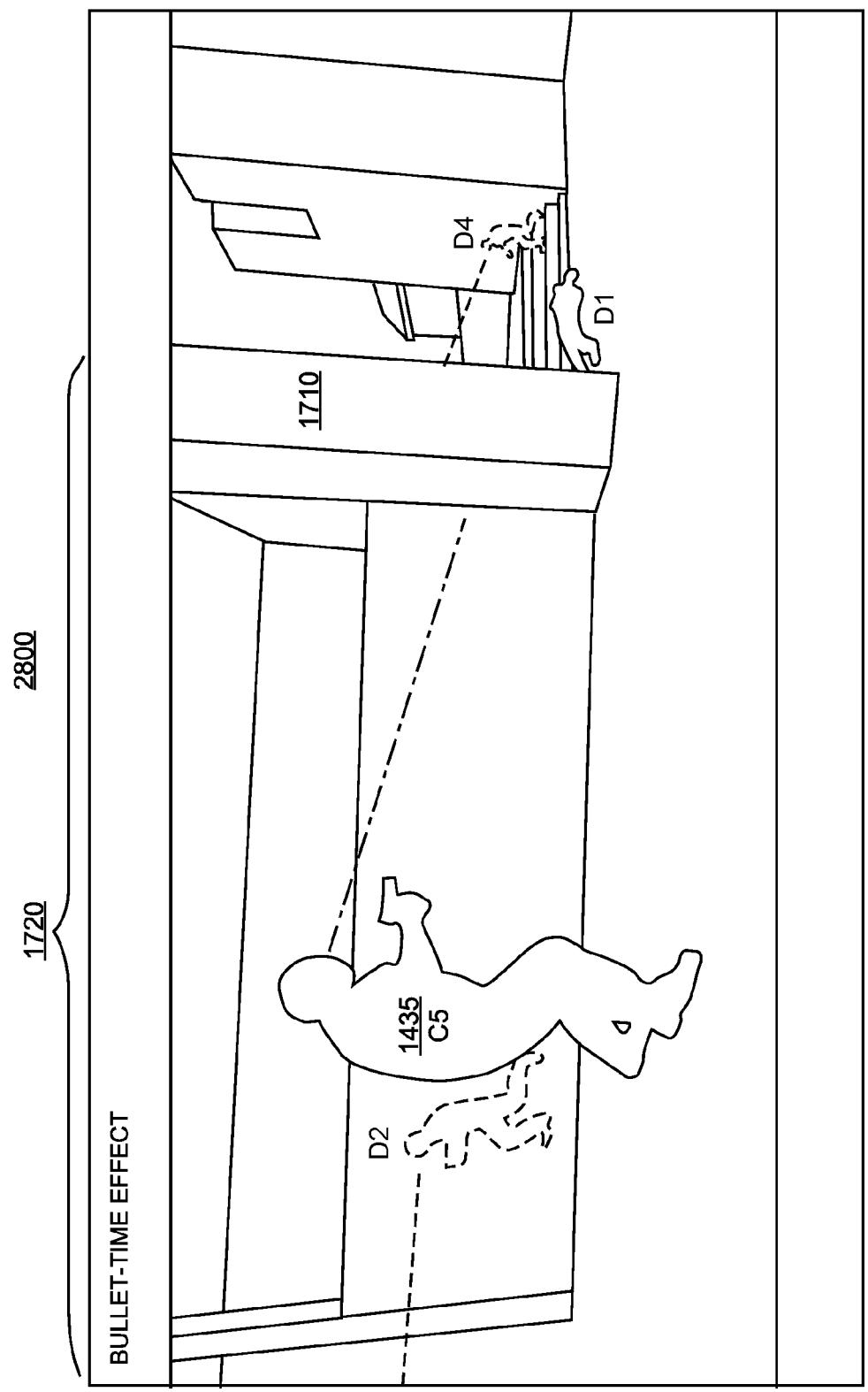

FIGS. 27 and 28 are exemplary, respective screenshots 2700 and 2800 of a bullet-time highlight of the gaming moment shown in FIGS. 17, 18, and 19, where the current player C5 runs from left to right around corner column 1710 of building structure 1720, then back to the left around the corner, according to one embodiment of the present invention. Observe that original regular game play shown in FIGS. 17, 18, and 19 are captured from player C5's first person perspective, where the player's line of sight or field of view is clearly defined by the captured video frame. With the bullet-time effect, a virtual camera circles around the player instead, to provide a third person perspective, and each player's line of sight may be represented by a dotted line, such as dotted lines 2710 and 2720 for players C5 and D2 respectively. The bullet-time effect makes the highlight video more like a movie footage, where full player actions and battlefield scenes are featured.

Figure 16:
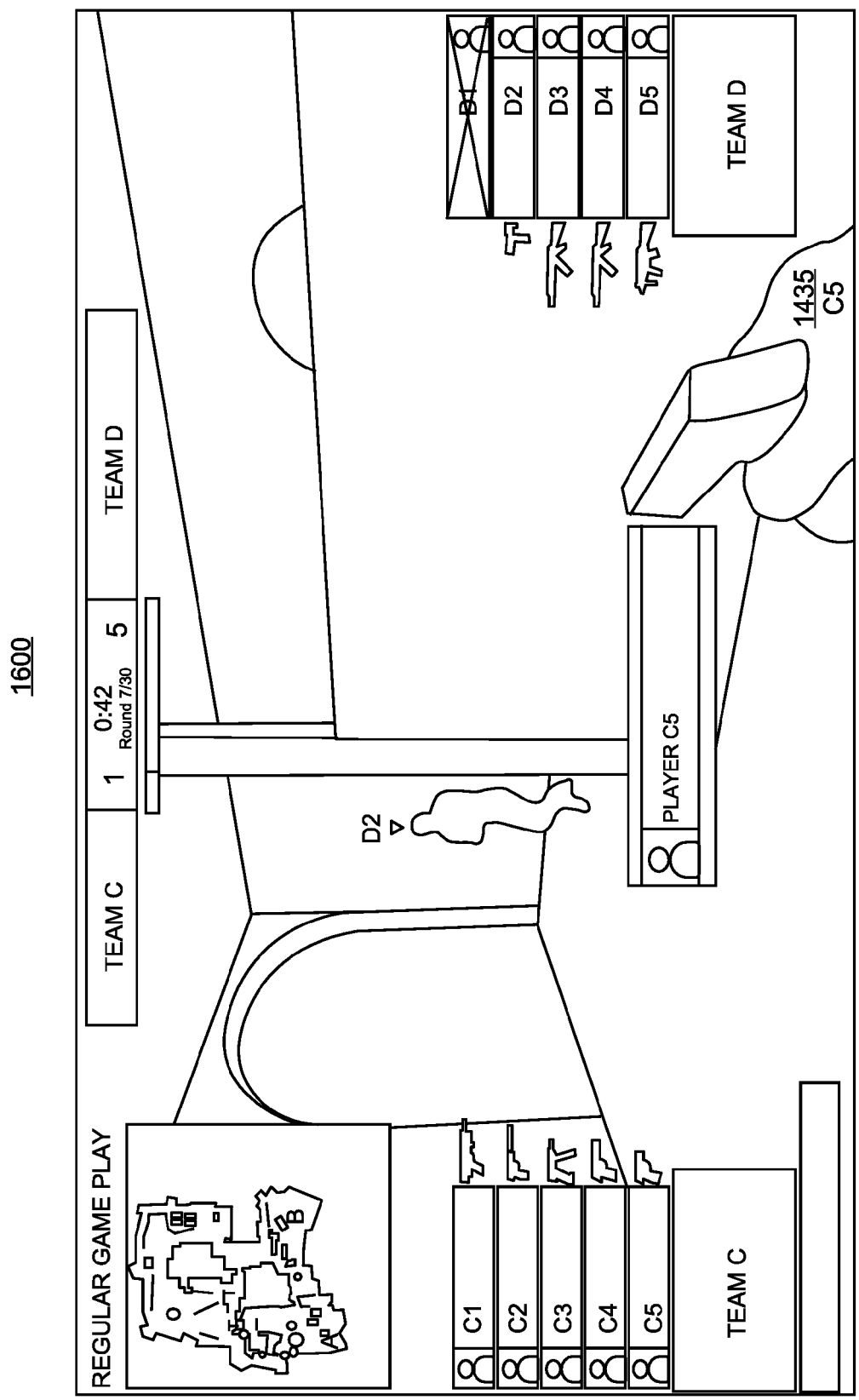
Figure 29:
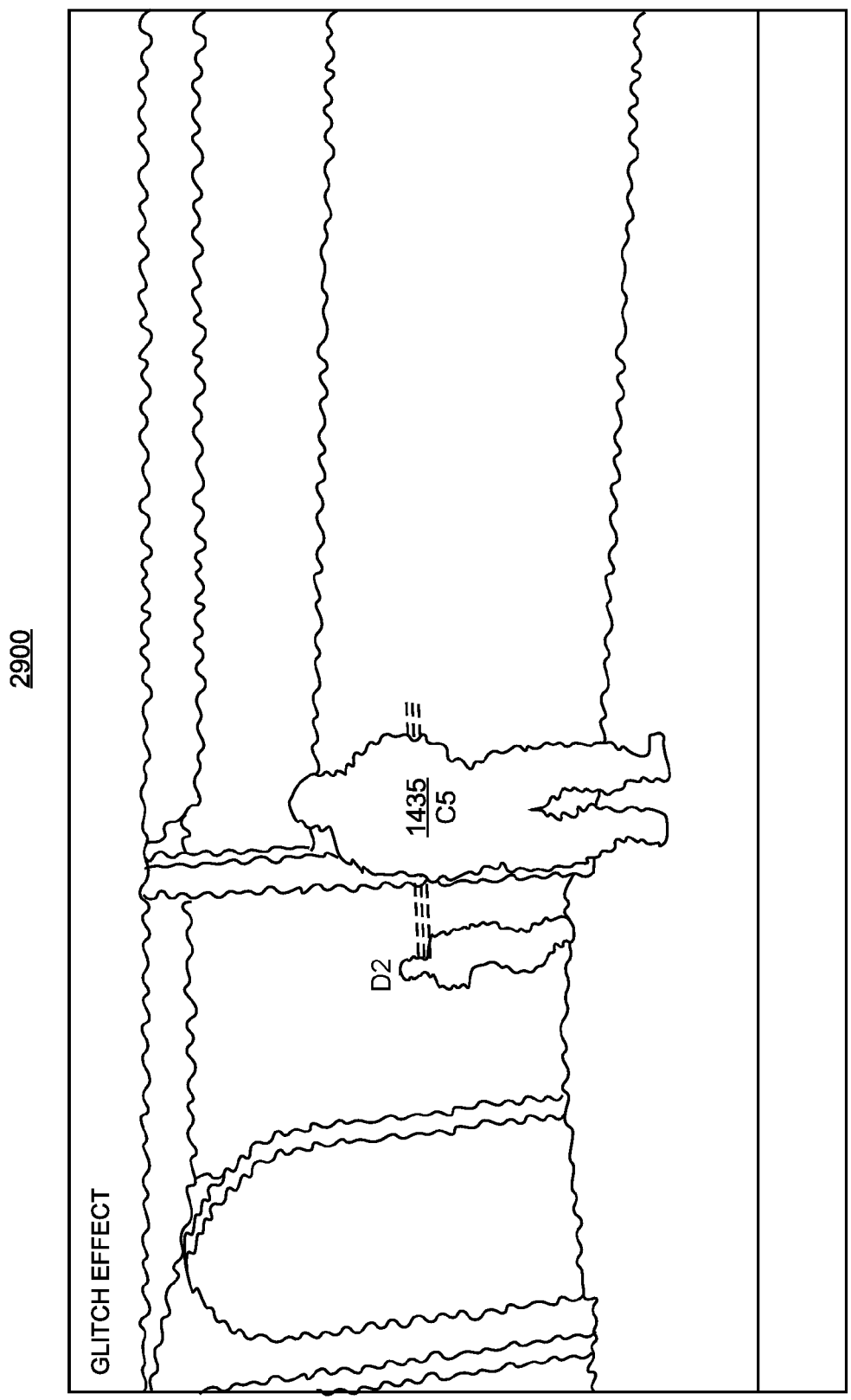
FIG. 29 is an exemplary screenshot of a glitch highlight of the multi-player shooter game, according to one embodiment of the present invention.

FIG. 29 is an exemplary screenshot 2900 of a glitch highlight of the gaming moment shown in FIG. 16, right before player D2 is killed, according to one embodiment of the present invention. Similar to the bullet-time effect, a virtual camera is employed to capture the gaming moment in a third-person perspective, and the processed highlight may involve a temporal-scaling slow-motion action, plus the glitches illustrated by wavy lines in FIG. 29, to emphasize on the kill action or event.

Figure 30:
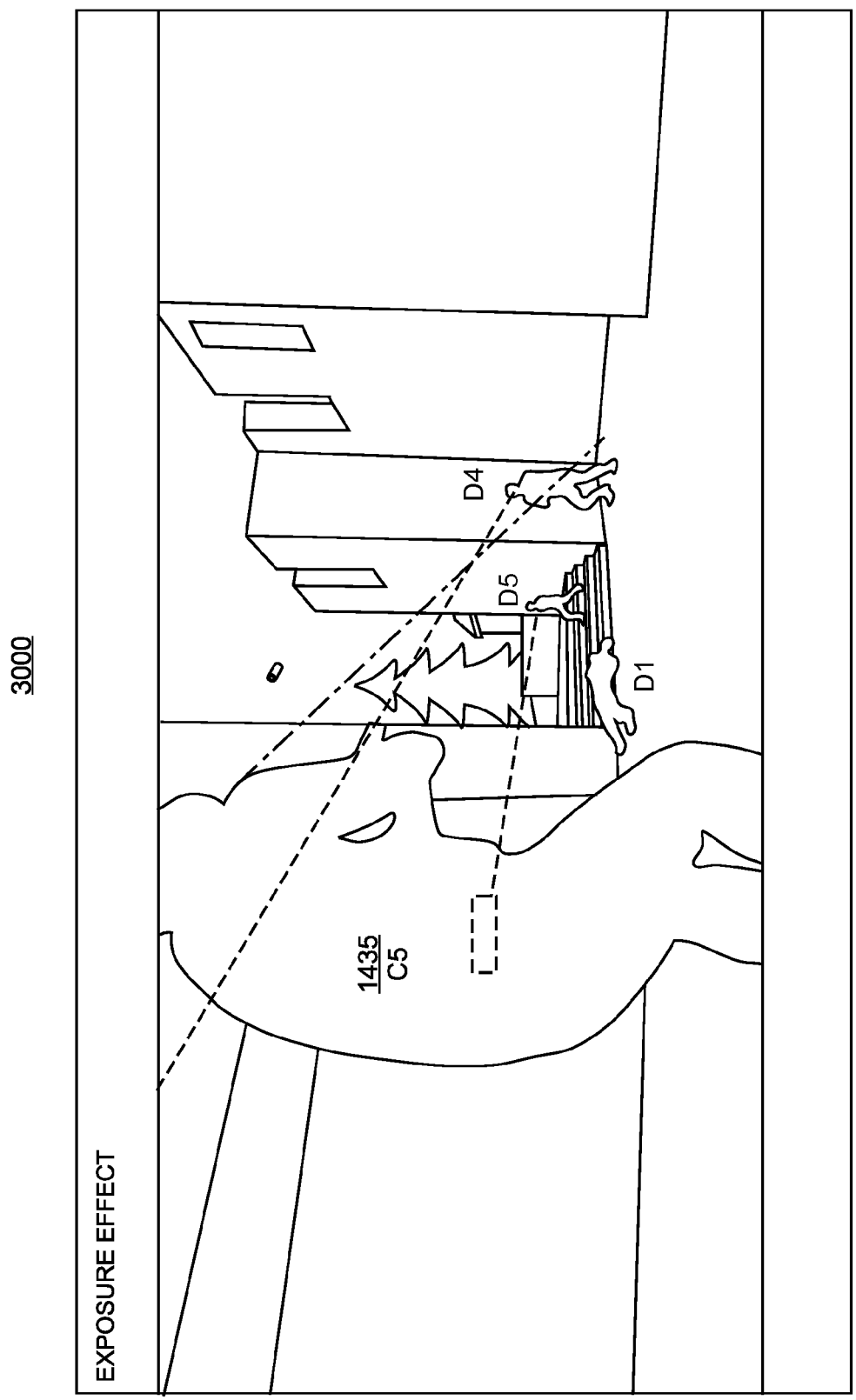
FIG. 30 is an exemplary screenshot of an exposure highlight of the multi-player shooter game, according to one embodiment of the present invention.

FIG. 30 is an exemplary screenshot 3000 of an exposure highlight of the gaming moment shown in FIG. 19, according to one embodiment of the present invention. Brightness or contrast of the entire video frame or parts of the video frame may be intelligently adjusted, according to the game actions taking place within the video frame. In some embodiments where line of sight or shooting range for each player is augmented or annotated on the video using a line of a particular style, exposure effects may be individually applied to other players or objects along such a line of sight.

Figure 21:
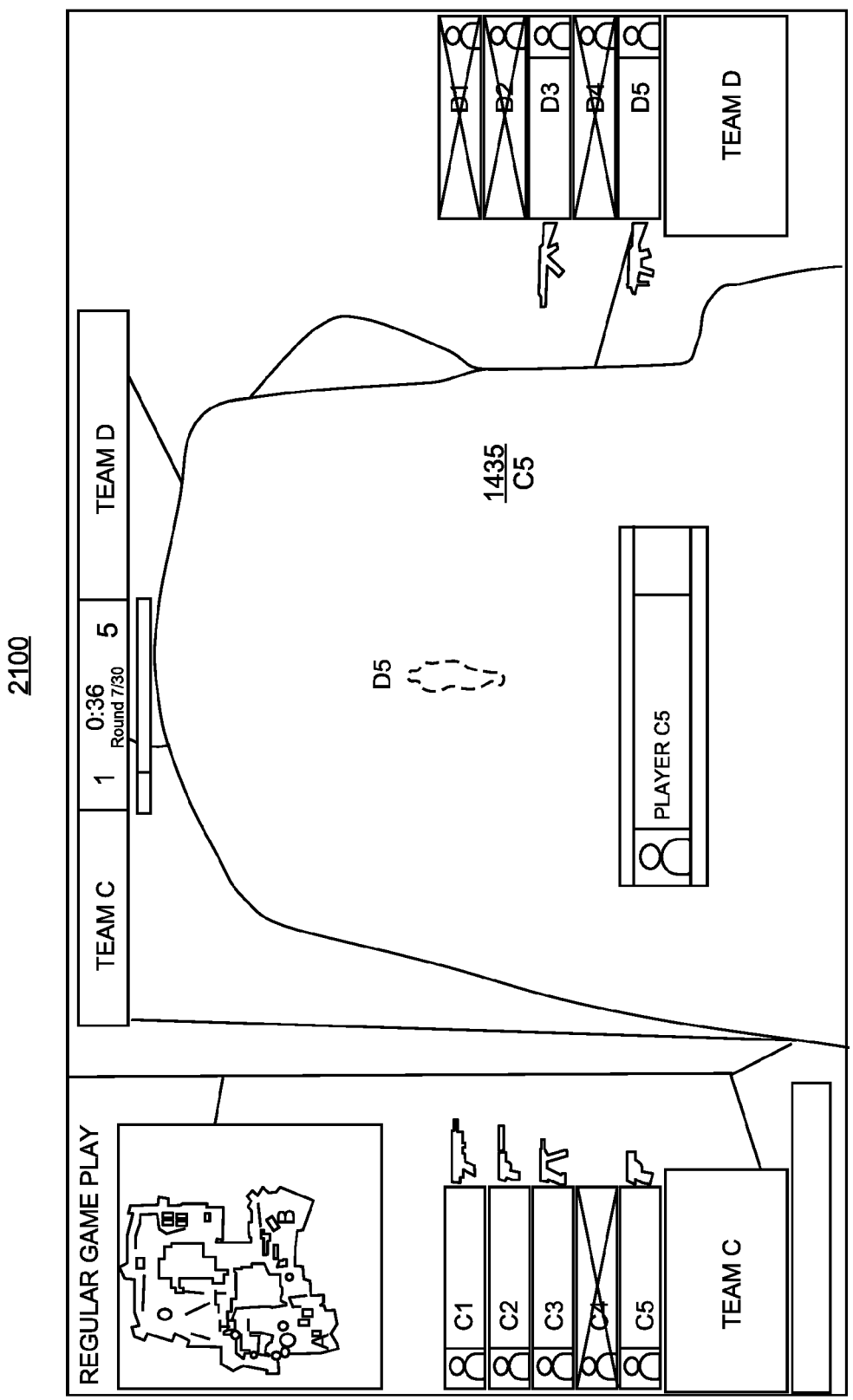
Figure 22:
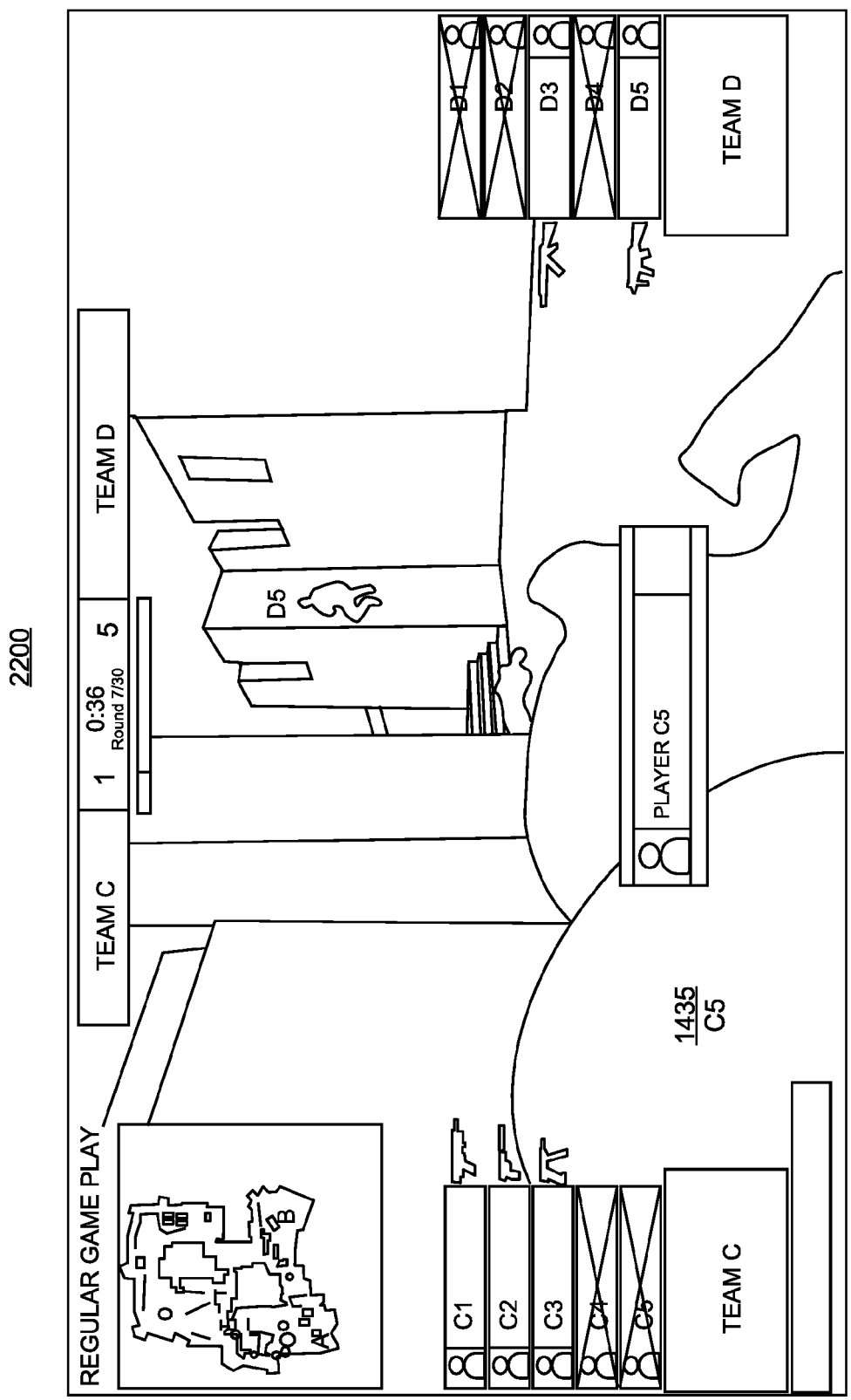
Figure 31:
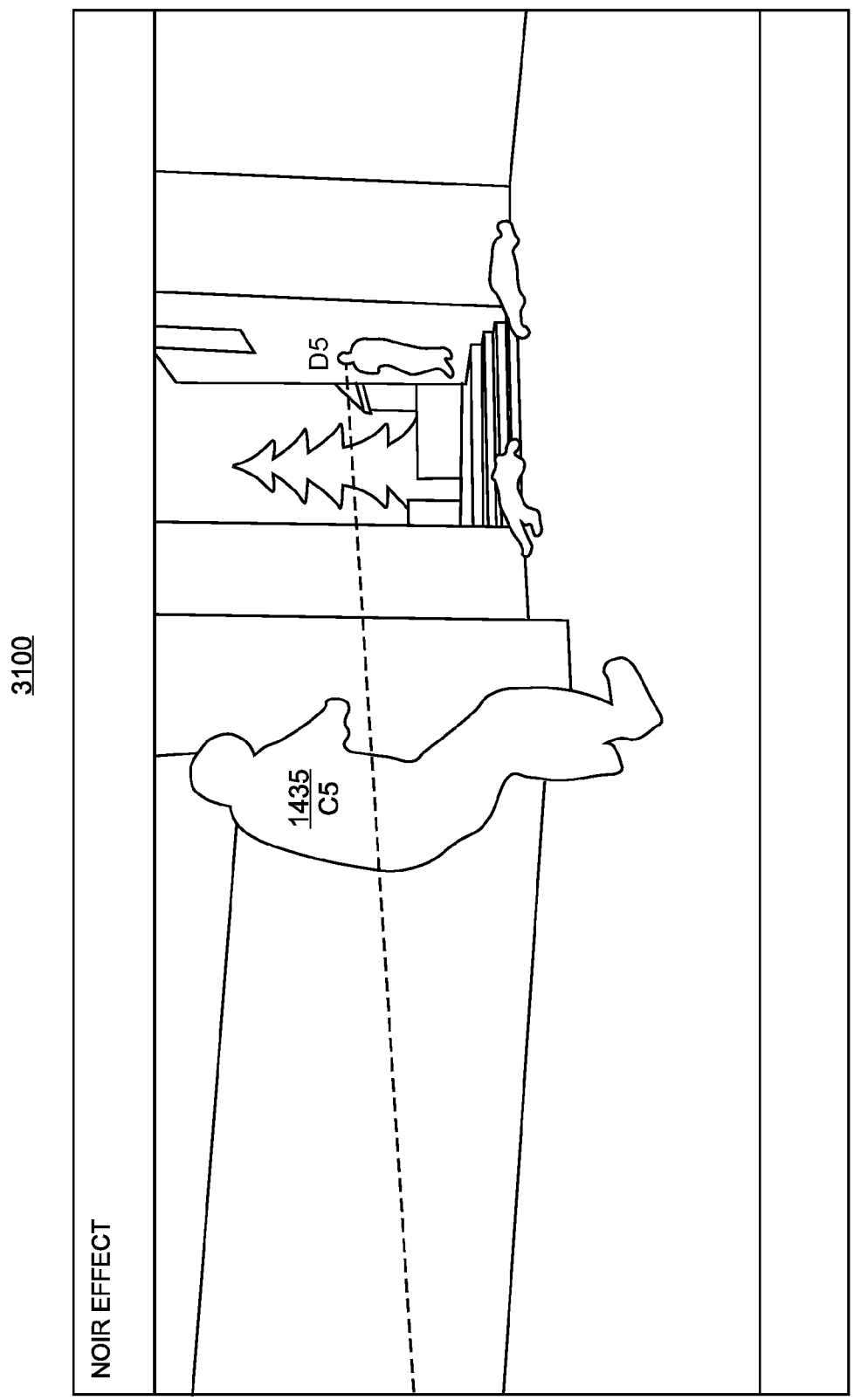
FIGS. 31 and 32 are exemplary screenshots of a noir highlight of the multi-player shooter game, respectively, according to one embodiment of the present invention.
Figure 32:
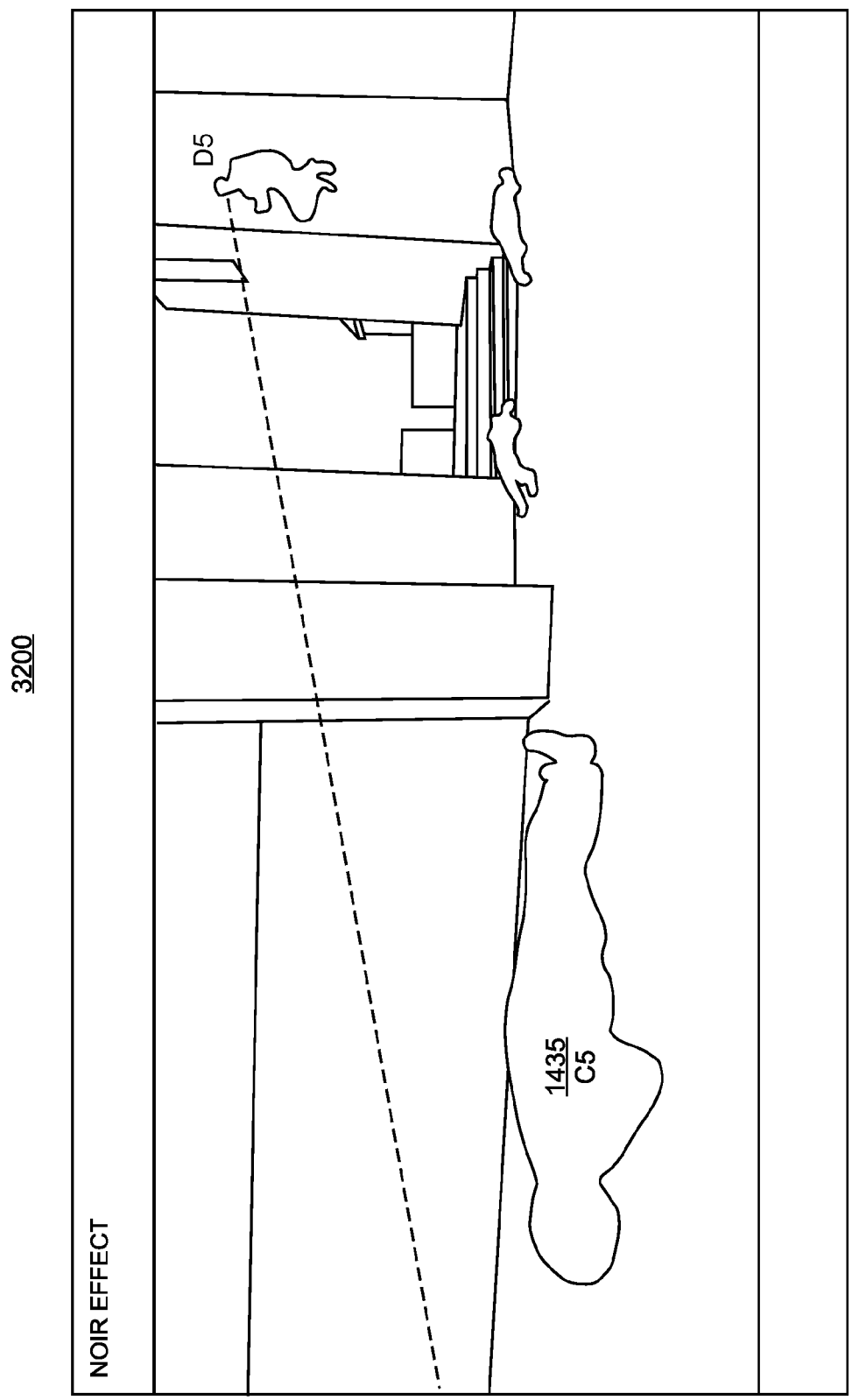

FIGS. 31 and 32 are respective screenshots 3100 and 3200 of a noir highlight of the gaming moment shown in FIGS. 21 and 22, where current player C5 is shot and killed by opponent player D5, according to one embodiment of the present invention. Screenshots 2100 and 2200 in FIGS. 21 and 22 show the death of the current player C5 from a first-person perspective. The noir highlight effect, on the other hand, first uses virtual cameras located further away from the player C5 to capture his full body image and actions in a third-person perspective. The effect further involves fading the display into monotone color or grayscale to indicate that a first-person-perspective player death has occurred.

As illustrated by FIGS. 23 to 32, a highlight effect may be associated with particular virtual camera placements or trajectory design, and may involve multiple processing techniques, such as temporal or spatial scaling, augmentation, and many others.

SLIVER Platform

Figure 33:
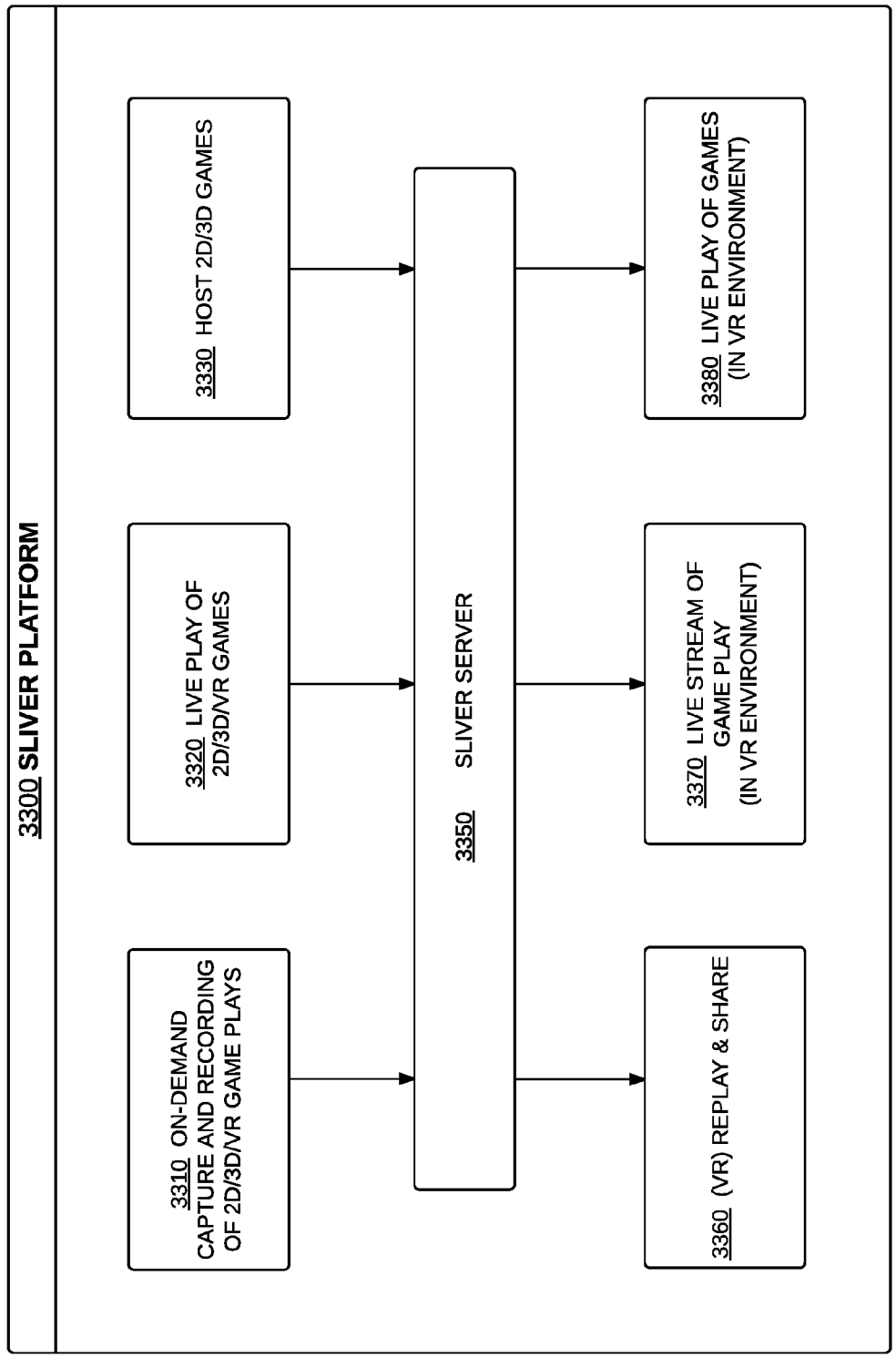
FIG. 33 is a schematic diagram illustrating a game recording, streaming, highlight, and replay platform, according to one embodiment of the present invention.

FIG. 33 is a schematic diagram illustrating functionalities provided by an extended SLIVER platform 3300, according to one embodiment of the present invention. More specifically, SLIVER platform 3300 may provide on-demand capture and recording functions 3310 of 2D, 3D, and/or VR games, for post-processing within SLIVER server 3350, and replay and content sharing 3360; SLIVER platform 3300 may process live game plays 3320 in real-time for live streaming 3370; SLIVER platform 3300 may also function as game servers 3330 to host existing 2D, 3D, and/or VR games to enable live game play 3380. In each case, SLIVER platform 3330 may generate and provide highlight videos according to embodiments of the present invention as disclosed, and may further provide some or all media content in 360 spherical formats.

Finally, FIG. 34 is a schematic diagram 3400 of a computing device in which the present invention may be utilized, according to some embodiments of the present invention. A computing device comprises a hardware processor 3402 for executing program code, an operating system 3414, an application software 3416, which may implement the various embodiments of the present invention described herein, a physical memory 3404, at least one user device 3406, at least one output device 3408, a mass storage device 3410, and a network 3412. The network 3412 comprises a wired or wireless network to communicate to remote servers and databases via data networks such as the Internet. The program code utilized by the computing device may be provided on a non-transitory physical storage medium, such as a local hard-disk, a hard-disk in the cloud, or any other physical storage medium (not shown).

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for generating a highlight video of a critical gaming moment from a source computer game running on a game server, comprising:
    a processing server having access to at least one processor; and
    a non-transitory physical medium for storing program code, the non-transitory physical medium accessible by the processing server, and the program code when executed by the processor causes the processor to:
        insert, utilizing a Software Development Kit (SDK) or a game connector module, one or more game virtual cameras into the source computer game;
        receive video recordings recorded using the game virtual cameras during a source game play of the source computer game, wherein each game virtual camera is positioned at a predetermined location;
        analyze the received video recordings from each of the game virtual cameras to extract visual cues, audio cues, and/or metadata cues;
        generate highlight metadata from the received video recordings based on the visual cues, the audio cues, and/or the metadata cues;
        detect the critical gaming moment to be highlighted, based on the generated highlight metadata, wherein the critical gaming moment is associated with a timestamp and/or a location within a game map of the source computer game;
        determine one or more highlight virtual camera trajectories for capturing the critical gaming moment;
        capture one or more videos of the critical gaming moment using one or more highlight virtual cameras, wherein each highlight virtual camera is configured to capture a video of the critical gaming moment, and wherein each highlight virtual camera moves along one of the highlight virtual camera trajectories; and
        generate the highlight video of the critical gaming moment from the video recordings from the game virtual cameras and the one or more videos of the critical gaming moment from the one or more highlight virtual cameras.

2. The system of claim 1, wherein the critical gaming moment occurs at an off-screen location within the game map, away from a concurrent game broadcast location within the game map.

3. The system of claim 1, wherein the source game play is a live game play.

4. The system of claim 1, wherein the source computer game is running on the game server during a game tournament.

5. The system of claim 1, wherein at least two of the game virtual cameras are positioned around at least two different locations within the game map.

6. The system of claim 1, wherein each predetermined location is selected from the group consisting of a static location within the game map, a tracking location associated with a game player, a tracking location associated with a game object, a dynamic location controlled by a game broadcaster, and a dynamic location controlled by a spectator.

7. The system of claim 1, wherein the extraction of the visual cues is based on a computer vision analysis of the received video recordings.

8. The system of claim 1, wherein the determination of the one or more highlight virtual camera trajectories is based on a type of a desired highlight effect, and wherein the desired highlight effect is selected from the group consisting of a spatial scaling, a temporal scaling, a visual special effect, and an augmentation with game metadata.

9. The system of claim 1, wherein the program code when executed by the processor further causes the processor to:
    post-process the one or more videos of the critical gaming moment according to a desired highlight effect, and wherein the generation of the highlight video comprises combining post-processed videos of the critical gaming moment.

10. The system of claim 1, wherein the source computer game is selected from the group consisting of 2D games and 3D games, and wherein the source computer game lacks spherical video output.

11. The system of claim 1, wherein the highlight video is a spherical video.

12. The system of claim 1, wherein the processing server has access to a dedicated local area network (LAN) connection, and wherein the video recordings are received through the dedicated LAN connection from the game server.

13. The system of claim 1, wherein each of the one or more highlight virtual camera trajectories is associated with at least one movement speed function and one capturing angle function, wherein a given highlight virtual camera that moves along a given trajectory moves according to the movement speed function and the capturing angle function, and wherein the one or more highlight virtual cameras were inserted into the source computer game using the Software Development Kit (SDK) or the game connector module.

14. The system of claim 1, wherein the program code when executed by the processor further causes the processor to:
    distribute the highlight video to one or more potential users, comprising tournament operators, media partners, influencers, social network users and other end-users, and wherein the highlight video comprises a link to view additional game recordings and streams.

15. A non-transitory storage medium for generating a highlight video of a critical gaming moment from a source computer game running on a game server, the non-transitory storage medium storing program code and accessible by a processing server having access to at least one processor, and the program code when executed by the processor causes the processor to:
    insert, utilizing a Software Development Kit (SDK) or a game connector module, one or more game virtual cameras into the source computer game;
    receive video recordings recorded using the game virtual cameras during a source game play of the source computer game, wherein each game virtual camera is positioned at a predetermined location;
    analyze the received video recordings from each of the game virtual cameras to extract visual cues, audio cues, and/or metadata cues;

generate highlight metadata from the received video recordings based on the visual cues, the audio cues, and/or the metadata cues;

detect the critical gaming moment to highlight based on the generated highlight metadata, wherein the critical gaming moment is associated with a timestamp and/or a location within a game map of the source computer game; and generate the highlight video of the critical gaming moment from the received video recordings from the game virtual cameras.

16. The non-transitory storage medium of claim 15, wherein the critical gaming moment occurs at an off-screen location within the game map, away from a concurrent game broadcast location within the game map.

17. The non-transitory storage medium of claim 15, wherein the source game play is a live game play, and wherein the source computer game is running on the game server during a game tournament.

18. The non-transitory storage medium of claim 15, wherein each predetermined location is selected from the group consisting of a static location within the game map, a tracking location associated with a game player, a tracking location associated with a game object, a dynamic location controlled by a game broadcaster, and a dynamic location controlled by a spectator.

19. The non-transitory storage medium of claim 15, wherein the program code when executed by the processor further causes the processor to:

generate a highlight effect for the highlight video, wherein the highlight effect is selected from the group consisting of a spatial scaling, a temporal scaling, a visual special effect, and an augmentation with game metadata.

20. A method for generating a highlight video of a critical gaming moment from a source computer game running on a game server, comprising:

inserting, utilizing a Software Development Kit (SDK) or a game connector module, one or more game virtual cameras into the source computer game;

receiving video recordings recorded using the game virtual cameras during a source game play of the source computer game, wherein each game virtual camera is positioned at a predetermined location;

analyzing the received video recordings from each of the game virtual cameras to extract visual cues, audio cues, and/or metadata cues;

generating highlight metadata from the received video recordings based on the visual cues, the audio cues, and/or the metadata cues;

detecting the critical gaming moment to highlight based on the generated highlight metadata, wherein the critical gaming moment is associated with a timestamp and/or a location within a game map of the source computer game; and generating the highlight video of the critical gaming moment from the received video recordings from the game virtual cameras.

21. The method of claim 20, wherein the critical gaming moment occurs at an off-screen location within the game map, away from a concurrent game broadcast location within the game map.

22. The method of claim 20, wherein at least two of the game virtual cameras are positioned around at least two different locations within the game map.

23. The method of claim 20, wherein each predetermined location is selected from the group consisting of a tracking location associated with a game player, a tracking location associated with a game object, and a dynamic location controlled by a game broadcaster.

24. The method of claim 20, wherein the generation of the highlight metadata from the received video recordings is based on the visual cues, and wherein the extraction of the visual cues is based on a computer vision analysis of the received video recordings.

25. The method of claim 20, wherein the source computer game is selected from the group consisting of 2D games and 3D games, and wherein the source computer game lacks spherical video output.

26. The method of claim 20, wherein the highlight video is a spherical video.

27. The method of claim 20, further comprising: determining one or more highlight virtual camera trajectories of one or more highlight virtual cameras based on a type of a desired highlight effect, wherein the desired highlight effect is selected from the group consisting of a spatial scaling, a temporal scaling, a visual special effect, and an augmentation with game metadata.

28. The method of claim 27, wherein each of the highlight virtual camera trajectories is associated with at least one movement speed function and one capturing angle function, and wherein a given highlight virtual camera that moves along a given trajectory moves according to the movement speed function and the capturing angle function.

* * * * *